US012608387B2

(12) United States Patent
Bastawala et al.

(10) Patent No.: US 12,608,387 B2
(45) Date of Patent: Apr. 21, 2026

(54) MIRAGE INSTANCE OF A DATABASE SERVER

(71) Applicant: Oracle International Corporation, Redwood Shores, CA (US)

(72) Inventors: Mehul D. Bastawala, Sunnyvale, CA (US); Ravi Thammaiah, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 634 days.

(21) Appl. No.: 16/984,165

(22) Filed: Aug. 4, 2020

(65) Prior Publication Data

US 2022/0046036 A1 Feb. 10, 2022

(51) Int. Cl.
*G06F 16/2458* (2019.01)
*G06F 11/34* (2006.01)
(Continued)

(52) U.S. Cl.
CPC ...... *G06F 16/2471* (2019.01); *G06F 11/3433* (2013.01); *G06F 11/3452* (2013.01);
(Continued)

(58) Field of Classification Search
CPC ...... G06F 16/2471; G06F 16/21; G06F 16/24; G06F 11/3433; G06F 11/3452; G06F 11/3612; H04L 63/1416; H04L 63/1425
See application file for complete search history.

(56) References Cited

U.S. PATENT DOCUMENTS 6,134,673 A * 10/2000 Chrabaszcz ............. H04L 69/40
714/E11.073
6,240,454 B1 * 5/2001 Nepustil ............... G06F 9/5083
709/239
(Continued)

FOREIGN PATENT DOCUMENTS

EP 877316 A2 * 11/1998 ......... G06F 9/30032

OTHER PUBLICATIONS

Meyer, "How to Limit the Amount of Memory Used by McAfee", Houston Chronicle, https://web.archive.org/web/20160314232408/ https://smallbusiness.chron.com/limit-amount-memory-used-mcafee-68793.html (Year: 2016).*
(Continued)

*Primary Examiner* — Khanh B Pham
*Assistant Examiner* — Brooks T Hale
(74) *Attorney, Agent, or Firm* — Vista IP Law Group, LLP

(57) ABSTRACT

Instances of a database server can be of two kinds, regular or mirage that respectively handle database requests in sessions behaving normally or abnormally, and based on changes in behavior, sessions are relocated therebetween. Behavior of sessions is evaluated based on statistics generated in processing requests in individual steps within one or more stages, such as parse stage. The evaluation may be automatically tuned by changing tests that are enabled based on priorities, changing thresholds within tests, changing whether sessions are evaluated together as a group, and changing periodicity of evaluation. Evaluation may be triggered by news of normal/abnormal activity in locations of sessions' origin. Mirage instances can be of multiple classes, execute in lower/higher capacity computers. Sessions may start in either kind of instance. Sessions may be relocated for reasons unrelated to maliciousness, such as excessive utili-
(Continued)

zation of resources, excessive errors, or update of software of the database server.

28 Claims, 37 Drawing Sheets

(51) Int. Cl.

| | |
|---|---|
| *G06F 11/3604* | (2025.01) |
| *G06F 16/21* | (2019.01) |
| *G06F 16/24* | (2019.01) |
| *H04L 9/40* | (2022.01) |

(52) U.S. Cl.
CPC .......... *G06F 11/3612* (2013.01); *G06F 16/21* (2019.01); *G06F 16/24* (2019.01); *H04L 63/1416* (2013.01); *H04L 63/1425* (2013.01)

(56) References Cited

U.S. PATENT DOCUMENTS

| | | | | |
|---|---|---|---|---|
| 2003/0009707 | A1* | 1/2003 | Pedone | G06F 11/2097 |
| | | | | 714/E11.094 |
| 2003/0126049 | A1* | 7/2003 | Nagan | G06Q 40/08 |
| | | | | 705/35 |
| 2003/0140060 | A1* | 7/2003 | Gehlot | A61B 5/6807 |
| 2003/0158855 | A1* | 8/2003 | Farnham | G06Q 10/10 |
| | | | | 707/999.102 |
| 2005/0038828 | A1 | 2/2005 | Kaluskar | |
| 2005/0038848 | A1 | 2/2005 | Kaluskar | |
| 2006/0253760 | A1* | 11/2006 | Jones | G06F 11/0709 |
| | | | | 714/741 |
| 2007/0266435 | A1* | 11/2007 | Williams | G06F 21/54 |
| | | | | 726/22 |
| 2009/0077632 | A1* | 3/2009 | Carpenter | H04L 63/1441 |
| | | | | 726/3 |
| 2009/0132509 | A1* | 5/2009 | Nagoya | H04L 63/101 |
| | | | | 707/999.005 |
| 2013/0290513 | A1* | 10/2013 | Shikari | H04L 67/1008 |
| | | | | 709/224 |
| 2014/0279840 | A1 | 9/2014 | Chan | |
| 2016/0253494 | A1 | 9/2016 | Muralidharan | |
| 2017/0223112 | A1* | 8/2017 | Kouno | H04L 67/56 |
| 2018/0032563 | A1* | 2/2018 | Qin | G06F 16/248 |
| 2020/0241868 | A1* | 7/2020 | Murthy | G06F 11/0706 |

OTHER PUBLICATIONS

Unknown Author, "SQL Relay Configuration Guide", on or before Jun. 5, 2019, downloaded from Internet at "http://sqlrelay.sourceforge.net/sqlrelay/admin/configguide.html", 43 pages.

Lance Ashdown, Tom Kyte, Joe Mccormack, "Oracle Database Instance", Chapter 13 in "Oracle® Database Database Concepts 19c", Jan. 2019, pp. 13-1 to 13-32, E96138-01, Oracle Corporation.

Lance Ashdown, Tom Kyte, Joe Mccormack, "Process Architecture", Chapter 15 in "Oracle® Database Database Concepts 19c", Jan. 2019, pp. 15-1 to 15-25, E96138-01, Oracle Corporation.

Rajesh Bhatiya, "Managing Resources with Oracle Database Resource Manager", Chapter 27 in "Oracle® Database Database Administrator's Guide 19c", Mar. 2019, pp. 27-1 to 27-85, E96348-04, Oracle Corporation.

Lance Ashdown, Nigel Bayliss, Maria Colgan, Tom Kyte, "Monitoring Database Operations", Chapter 21 in "Oracle Database SQL Tuning Guide, 19c", Jan. 2019, pp. 21-1 to 21-27, E96095-03, Oracle Corporation.

Lance Ashdown, Nigel Bayliss, Maria Colgan, Tom Kyte, "Performing Application Tracing", Chapter 22 in "Oracle Database SQL Tuning Guide, 19c", Jan. 2019, pp. 22-1 to 22-40, E96095-03, Oracle Corporation.

Unknown Author, "Database Load Balancing for MySQL and MariaDB with ProxySQL—Tutorial", Feb. 22, 2019, downloaded from "https://severalnines.com/resources/tutorials/proxysql-tutorial-mysql-mariadb", 48 pages.

Srinath Krishnaswamy, Kant Patel, Kuassi Mensah, "A Database Proxy for Transparent High Availability, Performance, Routing, and Security", presentation in "Oracle Open World", Oct. 24, 2018, Oracle Corporation.

Esa Korhonen, "MaxScale HA setup using Keepalived and MaxCtrl", Mar. 6, 2018, downloaded from "https://mariadb.com/resources/blog/maxscale-ha-setup-using-keepalived-and-maxctrl/", 13 pages.

Nick Vyzas, "Amazon Aurora—Seamless Planned Failover with ProxySQL", Sep. 10, 2018, downloaded from "https://proxysql.com/blog/aurora-failover-without-losing-transactions", 5 pages.

Vlad Fedorkov, "Scaling from a Dark Ages of Big Data to Brighter Today", Aug. 29, 2018, downloaded from "https://proxysql.com/blog/scaling-with-proxysql", 6 pages.

Unknown Author, "ProxySQL High-performance MySQL proxy with a GPL license", on or before Jun. 5, 2019, downloaded from Internet at "https://proxysql.com/".

Unknown Author, "Choosing a Database Proxy for MySQL and MariaDB", on or before Jun. 5, 2019, downloaded from "https://severalnines.com/resources/whitepapers/choosing-database-proxy-mysql-and-mariadb", 5 pages.

Karthik Shetty, Gigi Hanna, Andrey Brozhko, "Oracle Audit Vault and Database Firewall Concepts Guide", Jun. 2019, Release 12.2, E49916-12, Oracle Corporation, 73 pages.

* cited by examiner (from T4 in FIG. 2A)

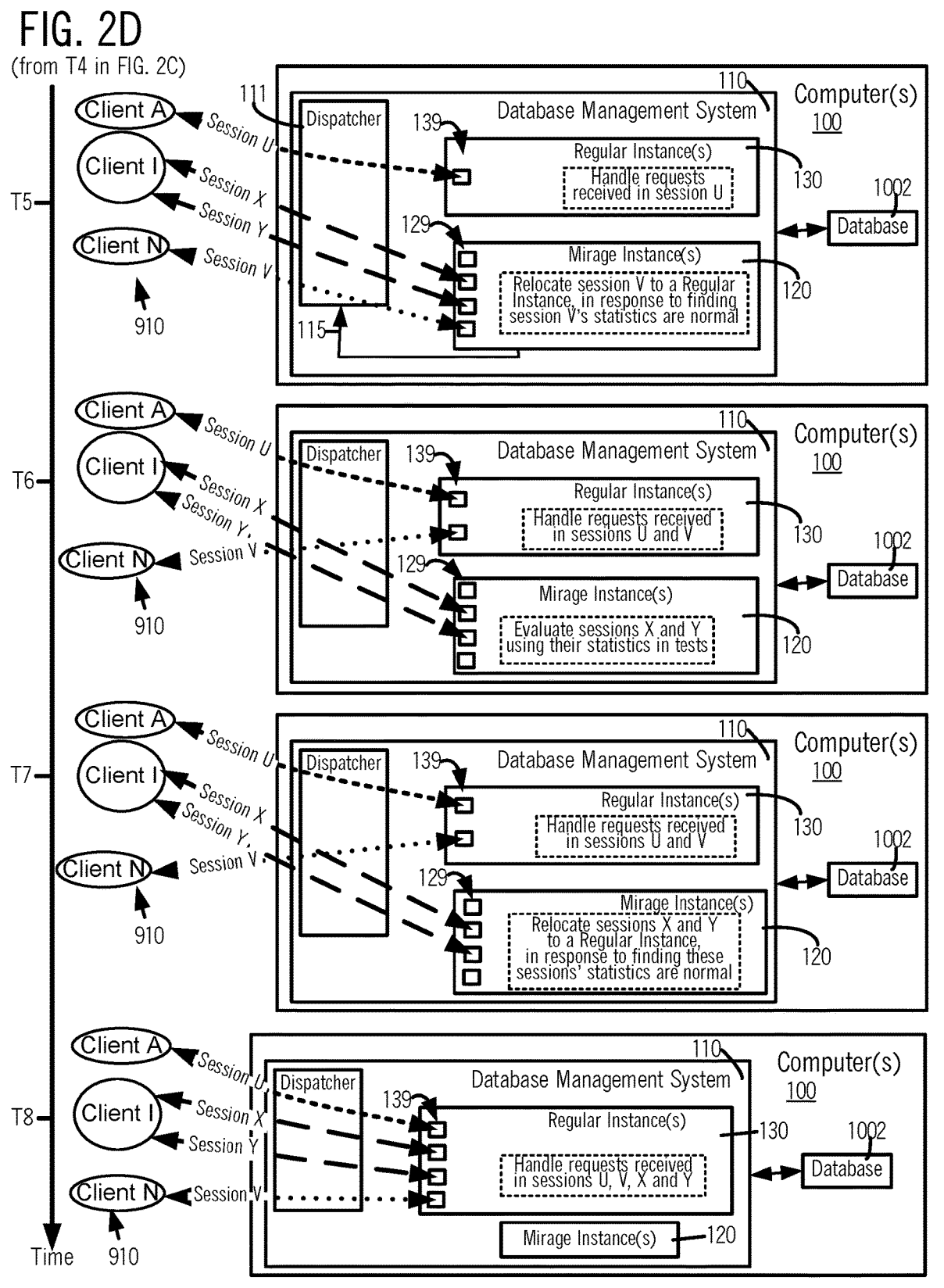

FIG. 2D
(from T4 in FIG. 2C)

T5 —

Client A — Session U
Client I — Session X
Session Y
Client N — Session V

910

Dispatcher    111    139    Database Management System    110    Computer(s) 100

Regular Instance(s)
Handle requests received in session U    130    1002
Database 129
Mirage Instance(s)
Relocate session V to a Regular Instance, in response to finding session V's statistics are normal    120

115

---

T6 —

Client A — Session U
Client I — Session X
Session Y,
Client N — Session V

910

Dispatcher    139    Database Management System    110    Computer(s) 100

Regular Instance(s)
Handle requests received in sessions U and V    130    1002
Database 129
Mirage Instance(s)
Evaluate sessions X and Y using their statistics in tests    120

---

T7 —

Client A — Session U
Client I — Session X
Session Y,
Client N — Session V.

910

Dispatcher    139    Database Management System    110    Computer(s) 100

Regular Instance(s)
Handle requests received in sessions U and V    130    1002
Database 129
Mirage Instance(s)
Relocate sessions X and Y to a Regular Instance, in response to finding these sessions' statistics are normal    120

---

T8 —

Client A — Session U
Client I — Session X
Session Y
Client N — Session V

Time    910

Dispatcher    139    Database Management System    110    Computer(s) 100

Regular Instance(s)
Handle requests received in sessions U, V, X and Y    130    1002
Database Mirage Instance(s)    120

FIG. 3A

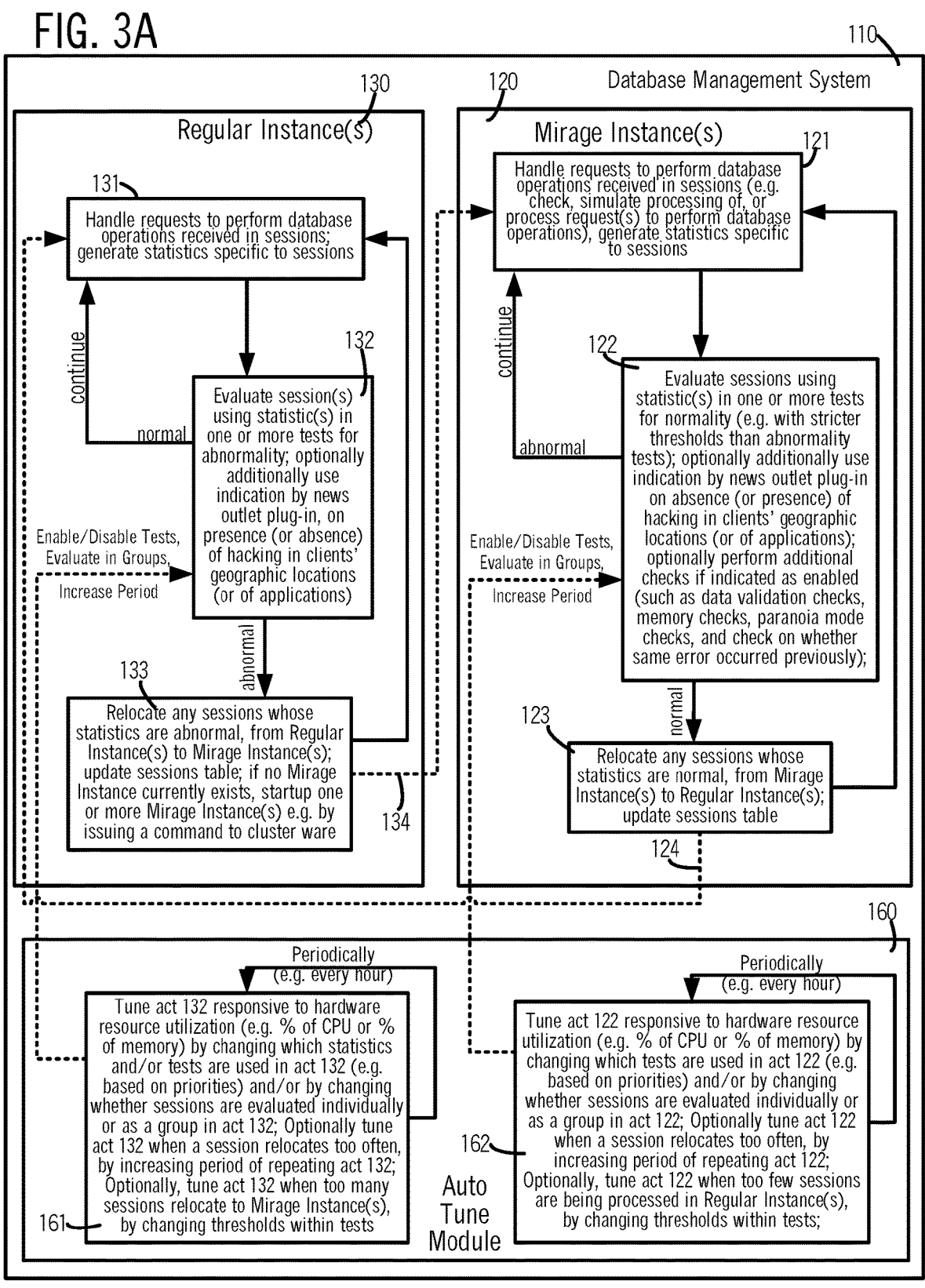

110

Database Management System

130

Regular Instance(s)

131
Handle requests to perform database operations received in sessions; generate statistics specific to sessions continue    normal 132
Evaluate session(s) using statistic(s) in one or more tests for abnormality; optionally additionally use indication by news outlet plug-in, on presence (or absence) of hacking in clients' geographic locations (or of applications)

Enable/Disable Tests, Evaluate in Groups, Increase Period abnormal

133
Relocate any sessions whose statistics are abnormal, from Regular Instance(s) to Mirage Instance(s); update sessions table; if no Mirage Instance currently exists, startup one or more Mirage Instance(s) e.g. by issuing a command to cluster ware

134

120

Mirage Instance(s)    121

Handle requests to perform database operations received in sessions (e.g. check, simulate processing of, or process request(s) to perform database operations), generate statistics specific to sessions continue    abnormal 122
Evaluate sessions using statistic(s) in one or more tests for normality (e.g. with stricter thresholds than abnormality tests); optionally additionally use indication by news outlet plug-in on absence (or presence) of hacking in clients' geographic locations (or of applications); optionally perform additional checks if indicated as enabled (such as data validation checks, memory checks, paranoia mode checks, and check on whether same error occurred previously);

Enable/Disable Tests, Evaluate in Groups, Increase Period normal

123
Relocate any sessions whose statistics are normal, from Mirage Instance(s) to Regular Instance(s); update sessions table

124

160

Periodically (e.g. every hour)

161
Tune act 132 responsive to hardware resource utilization (e.g. % of CPU or % of memory) by changing which statistics and/or tests are used in act 132 (e.g. based on priorities) and/or by changing whether sessions are evaluated individually or as a group in act 132; Optionally tune act 132 when a session relocates too often, by increasing period of repeating act 132; Optionally, tune act 132 when too many sessions relocate to Mirage Instance(s), by changing thresholds within tests

162

Auto Tune Module

Periodically (e.g. every hour)

Tune act 122 responsive to hardware resource utilization (e.g. % of CPU or % of memory) by changing which tests are used in act 122 (e.g. based on priorities) and/or by changing whether sessions are evaluated individually or as a group in act 122; Optionally tune act 122 when a session relocates too often, by increasing period of repeating act 122; Optionally, tune act 122 when too few sessions are being processed in Regular Instance(s), by changing thresholds within tests;

FIG. 3B

351 — Receive a criterion to identify priorities (e.g. resource utilization, or threat level or date and time)

352 — Determine a current value of the criterion (e.g. determine current CPU utilization, or current threat level or current date & time)

353 — Identify an indication of enablement/disablement of priorities e.g. use criterion's current value to lookup a first table (see FIG. 12E, 12M or 12O)

Each statistic (and/or test)

354 — Use priority of each statistic (and/or test) specified in a second table (see FIG. 12D), to determine indication of enablement/disablement of statistic (and/or test)

355 — Store enablement/disablement indication of of statistic (and/or test) in memory and optionally persisted to disk (e.g. as shown in FIG. 12C) for use by evaluation (act 132 of FIG. 3A)

356 — Is a resource's utilization above a corresponding upper limit?
no / yes

357 — Set resolution to group level; notify evaluation (act 132 in FIG. 3A)

358 — Is a resource's utilization below a corresponding lower limit?
no / yes

359 — Set resolution to session level; notify evaluation (act 132 in FIG. 3A)

160

361 — Is a session relocating too often?
no / Each session / yes

362 — Change time period over which session is evaluated; notify evaluation (act 132 in FIG. 3A)

no limit on number of relocations automatic change of threshold disabled

363 — Have too many sessions relocated?
no / yes

374

364 — Change thresholds, in tests met by relocated sessions

365 — Have too few sessions relocated?
yes

366 — Change thresholds, in tests met by relocated sessions

367 — Is a test met frequently?
no / auto-prioritized tests / yes

368 — Change priority of test (e.g. in FIG. 12D) to a value that is enabled for more criteria values (e.g. decrease priority's value by 1), so this test is used more often (as the test may be more important)

369 — Is the test met infrequently?
no / yes

373

370 — Change priority of test (e.g. in FIG. 12D) to a value that is disabled for more criteria values (e.g. increase priority's value by 1), so this test is used less often (as the test may be less important)

372

371 — Sleep no tests are auto-prioritized

Auto Tune Module
(for Regular Instances)

Time
(to T5 in FIG. 4B)

(from T4 in FIG. 4A)

(from T4 in FIG. 6A)

FIG. 12A

100 — Computer(s) 110

638

614 — Statistics in memory & disk (for each session and/or for each group of sessions)

| Statistics (inaccessible to Client Apps) | Network Trans-mission Stage | Parse step to check syntax | Parse step to check semantics | Parse step to check user's rights | Parse step to check if previously parsed | Parse step to generate executable code | Parse Stage (sum of all steps) | Exec-ution Stage | Fetch Stage | Cumu-lative over multiple stages | |
|---|---|---|---|---|---|---|---|---|---|---|---|
| Segmentation Faults | 0 | 0 | 0 | 0 | 0 | 0 | 0 | 1 | 19 | 20 | 636A |
| Buffer Overflow | 0 | 0 | 0 | 0 | 0 | 0 | 0 | 0 | 0 | 0 | 636B |
| Out-of-Memory | 0 | 0 | 0 | 0 | 0 | 0 | 0 | 0 | 0 | 0 | 636C |
| Restricted Access | 0 | 0 | 0 | 0 | 0 | 0 | 0 | 0 | 0 | 0 | 636D |
| Checksum Errors | 1 | n/a | n/a | n/a | n/a | n/a | n/a | n/a | n/a | n/a | 636E |
| Total # of Errors | 0 | 0 | 0 | 0 | 0 | 0 | 0 | 1 | 19 | 20 | 636F |
| Storage Partitions | n/a | n/a | n/a | n/a | n/a | 0 | 1 | 2 | 77 | 79 | 637B |

636 {rows 636A–636F}   637 {Storage Partitions}

640 — Thresholds Table (thresholds for testing statistics of a session, these thresholds to be scaled up by number of sessions in a group for use on group-level totals)

| Thresholds to apply on Statistics (see FIG. 12A) | Network Trans-mission Stage | Parse step to check syntax | Parse step to check semantics | Parse step to check user's rights | Parse step to check if previously parsed | Parse step to generate executable code | Parse Stage (sum of all steps) | Exec-ution Stage | Fetch Stage | Cumu-lative over multiple stages | |
|---|---|---|---|---|---|---|---|---|---|---|---|
| Segmentation Faults | 1 | 0 | 0 | 1 | 1 | 3 | 5 | 5 | 10 | 15 | 636A |
| Buffer Overflow | 1 | 0 | 0 | 0 | 1 | 2 | 3 | 5 | 15 | 20 | 636B |
| Out-of-Memory | 1 | 0 | 0 | 0 | 2 | 3 | 4 | 10 | 20 | 25 | 636C |
| Restricted Access | 1 | 0 | 0 | 0 | 3 | 4 | 5 | 5 | 10 | 15 | 636D |
| Checksum Errors | 1 | n/a | n/a | n/a | n/a | n/a | n/a | n/a | n/a | n/a | 636E |
| Total # of Errors | 5 | 0 | 0 | 2 | 3 | 5 | 5 | 30 | 60 | 100 | 636F |
| Storage Partitions | n/a | n/a | n/a | n/a | n/a | 2 | 2 | 5 | 55 | 60 | 637B |

Computer(s)    110

650

| Enable/Disable Table (enable/disable status of statistics and/or of related tests) | | | | | | | | | | |
|---|---|---|---|---|---|---|---|---|---|---|
| Enable & Disable of Statistics (see FIG. 12A) | Network Trans-mission Stage | Parse step to check syntax | Parse step to check semantics | Parse step to check user's rights | Parse step to check if previously parsed | Parse step to generate executable code | Parse Stage (sum of all steps) | Exec-ution Stage | Fetch Stage | Cumu-lative over multiple stages |
| Segmentation Faults | Enable | Enable | Enable | Enable | Enable | Enable | Enable | Enable | Enable | Enable |
| Buffer Overflow | Disable | Disable | Disable | Disable | Disable | Disable | Disable | Disable | Disable | Disable |
| Out-of-Memory | Enable | Enable | Enable | Enable | Enable | Enable | Enable | Enable | Enable | Enable |
| Restricted Access | Disable | Disable | Disable | Disable | Disable | Disable | Disable | Disable | Disable | Disable |
| Checksum Errors | Enable | n/a | n/a | n/a | n/a | n/a | n/a | n/a | n/a | n/a |
| Total # of Errors | Enable | Enable | Enable | Enable | Enable | Enable | Enable | Enable | Enable | Enable |
| Storage Partitions | Disable | Disable | Disable | Disable | Disable | Disable | Disable | Disable | Disable | Disable |

Computer(s)    110

660

| Priorities Table (priorities assigned to statistics and/or to related tests) | | | | | | | | | | |
|---|---|---|---|---|---|---|---|---|---|---|
| Priorities assigned to Statistics (see FIG. 12A) | Network Trans-mission Stage | Parse step to check syntax | Parse step to check semantics | Parse step to check user's rights | Parse step to check if previously parsed | Parse step to generate executable code | Parse Stage (sum of all steps) | Exec-ution Stage | Fetch Stage | Cumu-lative over multiple stages |
| Segmentation Faults | 2 | 2 | 2 | 2 | 2 | 2 | 2 | 2 | 2 | 2 |
| Buffer Overflow | 4 | 4 | 4 | 4 | 4 | 4 | 4 | 4 | 4 | 4 |
| Out-of-Memory | 1 | 1 | 1 | 1 | 1 | 1 | 1 | 1 | 1 | 1 |
| Restricted Access | 3 | 3 | 3 | 3 | 3 | 3 | 3 | 3 | 3 | 3 |
| Checksum Errors | 2 | n/a | n/a | n/a | n/a | n/a | n/a | n/a | n/a | n/a |
| Total # of Errors | 1 | 1 | 1 | 1 | 1 | 1 | 1 | 1 | 1 | 1 |
| Storage Partitions | n/a | n/a | n/a | n/a | n/a | 3 | 3 | 3 | 3 | 3 |

Computer(s) 100

Database Management System 110

681

| Table to Enable Priorities Depending on Load (for Regular Instances) | | | | |
|---|---|---|---|---|
| Overall CPU Utilization at machine level (in server computer of regular instance) | Priority 1 (of Tests & Statistics) | Priority 2 (of Tests & Statistics) | Priority 3 (of Tests & Statistics) | Priority 4 (of Tests & Statistics) |
| > 90% | Enable | Disable | Disable | Disable |
| > 50% and ≤ 90% | Enable | Enable | Disable | Disable |
| > 30% and ≤ 50% | Enable | Enable | Enable | Disable |
| ≤ 30% | Enable | Enable | Enable | Enable |

FIG. 12F

Computer(s) 100

Database Management System 110

682

| Table to Enable Priorities Depending on Load (for Mirage Instances) | | | | |
|---|---|---|---|---|
| Overall CPU Utilization at machine level (in server computer of mirage instance) | Priority 1 (of Tests & Statistics) | Priority 2 (of Tests & Statistics) | Priority 3 (of Tests & Statistics) | Priority 4 (of Tests & Statistics) |
| > 80% | Enable | Enable | Disable | Disable |
| > 40% and ≤ 80% | Enable | Enable | Enable | Disable |
| > 20% and ≤ 40% | Enable | Enable | Enable | Enable |
| ≤ 20% | Enable | Enable | Enable | Enable |

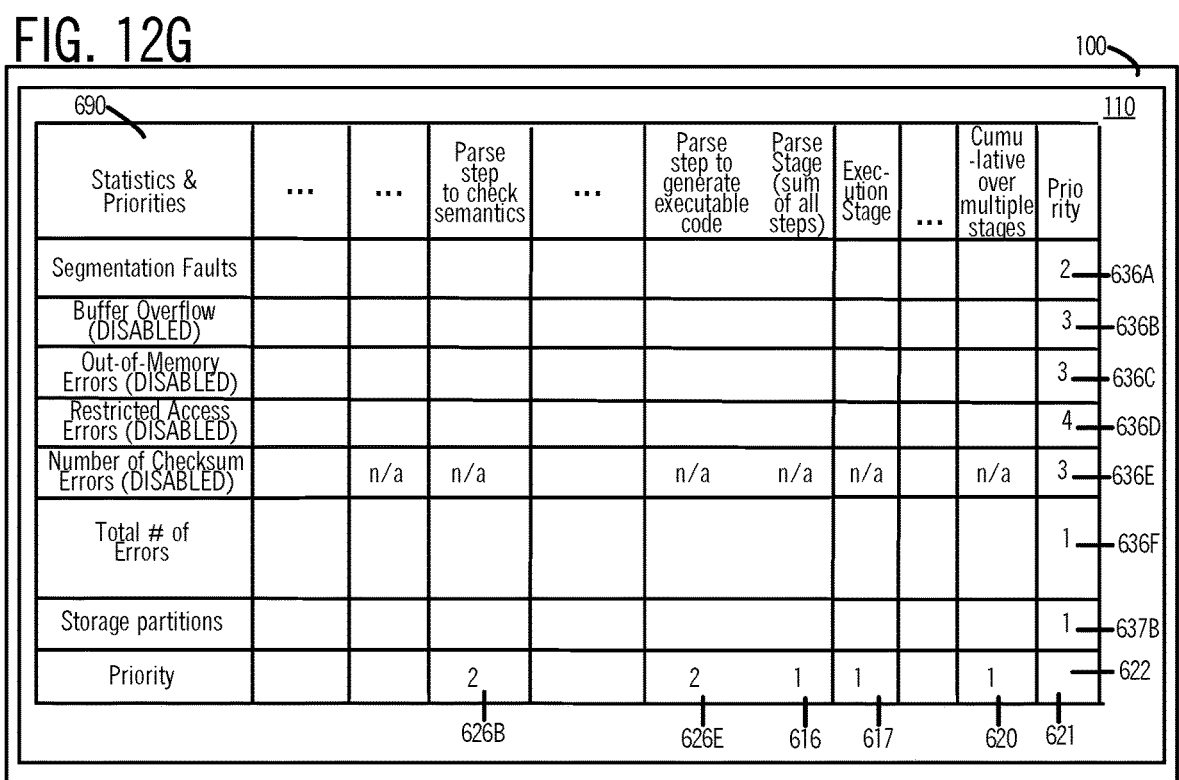

| 690   Statistics & Priorities | ... | ... | Parse step to check semantics | ... | Parse step to generate executable code | Parse Stage (sum of all steps) | Exec-ution Stage | ... | Cumu-lative over multiple stages | Prio rity | 110 |
|---|---|---|---|---|---|---|---|---|---|---|---|
| Segmentation Faults | | | | | | | | | | 2 | 636A |
| Buffer Overflow (DISABLED) | | | | | | | | | | 3 | 636B |
| Out-of-Memory Errors (DISABLED) | | | | | | | | | | 3 | 636C |
| Restricted Access Errors (DISABLED) | | | | | | | | | | 4 | 636D |
| Number of Checksum Errors (DISABLED) | n/a | n/a | | n/a | n/a | n/a | | n/a | 3 | 636E |
| Total # of Errors | | | | | | | | | | 1 | 636F |
| Storage partitions | | | | | | | | | | 1 | 637B |
| Priority | | | 2 | | 2 | 1 | 1 | | 1 | | 622 |

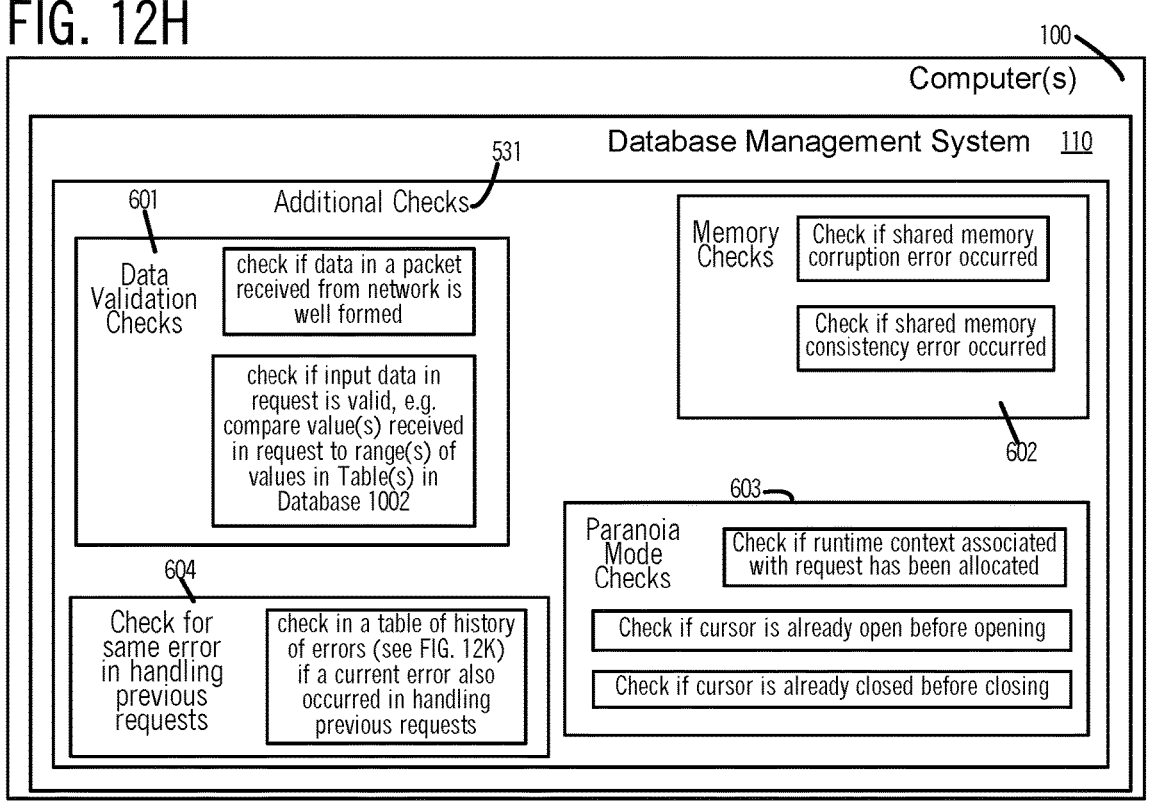

Computer(s)

Database Management System   110

531   Additional Checks

601   Data Validation Checks check if data in a packet received from network is well formed check if input data in request is valid, e.g. compare value(s) received in request to range(s) of values in Table(s) in Database 1002

Memory Checks

Check if shared memory corruption error occurred

Check if shared memory consistency error occurred

602

604   Check for same error in handling previous requests check in a table of history of errors (see FIG. 12K) if a current error also occurred in handling previous requests 603   Paranoia Mode Checks Check if runtime context associated with request has been allocated Check if cursor is already open before opening Check if cursor is already closed before closing

FIG. 12I

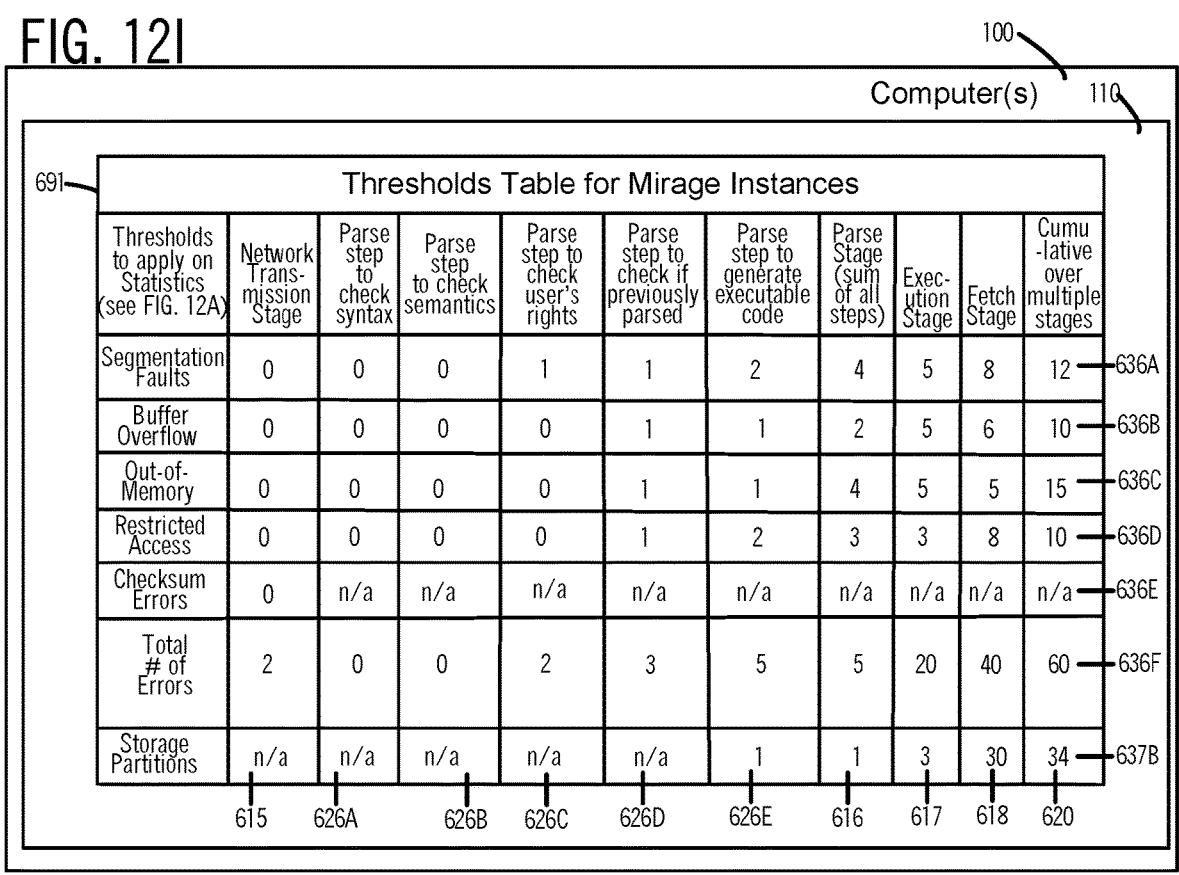

100

Computer(s)    110

691 —

Thresholds Table for Mirage Instances

| Thresholds to apply on Statistics (see FIG. 12A) | Network Trans-mission Stage | Parse step to check syntax | Parse step to check semantics | Parse step to check user's rights | Parse step to check if previously parsed | Parse step to generate executable code | Parse Stage (sum of all steps) | Exec-ution Stage | Fetch Stage | Cumu-lative over multiple stages | |
|---|---|---|---|---|---|---|---|---|---|---|---|
| Segmentation Faults | 0 | 0 | 0 | 1 | 1 | 2 | 4 | 5 | 8 | 12 | —636A |
| Buffer Overflow | 0 | 0 | 0 | 0 | 1 | 1 | 2 | 5 | 6 | 10 | —636B |
| Out-of-Memory | 0 | 0 | 0 | 0 | 1 | 1 | 4 | 5 | 5 | 15 | —636C |
| Restricted Access | 0 | 0 | 0 | 0 | 1 | 2 | 3 | 3 | 8 | 10 | —636D |
| Checksum Errors | 0 | n/a | n/a | n/a | n/a | n/a | n/a | n/a | n/a | n/a | —636E |
| Total # of Errors | 2 | 0 | 0 | 2 | 3 | 5 | 5 | 20 | 40 | 60 | —636F |
| Storage Partitions | n/a | n/a | n/a | n/a | n/a | 1 | 1 | 3 | 30 | 34 | —637B |

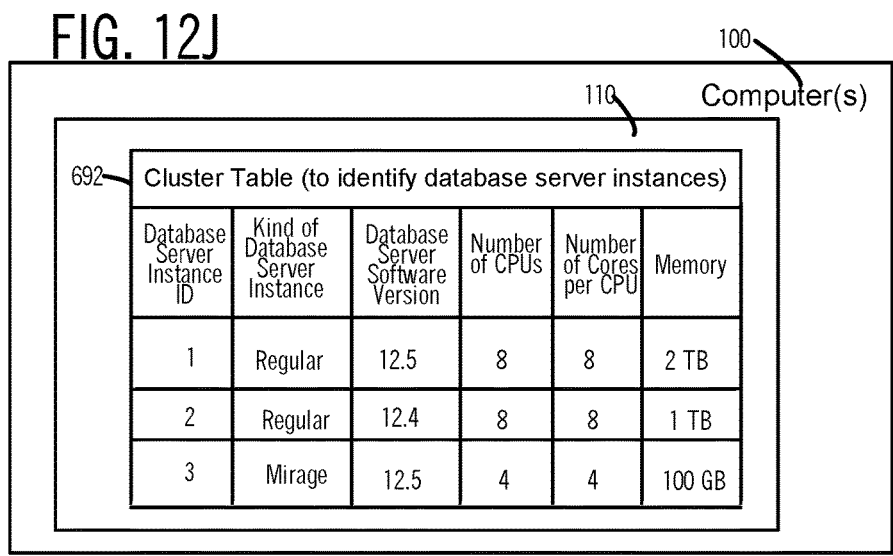

100

110    Computer(s)

692 — Cluster Table (to identify database server instances)

| Database Server Instance ID | Kind of Database Server Instance | Database Server Software Version | Number of CPUs | Number of Cores per CPU | Memory |
|---|---|---|---|---|---|
| 1 | Regular | 12.5 | 8 | 8 | 2 TB |
| 2 | Regular | 12.4 | 8 | 8 | 1 TB |
| 3 | Mirage | 12.5 | 4 | 4 | 100 GB |

FIG. 12K

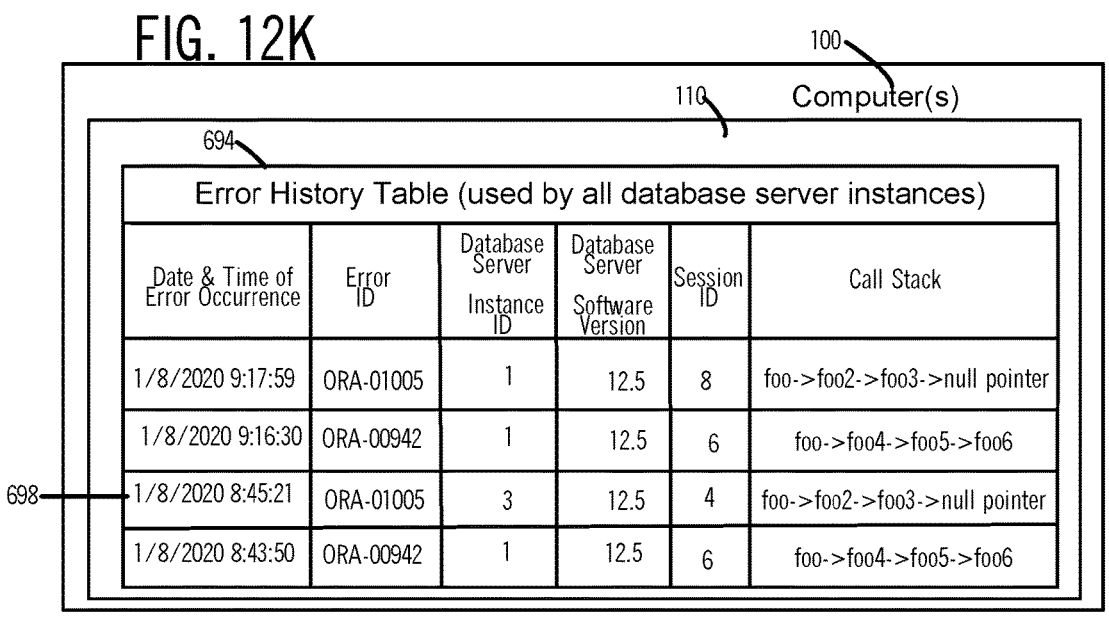

100

110      Computer(s)

694

| Error History Table (used by all database server instances) | | | | | |
|---|---|---|---|---|---|
| Date & Time of Error Occurrence | Error ID | Database Server Instance ID | Database Server Software Version | Session ID | Call Stack |
| 1/8/2020 9:17:59 | ORA-01005 | 1 | 12.5 | 8 | foo->foo2->foo3->null pointer |
| 1/8/2020 9:16:30 | ORA-00942 | 1 | 12.5 | 6 | foo->foo4->foo5->foo6 |
| 1/8/2020 8:45:21 | ORA-01005 | 3 | 12.5 | 4 | foo->foo2->foo3->null pointer |
| 1/8/2020 8:43:50 | ORA-00942 | 1 | 12.5 | 6 | foo->foo4->foo5->foo6 |

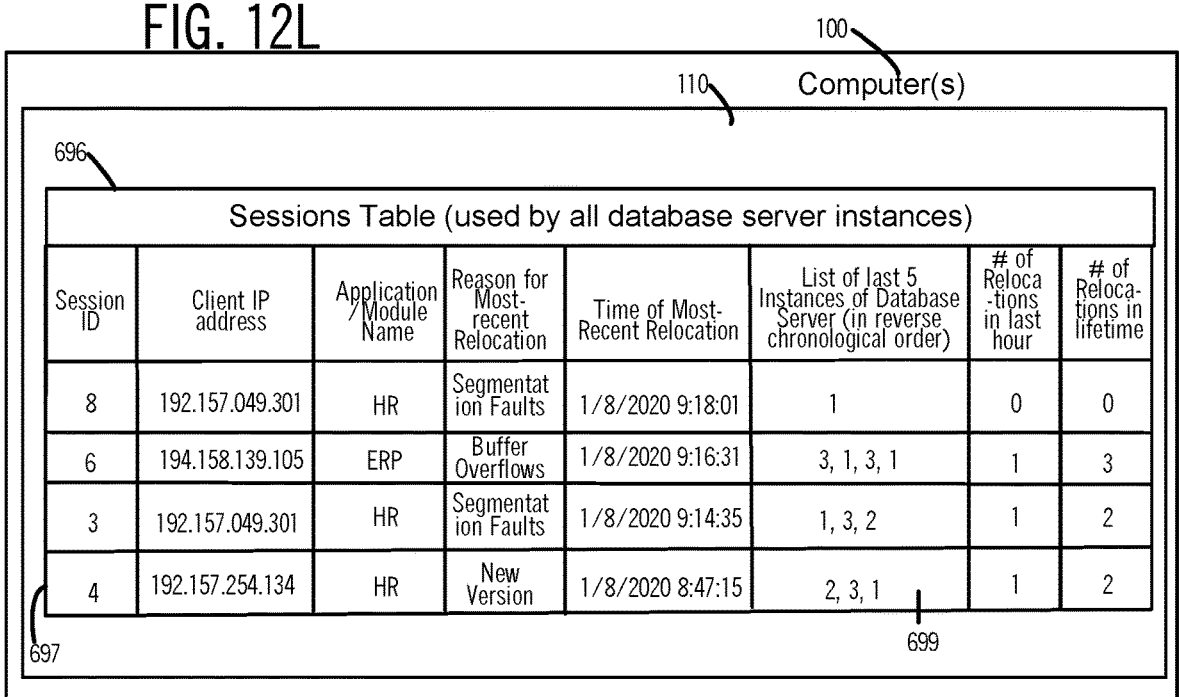

100

110      Computer(s)

696

| Sessions Table (used by all database server instances) | | | | | | | |
|---|---|---|---|---|---|---|---|
| Session ID | Client IP address | Application /Module Name | Reason for Most-recent Relocation | Time of Most-Recent Relocation | List of last 5 Instances of Database Server (in reverse chronological order) | # of Reloca-tions in last hour | # of Reloca-tions in lifetime |
| 8 | 192.157.049.301 | HR | Segmentation Faults | 1/8/2020 9:18:01 | 1 | 0 | 0 |
| 6 | 194.158.139.105 | ERP | Buffer Overflows | 1/8/2020 9:16:31 | 3, 1, 3, 1 | 1 | 3 |
| 3 | 192.157.049.301 | HR | Segmentation Faults | 1/8/2020 9:14:35 | 1, 3, 2 | 1 | 2 |
| 4 | 192.157.254.134 | HR | New Version | 1/8/2020 8:47:15 | 2, 3, 1 | 1 | 2 |

Computer(s) 100

110

Database Management System

683

| Table to Enable Priorities Depending on Threat Level (for Regular Instances) | | | | |
|---|---|---|---|---|
| Threat level of malicious cyber activity | Priority 1 (of Tests & Statistics) | Priority 2 (of Tests & Statistics) | Priority 3 (of Tests & Statistics) | Priority 4 (of Tests & Statistics) |
| 1 (Low) | Enable | Disable | Disable | Disable |
| 2 (Elevated) | Enable | Enable | Disable | Disable |
| 3 (High) | Enable | Enable | Enable | Disable |
| 4 (Severe) | Enable | Enable | Enable | Enable |

FIG. 12N

Computer(s) 100

110

Database Management System

684

| Table to Enable Priorities Depending on Threat Level (for Mirage Instances) | | | | |
|---|---|---|---|---|
| Threat level of malicious cyber activity | Priority 1 (of Tests & Statistics) | Priority 2 (of Tests & Statistics) | Priority 3 (of Tests & Statistics) | Priority 4 (of Tests & Statistics) |
| 1 (Low) | Enable | Enable | Disable | Disable |
| 2 (Elevated) | Enable | Enable | Enable | Disable |
| 3 (High) | Enable | Enable | Enable | Enable |
| 4 (Severe) | Enable | Enable | Enable | Enable |

FIG. 12O

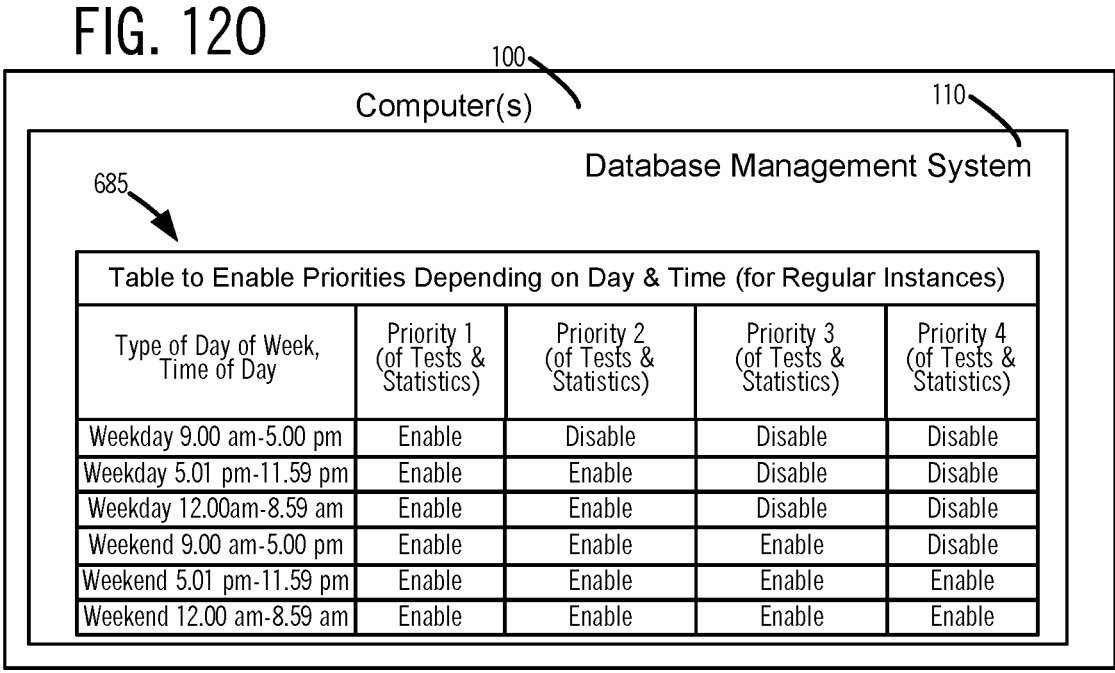

Computer(s) 100

Database Management System 110

685

| Table to Enable Priorities Depending on Day & Time (for Regular Instances) | | | | |
|---|---|---|---|---|
| Type of Day of Week, Time of Day | Priority 1 (of Tests & Statistics) | Priority 2 (of Tests & Statistics) | Priority 3 (of Tests & Statistics) | Priority 4 (of Tests & Statistics) |
| Weekday 9.00 am-5.00 pm | Enable | Disable | Disable | Disable |
| Weekday 5.01 pm-11.59 pm | Enable | Enable | Disable | Disable |
| Weekday 12.00am-8.59 am | Enable | Enable | Disable | Disable |
| Weekend 9.00 am-5.00 pm | Enable | Enable | Enable | Disable |
| Weekend 5.01 pm-11.59 pm | Enable | Enable | Enable | Enable |
| Weekend 12.00 am-8.59 am | Enable | Enable | Enable | Enable |

FIG. 12P

Computer(s) 100

Database Management System 110

686

| Table to Enable Priorities Depending on Day & Time (for Mirage Instances) | | | | |
|---|---|---|---|---|
| Type of Day of Week, Time of Day | Priority 1 (of Tests & Statistics) | Priority 2 (of Tests & Statistics) | Priority 3 (of Tests & Statistics) | Priority 4 (of Tests & Statistics) |
| Weekday 9.00 am-5.00 pm | Enable | Enable | Disable | Disable |
| Weekday 5.01 pm-11.59 pm | Enable | Enable | Enable | Disable |
| Weekday 12.00 am-8.59 am | Enable | Enable | Enable | Disable |
| Weekend 9.00 am-5.00 pm | Enable | Enable | Enable | Enable |
| Weekend 5.01 pm-11.59 pm | Enable | Enable | Enable | Enable |
| Weekend 12.00 am-8.59 am | Enable | Enable | Enable | Enable |

Computer(s)   110

670

| Number of times tests were met within one hour | | | | | | | | | | |
|---|---|---|---|---|---|---|---|---|---|---|
| Test | Network Trans-mission Stage | Parse step to check syntax | Parse step to check semantics | Parse step to check user's rights | Parse step to check if previously parsed | Parse step to generate executable code | Parse Stage (sum of all steps) | Exec-ution Stage | Fetch Stage | Cumu-lative over multiple stages |
| Segmentation Faults | 0 | 2 | 1 | 3 | 1 | 3 | 10 | 5 | 7 | 22 |
| Buffer Overflow | 0 | 1 | 2 | 1 | 2 | 1 | 7 | 2 | 1 | 10 |
| Out-of-Memory | 0 | 1 | 1 | 1 | 1 | 1 | 5 | 1 | 1 | 7 |
| Restricted Access | 0 | 2 | 1 | 1 | 3 | 4 | 11 | 3 | 3 | 17 |
| Checksum Errors | 0 | n/a | n/a | n/a | n/a | n/a | n/a | n/a | n/a | n/a |
| Total # of Errors | 0 | 6 | 5 | 6 | 7 | 9 | 33 | 1 | 1 | 35 |
| Storage Partitions | n/a | n/a | n/a | n/a | n/a | 1 | 1 | 3 | 1 | 5 |

Computer(s)   110

680

| Upper Limit on Number of times tests met | | | | | | | | | | |
|---|---|---|---|---|---|---|---|---|---|---|
| Test | Network Trans-mission Stage | Parse step to check syntax | Parse step to check semantics | Parse step to check user's rights | Parse step to check if previously parsed | Parse step to generate executable code | Parse Stage (sum of all steps) | Exec-ution Stage | Fetch Stage | Cumu-lative over multiple stages |
| Segmentation Faults | 10 | 10 | 10 | 10 | 10 | 10 | 50 | 10 | 10 | 100 |
| Buffer Overflow | 10 | 10 | 10 | 10 | 10 | 10 | 50 | 10 | 10 | 100 |
| Out-of-Memory | 10 | 10 | 10 | 10 | 10 | 10 | 50 | 10 | 10 | 100 |
| Restricted Access | 10 | 10 | 10 | 10 | 10 | 10 | 50 | 10 | 10 | 100 |
| Checksum Errors | 10 | n/a | n/a | n/a | n/a | n/a | n/a | n/a | n/a | n/a |
| Total # of Errors | 50 | 50 | 50 | 50 | 50 | 50 | 200 | 40 | 40 | 300 |
| Storage Partitions | n/a | n/a | n/a | n/a | n/a | 10 | 10 | 10 | 10 | 50 |

Computer(s) 110

671

Auto-prioritization Table

| Test | Network Trans-mission Stage | Parse step to check syntax | Parse step to check semantics | Parse step to check user's rights | Parse step to check if previously parsed | Parse step to generate executable code | Parse Stage (sum of all steps) | Exec-ution Stage | Fetch Stage | Cumu-lative over multiple stages |
|---|---|---|---|---|---|---|---|---|---|---|
| Segmentation Faults | auto | auto | auto | auto | auto | auto | auto | auto | auto | auto |
| Buffer Overflow | not | not | not | not | not | not | not | not | not | not |
| Out-of-Memory | auto | auto | auto | auto | auto | auto | auto | auto | auto | auto |
| Restricted Access | auto | auto | auto | auto | auto | auto | auto | auto | auto | auto |
| Checksum Errors | auto | auto | auto | auto | auto | auto | auto | auto | auto | auto |
| Total # of Errors | auto | auto | auto | auto | auto | auto | auto | auto | auto | auto |
| Storage Partitions | auto | auto | auto | auto | auto | auto | auto | auto | auto | auto |

Computer(s) 110

672

Prioritization-Direction Table

| Test | Network Trans-mission Stage | Parse step to check syntax | Parse step to check semantics | Parse step to check user's rights | Parse step to check if previously parsed | Parse step to generate executable code | Parse Stage (sum of all steps) | Exec-ution Stage | Fetch Stage | Cumu-lative over multiple stages |
|---|---|---|---|---|---|---|---|---|---|---|
| Segmentation Faults | increase | increase | increase | increase | increase | increase | increase | increase | increase | increase |
| Buffer Overflow | nochange | nochange | nochange | nochange | nochange | nochange | nochange | nochange | nochange | nochange |
| Out-of-Memory | decrease | decrease | decrease | decrease | decrease | decrease | decrease | decrease | decrease | decrease |
| Restricted Access | increase | increase | increase | increase | increase | increase | increase | increase | increase | increase |
| Checksum Errors | decrease | decrease | decrease | decrease | decrease | decrease | decrease | decrease | decrease | decrease |
| Total # of Errors | increase | increase | increase | increase | increase | increase | increase | increase | increase | increase |
| Storage Partitions | increase | increase | increase | increase | increase | increase | increase | increase | increase | increase |

Figure 14:
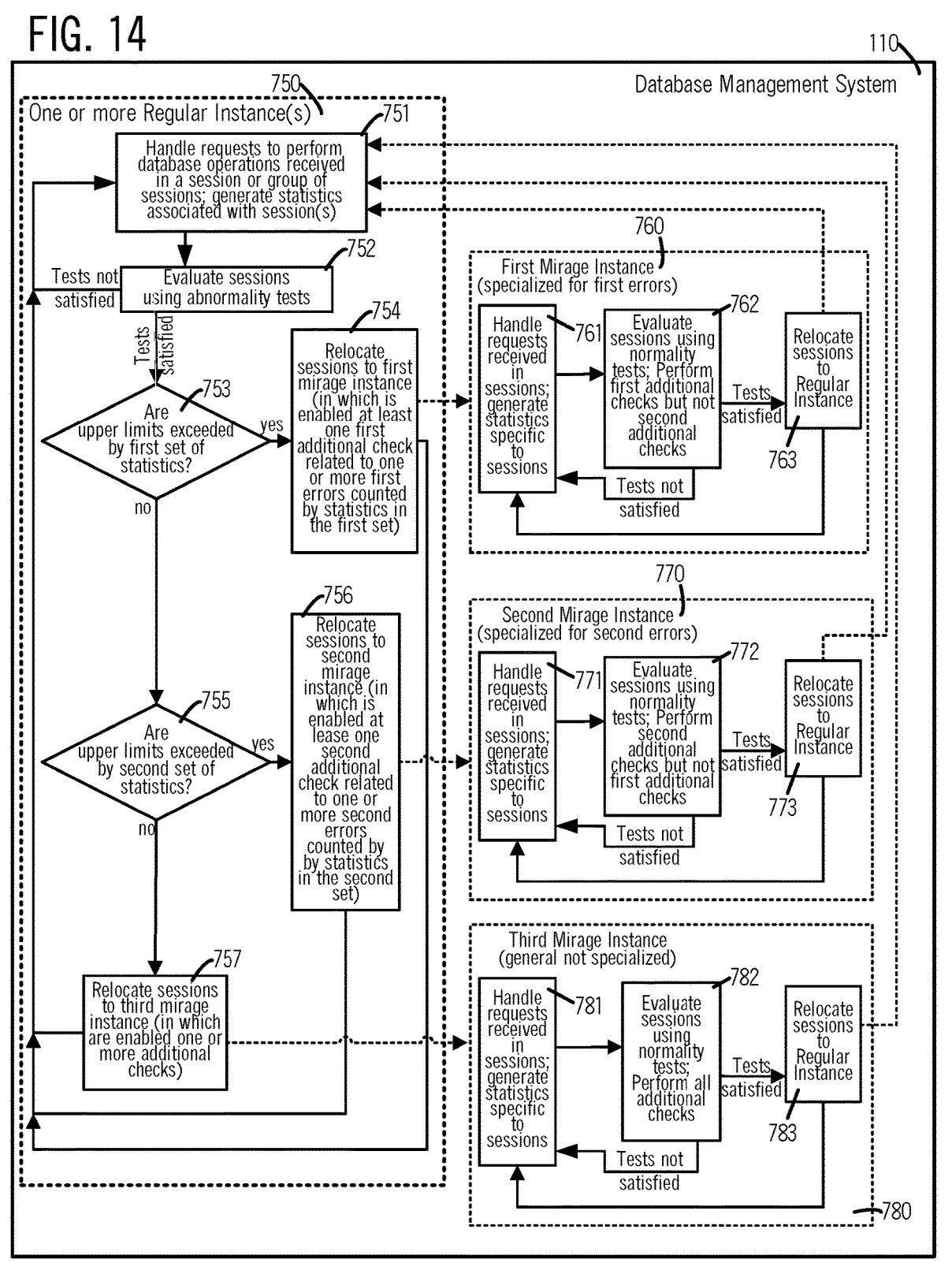

Database Management System

750

One or more Regular Instance(s)

751

Handle requests to perform database operations received in a session or group of sessions; generate statistics associated with session(s)

752

Tests not satisfied ← Evaluate sessions using abnormality tests

Tests satisfied

754

753

Are upper limits exceeded by first set of statistics?

yes → Relocate sessions to first mirage instance (in which is enabled at least one first additional check related to one or more first errors counted by statistics in the first set)

no

760

First Mirage Instance (specialized for first errors)

761

Handle requests received in sessions; generate statistics specific to sessions

762

Evaluate sessions using normality tests; Perform first additional checks but not second additional checks Tests satisfied → Relocate sessions to Regular Instance

763

Tests not satisfied

755

Are upper limits exceeded by second set of statistics?

yes → 756

Relocate sessions to second mirage instance (in which is enabled at lease one second additional check related to one or more second errors counted by by statistics in the second set)

no

770

Second Mirage Instance (specialized for second errors)

771

Handle requests received in sessions; generate statistics specific to sessions

772

Evaluate sessions using normality tests; Perform second additional checks but not first additional checks Tests satisfied → Relocate sessions to Regular Instance

773

Tests not satisfied

757

Relocate sessions to third mirage instance (in which are enabled one or more additional checks)

780

Third Mirage Instance (general not specialized)

781

Handle requests received in sessions; generate statistics specific to sessions

782

Evaluate sessions using normality tests; Perform all additional checks

Tests satisfied → Relocate sessions to Regular Instance

783

Tests not satisfied

MIRAGE INSTANCE OF A DATABASE SERVER

BACKGROUND

An instance of a database server ("database instance") typically includes multiple processes and/or threads that share with one another, an area of memory, e.g. system global area (SGA) in a relational database management system (RDBMS) available from ORACLE Corporation, such as Oracle Database Release 19c, Version 19.1. Such a database management system may contain, in one or more computers, one or more database instances. Multiple database instances may share a single database, which includes control and data files. In such a configuration, each database instance may read/write data from/to a common disk space that contains the database's files, even though each database instance maintains its own separate SGA in memory. See Chapter 13 entitled "Oracle Database Instance" and Chapter 15 entitled "Process Architecture" in a book entitled "Oracle® Database Database Concepts 19c", E96138-01, published January 2019, by Lance Ashdown, Tom Kyte, Joe McCormack, published by ORACLE Corporation, incorporated by reference herein in its entirety as background.

It is known to direct user sessions to database instances. For example, user sessions may be initially directed to database instances for legitimate sessions. When a user's command constitutes suspicious behavior, that user's session can be migrated to a database instance for suspicious users. See US Patent Publication 20160253494 entitled "Dynamically Differentiating Service In A Database Based On A Security Profile Of A User" by Nithya Muralidharan and Daniel ManHung Wong, which is incorporated by reference herein in its entirety as background.

SUMMARY

One or more computers in accordance with the invention are programmed with software to implement a database management system ("DBMS") that includes one or more instances of a database server of a first kind, and one or more instances of a database server of a second kind. In some embodiments, instances of both these kinds of database server can access data stored in a database by the DBMS. The DBMS receives one or more requests (e.g. SQL statements) to perform operations on the database, in a specific session that originates from a specific client application outside the one or more computers in which the DBMS is implemented. The DBMS handles the one or more requests at least partially, in one or more instances of the database server of the first kind ("first kind of instances") or in one or more instances of the database server of the second kind ("second kind of instances"). Handling of a request (also called "request handling") may include, for example, checking, simulating processing of, and/or processing the request in a normal manner, and any one or more of these three acts may be performed alone or in combination, depending on configuration and functionality of the first kind of instance(s) and/or the second kind of instance(s).

Handling of a specific session's requests (also called "servicing") is automatically relocated (e.g. by redirecting a session), from a first instance among the one or more instances of the database server of the first kind to a second instance among the one or more instances of the database server of the second kind. Relocation of request handling of a specific session, from the first instance to the second instance (also called "relegated relocation") causes at least the specific session's requests received after the relocation ("current requests") to no longer be handled in the first instance. Instead, these current requests are handled in the second instance, which may, in some embodiments, additionally handle any previously-received requests ("previous requests"), e.g. if these previous requests have not been successfully handled (e.g. rolled back) in the first instance. At any time after a relegated relocation (described above), the specific session's request handling (or the specific session's servicing) may be again automatically relocated (also called "return relocation"), from the second instance to any instance among the one or more instances of the database server of the first kind, e.g. relocated to the first instance or relocated to a third instance different from the first instance. A result of handling each request of a specific session is transmitted by the DBMS to the specific client application from which the specific session originated, regardless of which kind of instance handles the request.

One advantage of relegated relocation (described above) is that any adverse effect in request handling for a specific session (e.g. crashing of a process, followed by creation of a core dump or a core file/incident file) may not occur in the first instance, e.g. if the specific session's request handling has been already relocated to the second instance. Thus, relegated relocations can make a first instance more available, by minimizing or avoiding adverse effects. One advantage of return relocation (described above) is that a specific session's future requests (received after return relocation) are handled in an instance of the first kind, thereby to return the client application to its original level of service. Also, the return relocation makes the second instance available to handle requests of other sessions relocated thereto, e.g. by other relegated relocations.

A combination of relegated relocation and return relocation (together referred to as a "switch back") enables instance(s) of the first kind and instance(s) of the second kind to cooperate with one another to together service a session, so that abnormal request(s) are handled in instances of the second kind (also called "mirage instances"), followed by normal requests received thereafter being handled in instances of the first kind (also called "regular instances"). This combination of the two relocations may be repeatedly performed multiple times, by moving servicing of a specific session back and forth between these two kinds of instances, in multiple switch backs (e.g. similar to a ball being hit in a ping-pong manner between two courts in a game of tennis doubles, with two players in each court). The number of switch backs may be limited (e.g. by an upper limit thereon).

Relocations may be performed transparent to a client application from which a specific session originates, e.g., in certain embodiments wherein the specific session's destination is a DBMS process (such as a dispatcher or load balancer) separate from processes within instances of the database server. This DBMS process may receive requests via sessions and provide these requests to any instance of the database server, e.g. first instance. In some embodiments, when a relocation is to be performed, the DBMS process is notified, and the client application is not notified. When notified, the DBMS process stops providing requests received from the client application in the specific session to the first instance, and starts providing this specific session's requests from the client application to a second instance.

In alternative embodiments, relocation of request handling of a session is not transparent to a client application. So, in these alternative embodiments, the client application is notified of relocation of a specific session e.g. by a regular instance when a relegated relocation is to be performed, or by a mirage instance when a return relocation is to be performed. In the just-described alternative embodiments, the specific session's destination may be a process within a regular instance or alternatively the specific session's destination may be a process within a mirage instance. When notified of a relocation, the client application moves the specific session's destination, e.g. from a regular instance's process to a mirage instance's process or vice versa.

In certain embodiments, a relegated relocation may be performed at least partially in response to occurrence of a predetermined event during handling of request(s) of a specific session and/or at least partially in response to evaluation of statistics generated based on handling of request(s) of the specific session. An example of the predetermined event is that the number of times a specific table is accessed, in processing a request, exceeds a limit thereon. Another example of a predetermined event is an error, such as buffer overflow. Thus, in such embodiments, in response to occurrence of the predetermined event, a regular instance relocates handling of the specific session to a mirage instance.

In some embodiments, a specific session's statistics are generated periodically and/or in response to an event (such as the just-described predetermined event), based on the handling of request(s) in the regular instance. The statistics may be related to the amount (e.g. percentage) of consumption (or utilization) of system resources in handling of requests of the specific session in the regular instance and/or the statistics may be generated by counting errors that arise in the handling of requests of the specific session in the regular instance. In several embodiments, if no mirage instance exists when a relegated relocation needs to be performed, a regular instance automatically creates one or more mirage instances, e.g. by issuing a command to cluster ware software included in software of the DBMS ("DBMS software").

A predetermined event, at least partially in response to which a session's request handling is relocated from a regular instance, may be reported to a client application (from which the specific session originated) by the regular instance, although in alternative embodiments this reporting may be done by a mirage instance instead of the regular instance. In certain embodiments, a regular instance may not report a predetermined event to a client application before a session's request handling is relocated (e.g. an event indicating excessive access of a specific table or excessive number of storage partitions being accessed). Thereafter, if request handling of the specific session does not result in any error or other abnormal event in the mirage instance (e.g. when the mirage instance has more resources and is less busy than the regular instance), the mirage instance may also not report to the client application, the predetermined event that occurred in the regular instance. Whether or not to report such a predetermined event (e.g. excessive resource consumption) that occurs in a regular instance may be made configurable by a database administrator, e.g. via a configuration table in the database. Certain predetermined events (e.g. segmentation fault or restricted access error) may cause processing of a request to be aborted, in which case it is reported to the client application, and this reporting may be by the regular instance or by the mirage instance.

Handling of request(s) of a specific session may be automatically relocated from a mirage instance to any regular instance by return relocation as noted above, e.g. in response to the mirage instance finding the specific session to be normal, e.g. based on evaluation by applying tests to statistics related to handling of request(s) of the specific session in the mirage instance. Hence, in such embodiments, handling of request(s) of the specific session (or servicing of the specific session) by mirage instance(s) is limited automatically to a duration that is variable and lasts for only as long as the specific session is found to be abnormal, e.g. based on the statistics.

In some alternative embodiments, a mirage instance may be implemented to never relocate to a regular instance, handling of request(s) of any sessions that satisfy one or more predetermined test(s), so that the mirage instance implements a honey-pot at least for these sessions. The just-described one or more predetermined test(s) may be based on, for example, the number of times a session's requests' handling has been relocated and/or an indication of maliciousness, which may be derived from information related to these sessions, in any manner readily apparent to a skilled artisan, in view of this description.

In many embodiments, request handling of one or more session(s) of one or more client application(s) may be started initially in a mirage instance, and thereafter on being found to be normal by their evaluation based on statistics thereof, automatically relocated to a regular instance. For example, a database administrator (DBA) may set up a new client application's sessions to be directed initially to mirage instance(s) when the DBA is unsure of effects of the new client application and wants to test it. Thus, for as long as this client application's sessions are found to be not normal, these sessions are serviced in mirage instance(s).

In some embodiments, sessions are individually evaluated and their request handling individually relocated automatically between regular and mirage instances e.g. when resource utilization is below minimum limits, which can be different in these two kinds of instances. When minimum limits are exceeded, sessions may be automatically evaluated and handling of request(s) therefrom relocated in groups in certain embodiments, with the grouping based on origin and/or destination of a session. For example, sessions may be evaluated in groups, in response to resource utilization exceeding a limit as follows. Sessions may be grouped at any one of the following levels (also called "resolution level"): the name of a module within a client application, or client application's name, or an IP address shared by multiple client applications within a client computer, or multiple IP addresses within a domain.

The just-described resolution level may be configurable by the DBA in some embodiments, or automatically determined in other embodiments, or any combination thereof depending on the embodiment. Also, in some embodiments, one or more sessions of a client application may be treated as abnormal and their request handling relocated simultaneously with handling of request(s) of an abnormal session which for example may be of the same client application (or of the same IP address or of the same domain), even when these sessions' statistics are normal, in response to a pattern being found, e.g. if the normal sessions' statistics are found to be in pattern with statistics of the abnormal session and/or if a certain number of sessions or a certain percentage of sessions in a group have been relocated to a mirage instance.

In certain embodiments, one or more tests which are automatically applied to statistics in the evaluation(s) may find sessions to be abnormal (or alternatively normal), for any reason, e.g. reasons related to maliciousness such as use by a hacker, and also for reasons unrelated to maliciousness such as poorly written requests, and/or errors in software of the database server. Specifically in some embodiments, statistics tested in the evaluation(s) include measures of utilization of resources, such as number of storage partitions, which can become excessive for non-malicious reasons. As another example, the statistics being tested may include counts of transmission errors in a communications network, between a client computer in which a client application executes and a server computer in which a regular instance and/or a mirage instance executes. Although transmission errors arise even before a request is received by the database server software being executed in an instance, counts of these errors may be included in tests to evaluate normality and abnormality of session(s), as described above.

In some embodiments, statistics (also called "evaluation statistics", which may be specific to each session or specific to a group of sessions, depending on resolution level), to which tests are automatically applied to evaluate normality and abnormality of sessions, include counts of occurrences of an error (such as a segmentation fault) in using a system resource, and/or a measure of utilization of a system resource (such as number of storage partitions accessed). Depending on the embodiment, one or more evaluation statistics may be generated internally within the database management system (also called "DBMS-internal statistics") and used in evaluations in regular and mirage instances, which enables these evaluations to be performed in greater detail than possible by use of other statistics (also called "externally-accessible statistics") that are accessible outside the database management system. For example, DBMS-internal statistics may be generated by a database server at each stage among multiple internal stages of handling a request within the database server, such as parsing stage, execution stage and fetch stage, and furthermore at even greater detail (also called "finest granularity") within each step among multiple steps within an internal stage, such as the following steps within the parse stage: syntax checking step, semantic analysis step, a step to check if previously parsed, and an executable code generation step.

In certain embodiments, the DBMS-internal statistics, which are generated and evaluated in DBMS-internal mirage embodiments to determine abnormality or normality of one or more session(s), are not accessible to applications outside the DBMS (also called "DBMS-external application"), such as an application developed by a non-DBMS vendor. For example, certain DBMS-internal statistics may be generated and used at a finest granularity in processing a request (e.g. an SQL query), which enables these statistics to be more detailed than any externally-accessible statistics that can be generated and used by a DBMS-external application. This is because a DBMS-external application may at most receive one or more high level return codes of success or failure from DBMS's processing of a request, but such return code(s) provide just summarized indication(s) normally returned by the database management system.

Another advantage of DBMS-internal mirage embodiments is that a single patch (also called "DBMS-internal patch") can be created, to include all changes in DBMS software, including any change in the database server software (e.g. a new stage in handling a request, or a new step within a stage) and corresponding change(s) in evaluation of statistics and/or tests. Such a single DBMS-internal patch can be made seamless, so that changes to DBMS-internal mirage embodiments are transparent to the customer. In contrast, a non-DBMS vendor must wait for changes to a database server software to be released by the DBMS vendor, and then develop and test changes to the DBMS-external application to ensure proper working with the newly released version of the database server software, and only then the customer may update the DBMS-external application with these changes, which makes the update not transparent to the customer.

Tests used in evaluating sessions for abnormality in regular instance(s) and/or tests used in evaluating sessions for normality in mirage instance(s) may be automatically enabled or disabled (e.g. periodically), based on a criterion which may be either external or internal to a server computer in which the database server software executes. Examples of internal criteria are utilization of resources in the server computer or a time of day in the server computer. An example of an external criterion is an indication of threat level of malicious cyber activity, which may be computed based on news feeds or directly retrieved from a source on the Internet. Specifically, when a value of the criterion, e.g. utilization of a resource, such as % of CPU or % of memory at machine level in a server computer, is found in the above-described evaluation to be above an upper limit thereon, one or more tests (and optionally generation of evaluation statistics used therein) may be automatically disabled, e.g. to improve the server computer's performance. In some embodiments, different priorities are assigned to (and become associated with) tests and/or to evaluation statistics in the tests, and depending on the embodiment, these associations may be predetermined and unchangeable, or alternatively these associations may be initially predetermined and automatically changed thereafter. In some embodiments, the priorities that are assigned may vary between a most important priority (e.g. priority 1) which is associated with the most frequently used (or most important) tests/statistics, and a least important priority (e.g. priority 4) associated with the least frequently used (or least important) tests/statistics. In alternative embodiments, the just-described order of values may be inverted, e.g. priority 1 may be associated with the least frequently used (or least important) tests/statistics and vice versa.

Regardless of whether the just-described associations are dynamic or fixed, in several embodiments, during normal operation, as the criterion's value (e.g. % CPU used) is found to increase (e.g. determined periodically), successively more important priorities are automatically disabled, in turn automatically disabling use of respective statistics (or tests applied to these statistics, also called "related tests") with which the disabled priorities are associated, in the evaluation of sessions. Thus, when the criterion's value is at one end, such as highest (e.g. >90% CPU used), only the most important priority (e.g. priority 1) is enabled so that only the most important tests associated therewith are enabled, and all other priorities disabled so that all other tests are disabled. Correspondingly, as the criterion's value (e.g. % CPU used) is found to decrease, successively less important priorities are automatically enabled, in turn automatically enabling use of respective tests (and/or statistics used in the tests) with which the enabled priorities are associated, in the evaluation of sessions. So, when the criterion's value is at an opposite end, such as lowest (e.g. <30% CPU), all priorities including the least important priority (e.g. priority 4) are enabled thereby automatically enabling all tests, in some embodiments.

In several embodiments, time of day is used as the above-described criterion, and when this criterion indicates working hours (e.g. 9 am to 5 pm) on a weekday (e.g. Mon-Fri), less important priorities are automatically disabled in turn automatically disabling use of respective tests (and/or statistics used therein) with which the disabled priorities are associated. So, when this criterion indicates currently it is a working hour on a weekday, only the most important priority is enabled and all other priorities are disabled in a regular instance of the database server, so that only the most important tests are automatically used in the evaluation of sessions. Thus, in busy times, less important checks are disabled, which may save computational resources in the server computer and keep its performance good as seen by one or more sessions. When this criterion indicates currently it is an hour in the weekend (e.g. Saturday and Sunday), all priorities are automatically enabled and no priority is disabled in a regular instance, in turn automatically enabling use of all tests in the evaluation of sessions. Priorities in mirage instances may be configured identical to regular instances as just described or configured differently, depending on the embodiment.

In some alternative embodiments, when the criterion indicates working hours on a weekday all priorities are automatically enabled and no priority is disabled in regular instances, enabling all tests in the evaluation of sessions. In these alternative embodiments, when this criterion indicates currently it is an hour in the weekend, only the most important priority is automatically enabled and all other priorities are disabled in regular instances, so that only the most important tests are automatically used in the evaluation of sessions.

In certain embodiments, an indication of threat level is used as the above-described criterion, and as this criterion changes (e.g. from 1 to 4, or low to severe), successively less important priorities are automatically enabled, in turn enabling use of respective statistics (or related tests) with which the enabled priorities are associated. In some embodiments, in regular instances of a database server, at a highest threat level (e.g. severe), all priorities are enabled so that all tests are automatically enabled. Depending on the embodiment, more computational resources may be added by a DBA to support testing required by enabling of all priorities and/or to simultaneously support sessions from a large number of client applications. Correspondingly, in regular instances, at a lowest threat level (e.g. low), only the most important priority is automatically enabled and other priorities are disabled so that only the most important tests are automatically enabled and rest of the tests are disabled, and the computing performance may increase. Mirage instances may be configured to use priorities identical to regular instances as just described or configured to use priorities differently, depending on the embodiment. In some embodiments, in mirage instances, at a lowest threat level (e.g. low), two (or more) important priorities may be automatically enabled with all other priorities disabled, so that important tests associated with these two (or more) important priorities are enabled. In the just-described embodiments, more tests are automatically used in session evaluation in mirage instances relative to session evaluation in regular instances, at the same threat level (e.g. low). In other embodiments, mirage instances may be configured to automatically use fewer tests in evaluating sessions, relative to the number of tests used in session evaluation by regular instances.

Limits on resource utilization (or other such criterion), above which certain tests (or statistics used therein) of a particular priority are automatically disabled, may be different in regular instances relative to corresponding limits in mirage instances. Moreover, priorities of statistics (or tests thereon) in mirage instances may be different from priorities of corresponding statistics (or related tests) in regular instances. Also, the statistics' priorities may be automatically changed, based on the frequency with which respective tests are met, e.g. statistics checked in abnormality tests (described in the next paragraph) that are infrequently or never satisfied may be assigned the least important priority (e.g. priority 4), and statistics checked in abnormality tests that are most frequently or always satisfied assigned the most important priority (e.g. priority 1). Additionally, when a criterion of resource utilization (e.g. CPU utilization or memory utilization) has a value below a lower limit thereon (or above an upper limit thereon in alternative embodiments), one or more additional tests for normality may be automatically enabled in mirage instance(s), to increase checking of statistics therein. In some embodiments, e.g. when resource utilization is in a highest range, testing is automatically disabled on certain statistics at a finest granularity of processing, with testing automatically enabled on cumulative statistics that are generated at a coarser granularity of processing.

Tests for abnormality may use thresholds that when exceeded by corresponding statistics indicate abnormality (also called "first" thresholds). Similarly, tests for normality may use thresholds that must not be exceeded (also called "second" thresholds). In certain embodiments, the second thresholds in one or more specific tests applied by a mirage instance are deliberately made different from (e.g. lower than) first thresholds of the same one or more specific tests applied by a regular instance, so that sessions which are found to be abnormal have their request handling relocated easily from regular instance(s) to mirage instance(s) but not relocated back easily. Specifically, in certain embodiments, strictness used in normality evaluation of sessions by use of the second thresholds is greater than a corresponding strictness used in abnormality evaluation by use of the first thresholds. The greater strictness ensures that sessions which are relocated to a mirage instance, stay longer in the mirage instance until its stricter thresholds (e.g. second thresholds) are met, and hence not easily relocated back.

Depending on the embodiment, certain tests may have thresholds configured in an opposite manner, wherein strictness in normality evaluation by application of these tests in a mirage instance is lesser than corresponding strictness in abnormality evaluation by application of these tests in a regular instance, so that servicing of sessions returns quicker from the mirage instance to the regular instance. An advantage of this quicker return is that sessions which are working correctly may receive better performance from the database management system, e.g. when a regular instance executes using more computational resources than a mirage instance (e.g. when the regular instance uses higher capacity hardware components than the mirage instance, as described below).

The above-described evaluation may be repeated at a periodic time interval, e.g. every second, and optionally additionally in response to a predetermined event, such as crashing of a process in handling a request received in the session. A periodic time interval, at which evaluation of sessions by testing statistics for normality is repeated by mirage instance(s) may be automatically increased for specific session(s), when the specific session(s) are found to be relocating too often between mirage instance(s) regular instance(s), e.g. more number of relocations than a preset limit within a specified duration of time (e.g. one hour). Such an increase, in the periodic time interval of evaluation, reduces usage of resources due to excessive relocations of the specific sessions that are repeatedly found to be abnormal by regular instances and repeatedly found to be normal by mirage instances. In some embodiments, relocation of a session between regular and mirage instances is performed transparently to a client application that originates the session, whereby the client application does not know whether it is a regular instance or a mirage instance of a database server that is actually responding to its request(s) in the session.

Optionally, an indication of abnormality or normality in a client application's location by an external news source may be used by evaluations of certain embodiments, in determining abnormality and normality of sessions, in regular and mirage instances respectively.

In certain embodiments, a mirage instance of a database server is configured identical to a regular instance of the database server, e.g. the mirage instance executes using computational resources which have identical hardware components that are interconnected identically as the regular instance, and these two kinds of instances may execute the same version or different versions of software of a specific database server e.g. created by a specific DBMS vendor. One difference between these two kinds of instances of a database server is identification of each instance's kind, to be one of a first kind (e.g. "regular") or a second kind (e.g. "mirage"), and this identification may be stored in a column in a table (also called "cluster table"), e.g. in a database accessible through the database server. In some embodiments, a mirage instance may access the same database as a regular instance, and use the database for read and write operations identical to the regular instance, e.g. by executing at least some or (or in some embodiments, all of) the same software, as the regular instance. The just-described database may include one or more files (such as a control file, one or more data files, and redo log files) that are stored on one or more disk(s) or other non-volatile media. In some embodiments one or more of these database files are shared by both kinds of instances which have shared access to disk(s) or non-volatile media wherein these database files are stored.

In several embodiments, mirage instance(s) are configured to open a database for read operations only, and such mirage instance(s) use information obtained therefrom (also called "DBMS-internal information") to only check or only simulate processing of requests without executing the requests. In certain embodiments, DBMS-internal information, which is used by mirage instances to determine abnormality of requests, is not accessible to an application outside the DBMS (also called "DBMS-external application"). When requests are found to be normal by the checking or by the simulation, the respective sessions (in which the requests are received) are relocated to a regular instance which then executes these requests on the database in a normal manner.

When a request is found by the checking or by the simulation in a mirage instance to be abnormal (e.g. request is determined to be too resource intensive to be executed, due to the request requiring logging which will take up disk space), the request is not executed i.e. execution of the request is skipped. Thus, in response to receipt of such an abnormal request, the mirage instance returns an error code to the client application, e.g. via a session in which this request was received. Also, the mirage instance continues to handle (e.g. by checking or by simulation) additional requests received via the just-described session, and for as long as these additional requests are abnormal, the mirage instance returns error codes to the client application. Similarly, when a request is found by a regular instance to be abnormal, the request is not executed, and instead a client application that sent the abnormal request has its session redirected to a mirage instance. Depending on the embodiment, either the regular instance or the mirage instance returns an error code to the client application in response to the abnormal request.

In certain embodiments, a mirage instance is installed in and executes in computational resources with lower capacity hardware components (e.g. fewer processors and smaller-sized memory) than computational resources in which a regular instance is installed and executes, so the above-described relegated relocation is a down-grading in service level of the specific session.

In some embodiments, software that is executed by a mirage instance (also called "mirage instance software") may be packaged separately, with a separate release version, relative to software executed by a regular instance (also called "regular instance software"), although depending on the embodiment, at least some of, or a majority of, or all of the mirage instance software is identical to regular instance software. In several embodiments, execution of a mirage instance is started with a configuration (called "mirage instance configuration") which is different from the configuration of a regular instance (called "regular instance configuration"). For example, a mirage instance configuration may allocate memory shared among processes of the mirage instance to be of a size smaller relative to corresponding memory allocated by the regular instance configuration. As another example, a mirage instance configuration may allocate for use in execution of processes of the mirage instance, processors that are fewer in number and/or slower relative to a corresponding processors allocated by the regular instance configuration.

In some embodiments, the number of mirage instance(s) in a database management system may be automatically increased, e.g. by automatically starting execution of one or more additional mirage instance(s), when one or more utilization statistic(s) in the mirage instance(s) exceed corresponding upper limit(s) thereon, e.g. when the average number of sessions whose requests are being handled in the mirage instance(s) exceeds 100, or when average CPU utilization in the mirage instance(s) exceeds 80%. One or more sessions whose requests are being currently handled in existing mirage instances then have their request handling relocated to the new mirage instance(s). In some embodiments, the number of mirage instance(s) may be automatically decreased by shutting down one or more mirage instance(s), when one or more utilization statistic(s) in the mirage instance(s) are below corresponding lower limit(s) thereon, e.g. when the average number of sessions being handled in the mirage instance(s) is less than 10, or when the average CPU utilization in the mirage instance(s) is below 20%. Before the just-described shut down, handlings of requests of sessions that are currently performed in any mirage instances to be shut down are relocated to one or more other mirage instances that are not to be shut down (as utilization statistics in other mirage instances are above corresponding lower limit(s)).

In some embodiments, the statistics that are used to decide relocation of a session's request handling are unrelated to any indication of maliciousness, such as measures of utilization of resources, or counts of errors in transmission of requests over a network, from a client application to the database management system. In addition, a mirage instance may check a history of errors in handling, to determine whether a specific error, whose occurrence is counted by a statistic that exceeds its threshold in a regular instance, occurred in handling previous requests identical at least in part to requests received in the one or more sessions, before a change in the database management system. If the error did not previously occur until the change, the mirage instance may automatically relocate the request handling of the session (or group of sessions) to a regular instance after installation therein of a new software update associated with the error, or alternatively automatically relocate the request handling of the session (or group of sessions) to a different regular instance that is executing a prior version of the database server in which the error did not previously occur. Moreover, in handling a session's requests, a mirage instance may access a mirage database and record calls thereto, followed by relocating the session's request handling to a regular instance implemented as a logical standby which automatically replays the recorded calls on its database.

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIG. 2D illustrates, in a continuation of the timing diagram of FIG. 2C, at a later sequence of times T5-T7, data flows and acts of regular instance(s) 130 and mirage instance(s) 120 in database management system 110, in continuing to handle requests for database operations in sessions U, V . . . X, Y from client applications A . . . I . . . N.

FIG. 3A illustrates, in a flow chart, an act 131 first performed by regular instance(s) 130 for any sessions U, V . . . X, Y that are configured to initially be handled therein as illustrated in FIG. 2A and an act 121 first performed by mirage instance(s) 120 for any sessions U, V . . . X, Y that are configured to initially be handled therein as illustrated in FIG. 2C, in certain embodiments of the invention.

FIG. 3B illustrates, in a flow chart, acts 351-359 and acts 361-371 that are used in some embodiments to implement operation 161 of an auto-tune module 160 in FIG. 3A.

FIG. 12A illustrates DBMS-internal statistics stored in a region 614 (also called memory region 614) in a portion of memory (e.g. in main memory 1060 shown in FIG. 16), which is allocated for internal use by database management system 110 of several embodiments of the invention.

FIG. 12B illustrates a thresholds table 640 included in database management system 110 of several embodiments of the invention.

FIG. 12C illustrates an enable/disable table 650 that shows enable and disable status of statistics (and thereby to related tests), included in database management system 110 in certain embodiments of the invention.

FIG. 12D illustrates a priorities table 660 that shows priorities assigned to statistics and/or to related tests included in database management system 110 in certain embodiments of the invention.

FIGS. 12E and 12F illustrate tables 681 and 682 that show enable and disable status of priorities in several ranges of resource utilization (also called "load") at machine level in computers of regular instances and mirage instances respectively, in certain embodiments of the invention.

FIG. 12G illustrates another region 690 in another portion of memory (e.g. also in main memory 1060) which is organized and used differently from memory region 614 shown in FIG. 12A, and used for storing statistics and priorities, in some embodiments of the invention.

FIG. 12H illustrates additional checks 531 included in database management system 110 of some embodiments of the invention.

FIG. 12I illustrates an additional thresholds table 691 used by a mirage instance 120 in a manner similar to table 640 of FIG. 12B used by a regular instance 130 in a database management system 110 of several embodiments of the invention.

FIG. 12J illustrates a cluster table 692 that identifies all instances of a database server in a database management system 110 of several embodiments of the invention.

FIG. 12K illustrates an error history table 694 used in some embodiments of a database management system 110 to store and use errors that occur in processing requests.

FIG. 12L illustrates a sessions table 696 used in some embodiments of a database management system 110 to store and use information specific to a session.

FIGS. 12M and 12N illustrates tables 683 and 684 to enable priorities depending on threat level that are used by regular instances 130 and mirage instances 120 respectively, in some embodiments of a database management system 110.

FIGS. 12O and 12P illustrates tables 685 and 686 to enable priorities depending on current time of day and day of week that are used by regular instances 130 and mirage instances 120 respectively, in some embodiments of a database management system 110.

FIG. 12Q illustrates a table 670 used by a regular instance 130 of a database management system 110 to store and use a number of times that specific tests are met, counted across all sessions within a predetermined duration, e.g. one hour.

FIG. 12R illustrates a table 680 of upper limits on the number of times that specific tests may be met, which on being found to be exceeded in act 367 (FIG. 3B) results in associated priorities being changed by act 368 (FIG. 3B), in some embodiments of a database management system 110.

FIG. 12S illustrates a table 671 used by a regular instance 130 of a database management system 110 to store and use a number of times that specific tests are met, counted across all sessions within a predetermined duration, e.g. one hour.

FIG. 12T illustrates a table 672 used by a regular instance 130 of a database management system 110 to determine whether to increase, decrease, or keep unchanged, associated priorities in table 660 of FIG. 12D, when performing acts 368 and 370 of FIG. 3B in some embodiments.

FIG. 14 illustrates, in a flow chart, acts 751-757 performed by one or more regular instance(s) 750, acts 761-763 and 771-773 of first and second mirage instance(s) 760 and 770 that are specialized to perform additional checks for errors of a first category and errors of a second category respectively, and acts 781-783 of a third mirage instance 780 configured to perform all additional checks, in some embodiments of the invention.

DETAILED DESCRIPTION

In several embodiments in accordance with the invention, a database management system (DBMS) 110 executing in one or more computer(s) 100, receives in an act 101 (FIG. 1A), a request to perform database operation(s) via a session X that originates from a client application I, which may be any of multiple client applications A . . . I . . . N within one or more computers 911, 912, 913, together referred to as computer(s) 910.

Client applications A . . . I . . . N may be, for example, different processes within a single application executing in computer(s) 910, or may be multiple processes of corresponding multiple applications, depending on the embodiment. A specific client application I which sends, via a session X, one or more request(s) to perform database operations may be identified by, for example, Internet Protocol (IP) address, and/or by domain name, and/or by geographic area (such as a city, a county, a state, a country, or a continent), host name(s) of computer(s) 910, application name(s) within computer(s) 910, and process name within application, etc.

Request(s) to perform database operation(s), which are received from client applications A . . . I . . . N by DBMS 110 may be, for example, calls to large objects, XML stores, or SQL statements, or PL/SQL statements or other application programming interfaces (APIs) used to communicate with DBMS 110. Specifically, in some embodiments, a request received by DBMS 110 may be in the form of a PL/SQL statement or an SQL statement, including either a query such as a SELECT statement or a DML operation, such as an INSERT or UPDATE statement, or any other statement in a database access language.

Figure 1A:
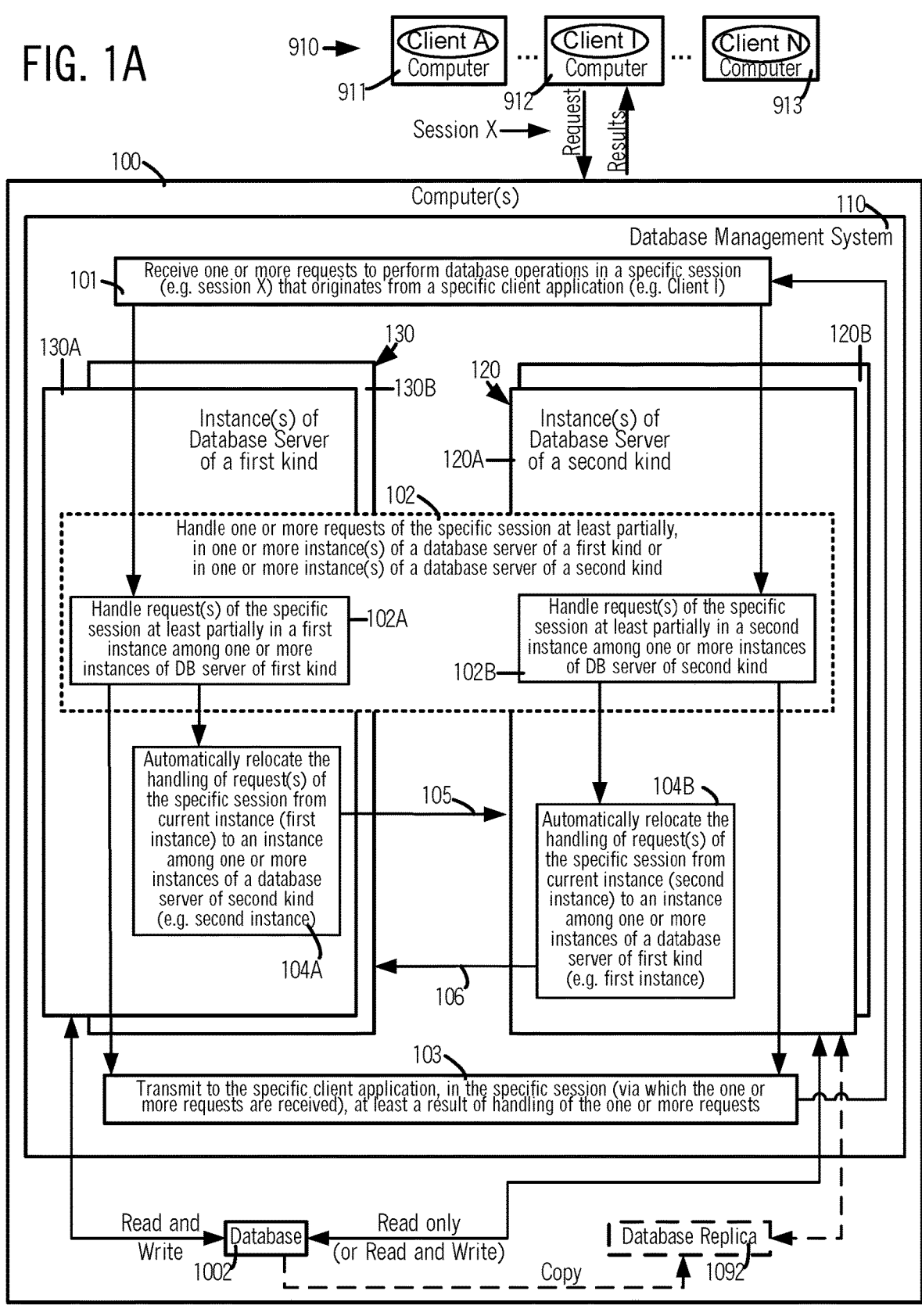
FIG. 1A illustrates, in a high level flow chart, acts in one or more computer(s) 100 performed by a database management system 110 that includes one or more instance(s) 130 (e.g. instances 130A and 130B) of a database server of a first kind and one or more instance(s) 120 (e.g. instances 120A and 120B) of a database server of a second kind, in accordance with the invention.

DBMS 110 (FIG. 1A) includes one or more instances 130 of a database server of a first kind, and one or more instances 120 of a database server of a second kind. A specific request received in act 101 is handled by DBMS 110 in an act 102 (FIG. 1A). Act 102 is performed at least partially in one or more instance(s) 130 (e.g. in act 102A in instance 130A) and/or in one or more instance(s) 120 (e.g. in act 102B in instance 120A), as described in the following examples.

In one example, in act 102A, instance 130A performs database operations specified by the request (e.g. in one or more SQL commands) received in act 101 on database 1002 in a normal manner, and completes act 102A with no errors or abnormal events (and, in this example, act 102B is not performed on this request). On completion of act 102A, database management system 110 performs act 103 (FIG. 1A) to transmit results of handling the request (e.g. one or more rows of data and a success code) via session X to client application I from which the request was received.

In another example, in performing (or on completion of) act 102A, instance 130A determines that session X is to not be serviced by itself (e.g. due to occurrence of an error or a predetermined event), and goes to act 104A. In act 104A, instance 130A automatically relocates request handling for session X from itself to one of instances 120 of the database server of a second kind, such as instance 120A. In performing act 104A (also called "relegated relocation"), instance 130A may transmit a message (as shown by arrow 105 in FIG. 1A) to indicate that instance 120A is to henceforth service session X. This message (indicating relegated relocation) may be transmitted to a process of DBMS 110 that performs act 101 (e.g. dispatcher 111 described below), and such a relocation may be transparent to the client application I by not notifying the client application I. In alternative embodiments, the just-described message is transmitted to client application I (see FIG. 1B, described below), so the relocation is not transparent to client application I.

After act 104A, requests from client application I that are received by act 101 ("current requests") are provided to act 102B in instance 120A. Thus, after act 104A, request handling of session X is performed by instance 120A in act 102B, e.g. by accessing data in database 1002 or in database replica 1092, depending on the embodiment. Results of instance 120A performing database operations identified by request(s) of session X are transmitted by DBMS 110 in act 103 (FIG. 1A) via session X to client application I.

In some embodiments, in addition to transmitting a relegated relocation message (as shown by arrow 105 in FIG. 1A), instance 130A may additionally transmit to instance 120A, a request that was previously received in act 101, e.g. if this previous request was not successfully handled (e.g. rolled back) in instance 130A. In such embodiments, instance 120A handles this previous request before handling any requests received by act 101 after relocation ("current requests").

Instance 120A may, at any time, e.g. before, during, or after act 102B, determine that session X is to not be serviced by itself (e.g. based on success in processing, or in simulating processing of, or in checking a request), and perform act 104B. In act 104B, instance 120A automatically relocates request handling for session X from itself to one of instances 130 of the database server of the first kind, such as instance 130A. In performing act 104B (also called "return relocation"), instance 120A may transmit another message (as shown by arrow 106 in FIG. 1A) to indicate that instance 130A is to henceforth service session X. The just-described message for the return relocation may be transmitted to a process of DBMS 110 that performs act 101 (e.g. dispatcher 111, described below), or may be transmitted directly to client application I (see FIG. 1B, described below). Hence, after act 104B, requests from client application I that are received by act 101 are provided to act 102A in instance 130A. Thus, request handling of session X is thereafter performed in act 102A, in the normal manner.

Accordingly, request handling in act 102 may be performed at least partially in first kind of instance(s) 130 or in second kind of instance(s) 120, and relocated therebetween by a relegated relocation (see arrow 105 in FIG. 1A) and by a return relocation (see arrow 106 in FIG. 1A). The just-described combination of relegated relocation and return relocation (together referred to as a "switch back"), enables DBMS 110 to use first kind of instance(s) 130 to handle normal requests even in situations wherein these normal requests are received in a specific session after receipt of abnormal requests therefrom which are handled in second kind of instance(s) 120. Therefore a temporary abnormality in a session's requests is handled efficiently by DMBS 110, in many embodiments of the type described herein.

In some embodiments, a client application I may be connected via session X (see FIG. 1A) to a process (e.g. dispatcher 111 in FIG. 2A) within DBMS 110. Dispatcher 111 may receive one or more requests to perform database operations from multiple client applications A . . . I . . . N, and use one or more identifiers of a specific client application (described above), to send requests to a process (e.g. one of processes 139 in FIG. 2A) in one of instances 130, e.g instance 130A. Instances 130 execute software of a database server that responds to requests, by accessing data in a database 1002, which may be, for example, a relational database. Results of handling a request in an instance 130A are returned (e.g. by process 139 and dispatcher 111) to client application I, via the just-described session Y. In certain embodiments, a session can have different identifiers, in a client application and in an instance of the database server in DBMS 110. Although dispatcher 111 is illustrated in FIGS. 2A, 2B, 2C, 2D, 4A, 4B, 6A, 6B and 11A-11D (described below), in other embodiments, such a process within DBMS 110 may be, for example, a listener or a connection manager, or a load balancer any or all of which may be included in such embodiments of DBMS 110.

Figure 1B:
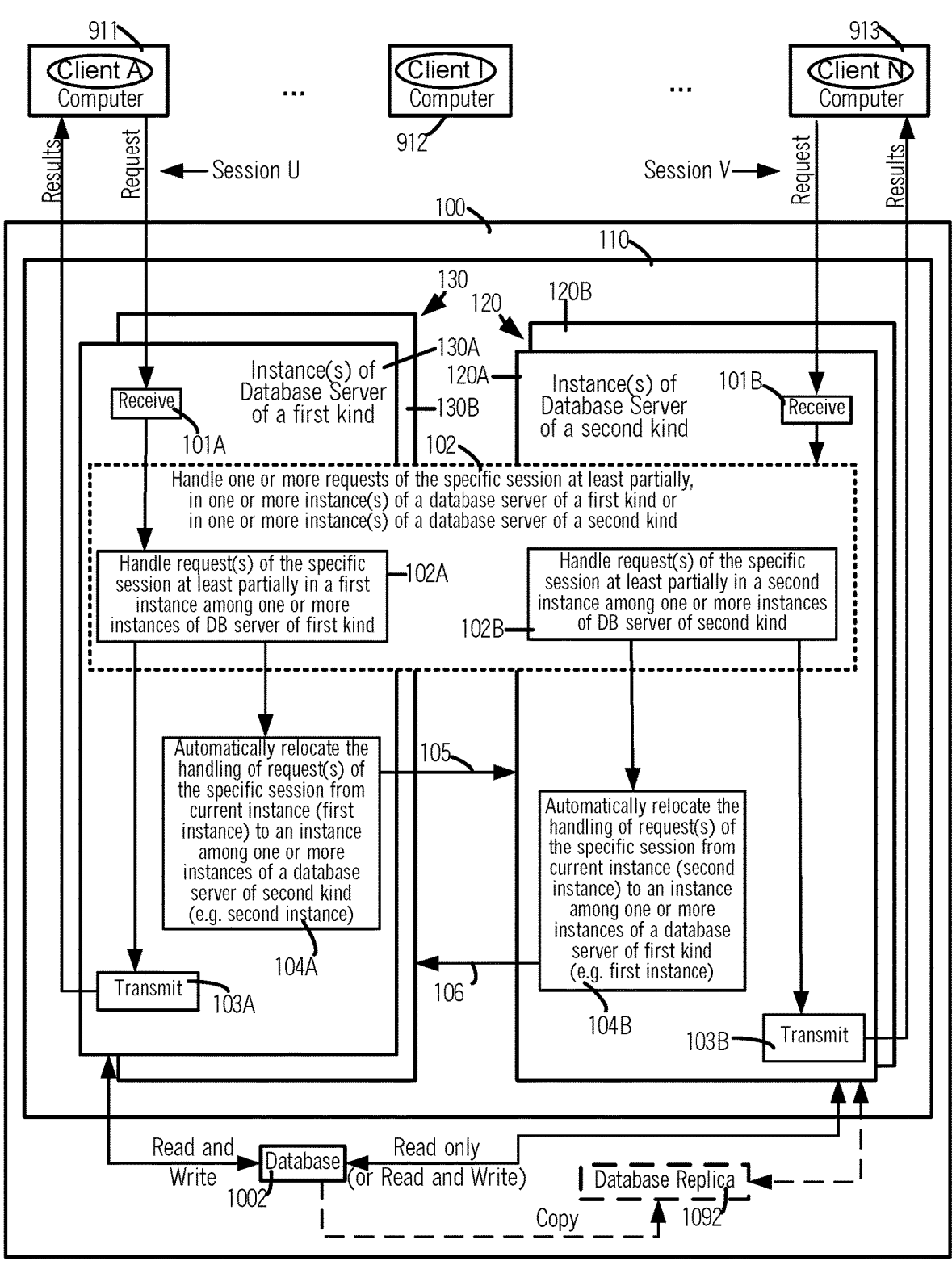
FIG. 1B illustrates, in another high level flow chart, database management system 110 of FIG. 1A, wherein instance 130A (also called "regular instance") receives requests from and transmit results to client application A in acts 101A and 103A respectively and instance 120A (also called "mirage instance") receives requests from and transmit results to client application N in acts 101B and 103B respectively, depending on the embodiment.

In several embodiments of DBMS 110 (FIG. 1B), each of instances 130A, 130B and each of instances 120A, 120B receives requests from and transmits results to a client application directly, without using dispatcher 111 to receive and transmit them (as described in the preceding paragraph above). In an illustrative example, dispatcher 111 is used initially to authenticate client applications A and N, followed by sessions U and V being set up with instances 130A and 120A respectively as destinations within DBMS 110. Thus, as illustrated in FIG. 1B, instance 130A receives requests directly from client application A in session U in act 101A, and instance 130A transmits results directly back to client application A in session U in act 103A. Similarly, instance 120A receives requests directly from client application N in session V in act 101B and transmits results directly back to client application N in session V in act 103B. Hence, in the embodiments of FIG. 1B, instance 130A transmits a relegated relocation message on session U identifying instance 120A to client application A, and based on this message, client application A redirects session U from instance 130A to instance 120A. In such embodiments, instance 120A transmits a return relocation message on session U to client application A identifying instance 130A (or instance 130B if instance 130B is less busy than instance 130A), and based on this message, client application A redirects session U from instance 120A to instance 130A (or to instance 130B if identified in the return relocation message).

Figure 1C:
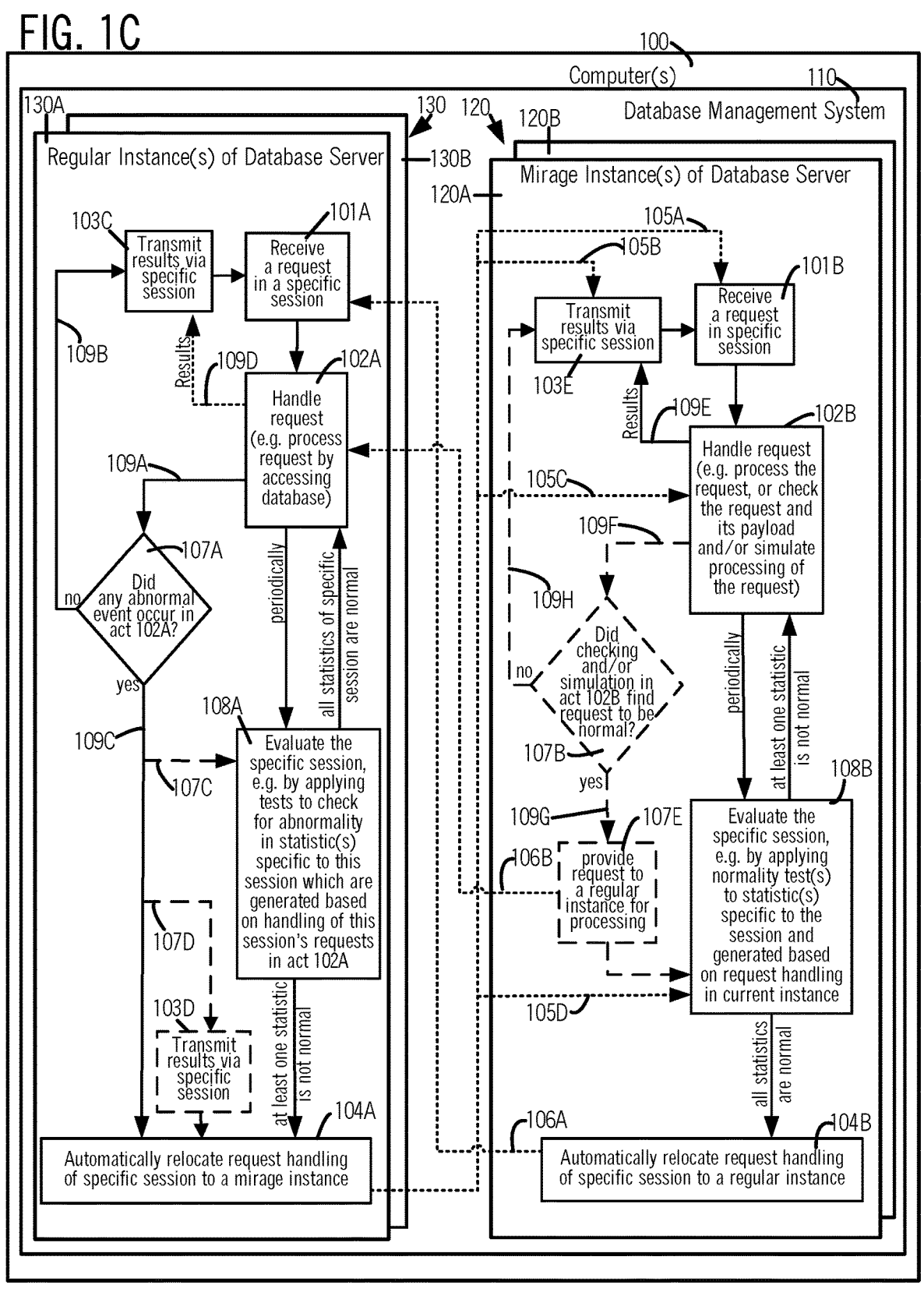
FIG. 1C illustrates, in an intermediate level flow chart, regular instance 130A of FIG. 1B performing at least acts 101A, 102A, 108A, 104A, 107A and 103C and mirage instance 120A of FIG. 1B performing at least acts 101B, 102B, 108B, 104B and 103E, in certain embodiments of the invention.

In some embodiments, regular instances 130 (such as instances 130A and 130B) described above in reference to FIG. 1B perform acts 101A, 102A, 107A, 103C, 108A and 104A shown in FIG. 1C. Although the following description refers to regular instance 130A, the same description is applicable to regular instance 130B. In act 101A, regular instance 130A receives a request to perform one or more database operation(s) from a client application (e.g. client application A), via a specific session (e.g. session U), and goes to act 102A. In act 102A, regular instance 130A handles the request, e.g. by processing the request in a normal manner, by accessing database 1002 (see FIG. 1A). After handling the request at least partially in act 102A, regular instance 130A takes a branch 109A and goes to act 107A.

In act 107A, regular instance 130A checks if one or more predetermined events (also called "abnormal events") occurred in act 102A. As noted above, an example of an abnormal event checked in act 107A may be the number of times that a specific table in database 1002 is accessed in executing the request in act 102A exceeds a limit (e.g. employee table is accessed more than 100 times). Another example of an abnormal event checked in act 107A is an error encountered in the request handling in act 102A, such as buffer overflow. In act 107A, if the answer is no (e.g. because the request processing in act 102A by accessing database 1002 was successful), regular instance 130A takes the no branch 109B out of act 107A and goes to act 103C.

In act 103C, regular instance 130A transmits results of act 102A (e.g. a set of rows retrieved from database 1002) via the specific session (e.g. session U) in which the request was received in act 101A. Then, regular instance 130A goes to act 101A and waits to receive a new request from the client application (e.g. client application A) via the specific session (e.g. session U). Thus, regular instance 130A repeatedly performs acts 101A, 102A, 107A and 103C (described above) in a loop (also called "regular loop"), while no abnormal event occurs, until a predetermined period of time (e.g. 2 minutes) passes after which regular instance 130A goes to act 108A (described below).

In response to act 107A finding that an abnormal event occurred in act 102A, regular instance 130A takes branch 109C to go directly to act 104A. In taking branch 109C to go directly to act 104A, regular instance 130A of some embodiments does not transmit to the client application, any indication of the abnormal event found in act 107A. In act 104A, regular instance 130A automatically relocates the request handling of the specific session (e.g. session U) from itself to a mirage instance, e.g. to instance 120A (or alternatively to instance 120B, e.g. if instance 120B is less busy than instance 120A). In certain embodiments, regular instance 130A may report occurrence of the abnormal event found in act 107A to the client application, e.g. by going via branch 107D to act 103D. In act 103D, regular instance 130A reports the abnormal event to the client application, followed by act 104A, after which mirage instance 120A starts servicing the specific session (e.g. session U), e.g. in act 101B. In act 101B, mirage instance 120A may service the specific session by use of information identifying the specific session, which may be received from regular instance 130A (e.g. in a relegated relocation message generated in act 104A), as shown by dashed arrow 105A.

If regular instance 130A is designed to not report the abnormal event to the client application, some embodiments of mirage instance 120A may be designed to start servicing the specific session in act 103E, as shown by dashed arrow 105B. Specifically, in act 103E, mirage instance 120A reports the abnormal event to the client application (e.g. in session U), followed by act 101B in which mirage instance 130A waits to receive a new request from client application A. Instead of relocation via dashed arrow 105B, other embodiments of mirage instance 120A may be designed to start servicing the specific session in act 102B, as shown by dashed arrow 105C, in which case mirage instance 120A may be provided a request that was previously received by regular instance 130A (e.g. after roll back therein). Thus, a previously received request may be handled by mirage instance 120A in act 102B. Thereafter, mirage instance 120A goes from act 102B via branch 109E to act 103E. In act 103E, mirage instance 120A transmits to the client application, results of processing the previously received request therein, e.g. a set of rows with a success code or an error code, followed by act 101B (described above). Accordingly, mirage instance 120A repeatedly performs acts 101B, 102B and 103E in a loop (also called "mirage loop"), until a preset time period (e.g. 3 minutes) passes after which mirage instance 120A goes from act 102B to act 108B (described below).

Referring to regular instance 130A, when the answer is yes in act 107A (e.g. because an abnormal event occurred in act 102A), instead of going directly to act 104A as described above in reference to branch 109C, instance 130A of some embodiments may be designed to take branch 107C to go to act 108A. In act 108A, regular instance 130A evaluates the specific session (e.g. session U) by applying specific tests (also called "abnormality tests") that check for abnormality in statistics specific to the session (e.g. session U). The just-described statistics checked in act 108A are generated based on handling of this session's requests by regular instance 130A in act 102A (described above). In some embodiments, in response to finding that any of the abnormality tests are satisfied, regular instance 130A goes from act 108A to act 104A (described above). In response to finding that all abnormality tests are not satisfied (e.g. because all statistics are normal), regular instance 130A returns from act 108A to act 102A, and goes therefrom to act 107A. In this manner, regular instance 130A re-starts looping (described above in reference to the regular loop), thereby to continue to handle requests from client application A received via the specific session (e.g. session U).

Similarly, in act 108B, mirage instance 120A evaluates the specific session (e.g. session U), in some embodiments by applying certain tests (called "normality tests") that check for normality of statistics specific to the session (e.g. session U). In such embodiments, the just-described statistics checked in act 108B are generated based on handling of this session's requests by mirage instance 120A in act 102B (described above). In response to finding that all normality tests are satisfied (e.g. because all statistics are normal), mirage instance 120A goes from act 108B to act 104B. In response to finding that at least one abnormality test is not satisfied, mirage instance 120A returns from act 108B to act 102B, and goes therefrom to act 103E via branch 109E. In this manner, mirage instance 120A re-starts looping (described above in reference to the mirage loop), thereby to continue to handle requests from client application A received via the specific session (e.g. session U).

In act 104B, mirage instance 120A automatically relocates the request handling of the specific session (e.g. session U) from itself to a regular instance, e.g. to instance 130A (or alternatively to instance 130B, e.g. if instance 130B is less busy than instance 130A). Thus, regular instance 130A may service the specific session relocated thereto, in act 101A (described above), by use of information identifying the specific session which may be received from mirage instance 120A (e.g. in a return relocation message generated in act 104B), as shown by dashed arrow 106A.

In certain embodiments, mirage instance 120A is designed to implement act 102B to not process the request, and instead to only check the request and its payload (e.g. by performing additional checks not performed by regular instance 130A as described below) and/or to simulate processing of the request. Thus, in embodiments that only check or simulate a request, mirage instance 120A opens database 1002 for read only operations or opens a database replica 1092 (FIG. 1A) that contains a copy of the data in database 1002. In such embodiments, instead of taking branch 109E from act 102B to go to act 103E, mirage instance 120A takes branch 109F to go to act 107B. In act 107B, mirage instance 120A determines whether the checking and/or simulation in act 102B found the request to be normal. If the request is found to be abnormal, mirage instance 120A goes from act 107B via branch 109H to act 103E. In act 103E, mirage instance 120A transmits to the client application, an error code (or another indication of abnormality) found in act 102B, and then goes to act 101B (described above). If the request is found to be normal in act 107B, mirage instance 120A goes from act 107B via branch 109G to act 107E.

In act 107E, mirage instance 120A provides the request to regular instance 130A (or alternatively to regular instance 130B, e.g. if regular instance 130B is less busy than regular instance 130A), as shown by arrow 106B. Thereafter, regular instance 130A handles the request in act 102A, e.g. by processing the request, which is received from mirage instance 120A. Depending on the embodiment, results of processing the request in act 102A may be transmitted to client application A by either regular instance 130A or by mirage instance 120A. After act 107E, mirage instance 120A goes to act 108B (described above).

In some embodiments, a mirage instance 120A may first evaluate in act 108B, a specific session that is relocated thereto by regular instance 130A as shown by dashed arrow 105D. Specifically, in act 108B, mirage instance 120A of such embodiments checks if software of the database server changed recently (e.g. within the last 30 days), and if so whether an error that occurred in processing the request in act 102A by regular instance 130A occurred previously, before the most-recent software change. For example, if the most-recent software change was 2 weeks ago, mirage instance 120A checks if the same error occurred in the processing of any request by regular instance 130A prior to 2 weeks. If the error did not occur before the software change, then in act 104B (FIG. 1C), mirage instance 120A relocates the session, e.g. to regular instance 130B executing a prior version of software of the database server (if it exists) or alternatively to regular instance 130A after installing therein a new update of software to fix a defect in the database server software that may be generating the error, as described below in reference to FIG. 13.

In some embodiments, one or more client applications (such as client application N) are configured (e.g. by DBA) to initially set up a session (e.g. session V) with a mirage instance, e.g. instance 120A (see FIG. 1B). So, mirage instance 120A receives a request in act 101B and handles the request in act 102B (e.g. by processing the request using database 1002), and returns results of the processing to the client application in act 103E as described above. Hence, session V is relocated to one of regular instances 130A and 130B by act 104B only when statistics of session V are found to be normal (as determined by mirage instance 120A in act 108B). Thus, a client application N which is newly developed may find and fix any issues with its requests when serviced by mirage instance(s) 120, while a thoroughly tested application A is efficiently serviced by regular instance(s) 130 that are not adversely affected by any issues in mirage instance(s) 120 created by client application N.

In some embodiments of the type illustrated in FIG. 1C, instances 130 and 120 may be configured in computers of identical hardware with identical configuration parameters, e.g. size of memory allocated for system global area (SGA), size of sort area. When configurations are identical in instances 130 and 120, an execution plan which is generated in any instance, such as instance 130A can be used in any other instance, such as instance 120A. An execution plan may be generated for a request by instance 130A, in an executable code generation step that uses at least an optimizer, after the request is checked in (a) syntax checking step, (b) semantic checking step, (c) authentication and access control checking step, and (d) step to check if the request was previously parsed, as described below in reference to FIG. 12A. Instance 130A may store the request's execution plan, which is known to be performant, in a baseline, e.g. in database 1002, and this execution plan may thereafter be used by instance 120A (or vice versa). Alternatively, any one of instances 120 and 130 may communicate with any other of instances 120 and 130, e.g. via a back channel, to share a request's execution plan with one another.

In certain embodiments, each of instances 130 and 120 may generate its own execution plan for a request independent of any other of instances 130 and 120, e.g. when configured differently. In one example, an abnormal event (e.g. segmentation fault) occurs in processing a request in regular instance 130A, followed by mirage instance 120A receiving the request (and an identification of the abnormal event) from regular instance 130A, as shown by dashed arrow 105D in FIG. 1C. In this example, based on evaluation of the abnormal event (e.g. in act 108B in FIG. 1C), mirage instance 120A may decide to generate a new execution plan for this request, by using a less-than-optimal code path or a different breakdown of execution, in an attempt to avoid the abnormal event. So, if a segmentation fault occurred in regular instance 130A when using an index-based execution plan for a request, mirage instance 120A may generate and use a new execution plan that is deliberately based on a full table scan even if doing so is efficient.

In some embodiments, in response to provision of a request to mirage instance 120A based on hacking (or other indication of maliciousness of a client application), mirage instance 120A may use the same execution plan as regular instance 130A, but perform additional checks on the request and its payload before and after execution, e.g. as described below in reference to act 122 in FIG. 3A and additional checks 531 in FIG. 12H, such as data validation checks 601, memory checks 602 and paranoia mode checks 603.

In some embodiments, client applications A . . . I . . . N may be connected at time T1 via one or more sessions U, X, Y and V (see FIG. 2A) to instances 130 in DBMS 110. At a time T2 (FIG. 2A) which occurs after time T1, instances 130 evaluate abnormality of each session with client applications A . . . I . . . N, at least using in tests (also called "abnormality tests"), statistics generated by handling (e.g. by processing) the above-described requests (e.g. statistics based off application workload). The just-described statistics may include counts specific to a session of a client application that are incremented based on occurrence of errors in processing that client application's workload, such as number of segmentation faults, number of buffer overflow errors, number of out-of-memory errors, and number of restricted access errors (e.g. see the first four rows 636A-636D of a two dimensional array used to access memory region 614 in FIG. 12A). These four statistics are examples of DBMS-internal statistics that are maintained in database 1002, by instances 130 (and also by instances 120) of some embodiments. The just-described evaluation may be performed periodically, e.g. once every second, or in response to a predetermined event, e.g. crashing of a process in an instance 130.

The above-described DBMS-internal statistics may be generated periodically in DBMS 110, by a statistics generator (not shown) which counts errors in different categories (e.g. each of four categories, such as segmentation faults, out-of-memory errors, buffer overflows, and restricted access errors) based on errors logged during request handling (e.g. in table 694 shown in FIG. 12K, which stores information on errors). In some embodiments, table 694 is included in a relational database 1002 (FIG. 1A) and one or more rows from such a database table may be stored in a main memory 1060 (FIG. 16) and used by one or more instances 130, 120 of a database server that execute in computer 100.

Figure 2A:
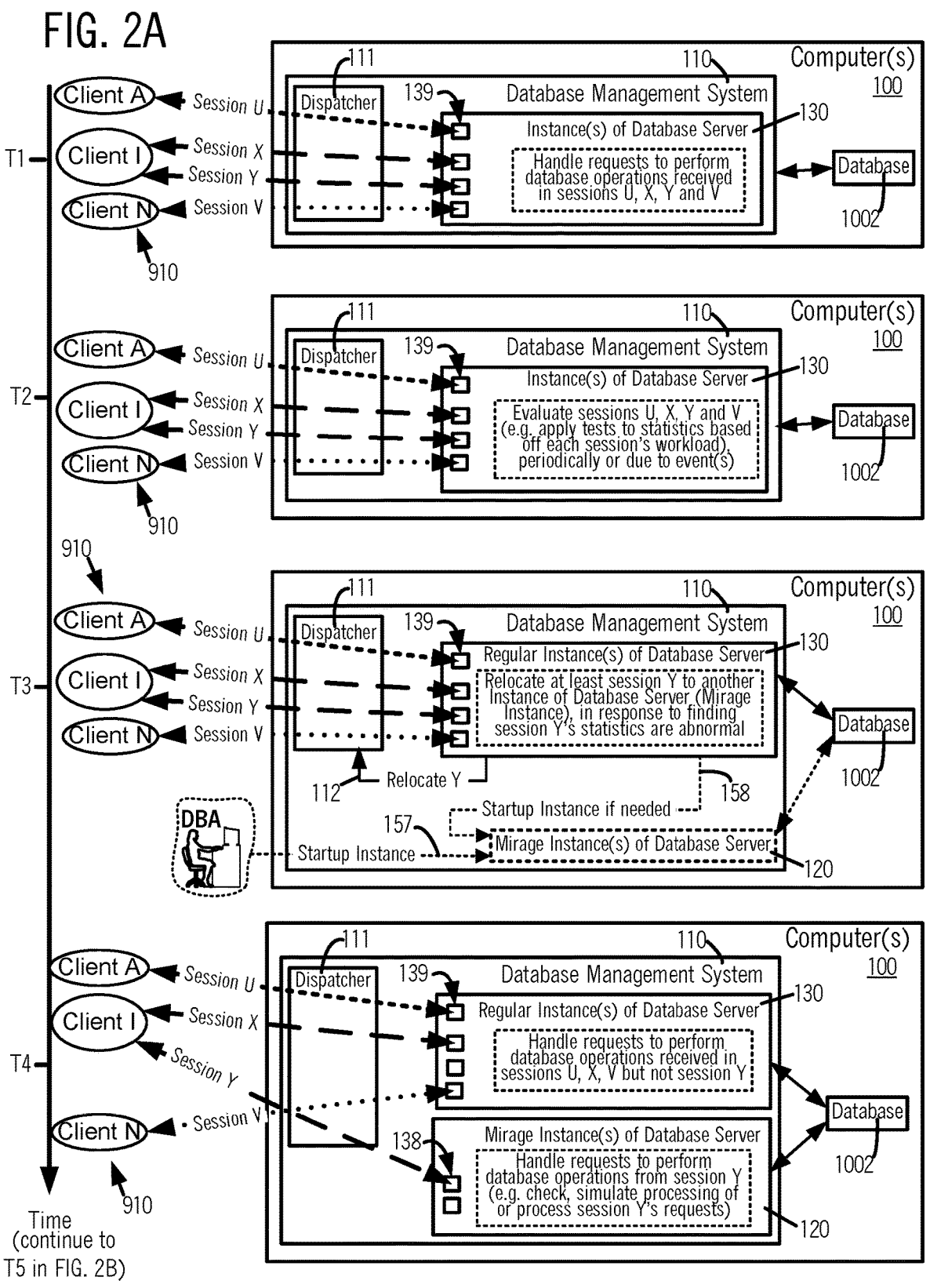
FIG. 2A illustrates a timing diagram showing at a sequence of times T1-T4, data flows and acts of one or more regular instance(s) 130 and one or more mirage instance(s) 120 in database management system 110 in computer(s) 100 of FIG. 1C in handling requests for database operations received in sessions U, V . . . X, Y from client applications A . . . I . . . N in one or more computer(s) 910, in several embodiments of the invention.

Thereafter, at a time T3 (FIG. 2A) which occurs after time T2, in the example illustrated in FIG. 2A, statistics of session Y of client application I are found by the just-described evaluation to be not normal, and in response to this finding, session Y is relocated from being serviced by an instance 130 (also called "regular" instance or "regular" database server instance) to being serviced by another instance 120 (called "mirage" instance or "mirage" database server instance), e.g. by notifying dispatcher 111 via message 112.

In certain embodiments, if mirage instance 120 is not currently executing, execution thereof may be automatically started, as shown by arrow 158 in FIG. 2A at time T3, e.g. by regular instance 130 providing one or more commands to cluster ware. Alternatively, mirage instance 120 may be started at any time (e.g. after startup of regular instance 130), by a DBA as shown by arrow 157 in FIG. 2A at time T3. Mirage instance 120 of several embodiments uses the same database 1002 as regular instance 130, although in other embodiments mirage instance 120 may use a replica of database 1002, e.g. as described below in reference to FIG. 13.

In some embodiments, relocation of client application I's session Y from instance 130 to instance 120 is performed by migration in multiple phases, after client application I completes an ongoing unit of work (such as transaction) in session Y. For example, when client application I is in the middle of a transaction in session Y which contains multiple SQL statements, session Y is moved after the transaction completes. In certain embodiments, the just-described relocation is performed by moving client application I's session Y from instance 130 to instance 120 when the session is next used, specifically on receipt of a very next request from client application I. For example, the just-described relocation is performed on receipt of a next request, when a process of regular instance 130 crashes during processing of a current request received via session Y.

In some embodiments, relocation of session Y is done transparently to client application I, e.g. by notifying only dispatcher 111 to which session Y of client application I is connected, so that dispatcher 111 sends all future requests received via session Y to mirage instance 120, and client application I is not notified of this relocation. In alternative embodiments, the just-described relocation is done by informing a SQL*Plus driver in a library used by client application I to connect session Y to instance 120 (depending on the embodiment, with or without informing client application I that uses the SQL*Plus driver to set up session Y to send requests to database management system 110), so that the SQL*Plus driver then moves the session Y.

In some embodiments, session Y may be relocated, e.g. as described in US Patent Publication 2005/0038848 entitled "Transparent Session Migration Across Servers" by Sanjay Kaluskar, Sreenivas Gollapudi and Debashish Chatterjee, and as described in US Patent Publication 2005/0038828 entitled "Transparent Migration of Stateless Sessions Across Servers" by Sanjay Kaluskar and Sreenivas Gollapudi, and both of these publications are hereby incorporated by reference herein in their entireties.

Moreover, although in some embodiments, session Y is relocated after completion of an ongoing unit of work as described above, in other embodiments of the type described herein, one or more active transactions of session Y may be rolled back, followed by forwarding these transactions to a mirage instance 120 into which session Y is relocated, and after relocation these rolled back transactions are then handled in mirage instance 120.

Figure 11A:
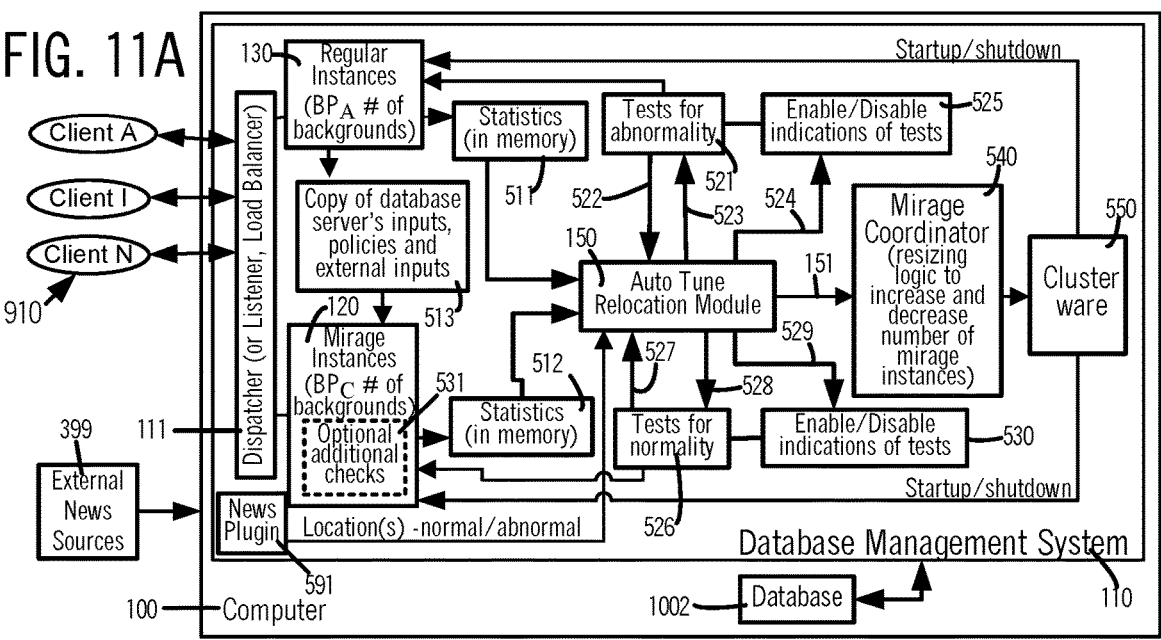
FIG. 11A illustrates, in a high level block diagram, software and data included in database management system 110 executing in one or more computer(s) 100, in several embodiments of the invention.

As noted above, at time T3, if mirage instance 120 does not exist, regular instance 130 creates one or more mirage instances 120 (e.g. by issuing a command to cluster ware 550 shown in FIG. 11A). Thereafter, at time T4 (FIG. 2A) which occurs after time T3, regular instance(s) 130 continue to process requests received in sessions U, V with client applications A . . . N, and in session X from client application I, while mirage instance(s) 120 start handling requests received in session Y with client application I, e.g. by checking, or simulating processing of, or processing, one or more new request(s) to perform database operations on database 1002 received from client application I. In FIG. 2A, at time T4, client application I has requests within its sessions X and Y being responded to by database management system 110, by internal use of instances 130 and 120 respectively. As noted above, in some embodiments, an identity of which particular instance among instances 130, 120 within DBMS 110 is servicing which one of sessions X and Y may be transparent to client application I, e.g. when a DBMS process (e.g. dispatcher 111) receives requests from client application I.

Use of mirage instance(s) 120 in database management system 110 as described above (see FIG. 1C) prevents or minimizes in regular instance(s) 130, adverse effects that typically arise in handling requests that are not normal for any reason, e.g. due to intensive usage of resources, buggy or badly written applications that generate the requests, or enabling a specific combination of multiple features in a database server that exercise faulty code therein, etc. Handling of requests that are not normal in mirage instance(s) 120 ensures that adverse effects thereof (e.g. crashing of a process, followed by creation of a core dump or a core file/incident file) stay in mirage instance(s) 120, which therefore do not affect operation of regular instance(s) 130. Thus, use of mirage instance(s) 120 increases availability and performance of regular instance(s) 130, because regular instance(s) 130 process new requests from sessions whose previous requests' statistics were found to be normal. Accordingly, database management system 110 uses mirage instance(s) 120 and regular instance(s) 130 in cooperation with one another, to check and/or simulate and/or process (any one or more of which are referred to herein as handling) requests from a client application.

Depending on the embodiment, one or more mirage instance(s) 120 of the type described herein (e.g. FIGS. 1A-1C and 2A-2D, 3A, 4A, 4B, 5, 6A, 6B, 7A, 7B, and 8) may be (or may be not) implemented (as described next, in reference to mirage instance 120B) to have reduced functionality and/or execute in computers with lower capacity hardware components (e.g. fewer and/or slower processors and/or less amount of random access memory) and limited amount of persistent storage (e.g. hard disks) relative to regular instance(s) 130. Specifically, a mirage instance 120B (also called "inferior" mirage instance) may provide inferior performance relative to regular instance(s) 130, e.g. as described below in reference to FIGS. 8, 9 and 10A. Relocation of a session Y of client application I from regular instance(s) 130 to inferior mirage instance 120B constitutes a down-grading in service level of session Y.

In certain embodiments, mirage instance(s) 120 (see FIG. 3A) may perform more exhaustive checks in act 122, relative to act 132 performed by regular instance(s) 130. Performance of additional checks in act 122 may result in inferior performance seen by session Y of client application I when serviced in mirage instance(s) 120 relative to regular instance(s) 130, even when these two instance(s) 120 and 130 are respectively executing in two computers and each of these two computers contains identical hardware components interconnected identically to one another. Specifically, in certain embodiments, mirage instance(s) 120 may be configured with the same resources and execute in computers with identical hardware components interconnected identically as regular instance(s) 130.

In several embodiments, mirage instance(s) 120A (also called "superior" mirage instance(s)) are configured with more resources than and execute in higher capacity computers than regular instance(s) 130, e.g. as described below in reference to FIGS. 8, 9 and 10B so that service level requirement for a session Y relocated to the superior mirage instance(s) 120A is met, when the session Y is relocated for performance reasons (e.g. excessive usage of resources) and not due to causing excessive errors or faults. The just-described relocation of a specific session Y of client application I, to superior mirage instance(s) 120A also improves performance seen by other sessions handled by regular instance(s) 130 due to absence of the workload of specific session I.

In some embodiments, mirage instance(s) 120 (see FIG. 1C) may check and/or simulate processing of requests to perform database operations received by database management system 110 from client applications (such as an application client software, also called simply "application", in client computer 910), and may (or may not) process the requests (e.g. by execution and fetching of data). Thus, in certain embodiments, requests may be forwarded by mirage instance(s) 120 to regular instance(s) 130 for processing (e.g. execution therein, in a normal manner), if these requests are determined by mirage instance(s) 120 to be normal, e.g. based on checking and/or simulation performed by mirage instance(s) 120.

Also, depending on the embodiment, mirage instance(s) 120 may be of several classes as follows. Mirage instance(s) 120 of a first class (also called first feature class) are similar or identical in features to regular instance(s) 130 in all respects, and differ only in name. Mirage instance(s) 120 of a second class (also called second feature class) are configured to execute additional checks (e.g. data validation check, heap check, paranoia mode check) in handling requests for database operations, which may not be executed by regular instance(s) 130. Mirage instance(s) 120 of a third class (also called third feature class) are limited to opening database 1002 for only read operations, which makes checking requests for database operations faster relative to opening database 1002 for read and write operations. Hence, mirage instance(s) 120 of the third feature class are limited to checking, but not processing, requests for database operations. Mirage instance(s) 120 of a fourth class (also called fourth feature class) are limited to simulating the processing of, but not actually processing, requests for database operations.

Figure 11B:
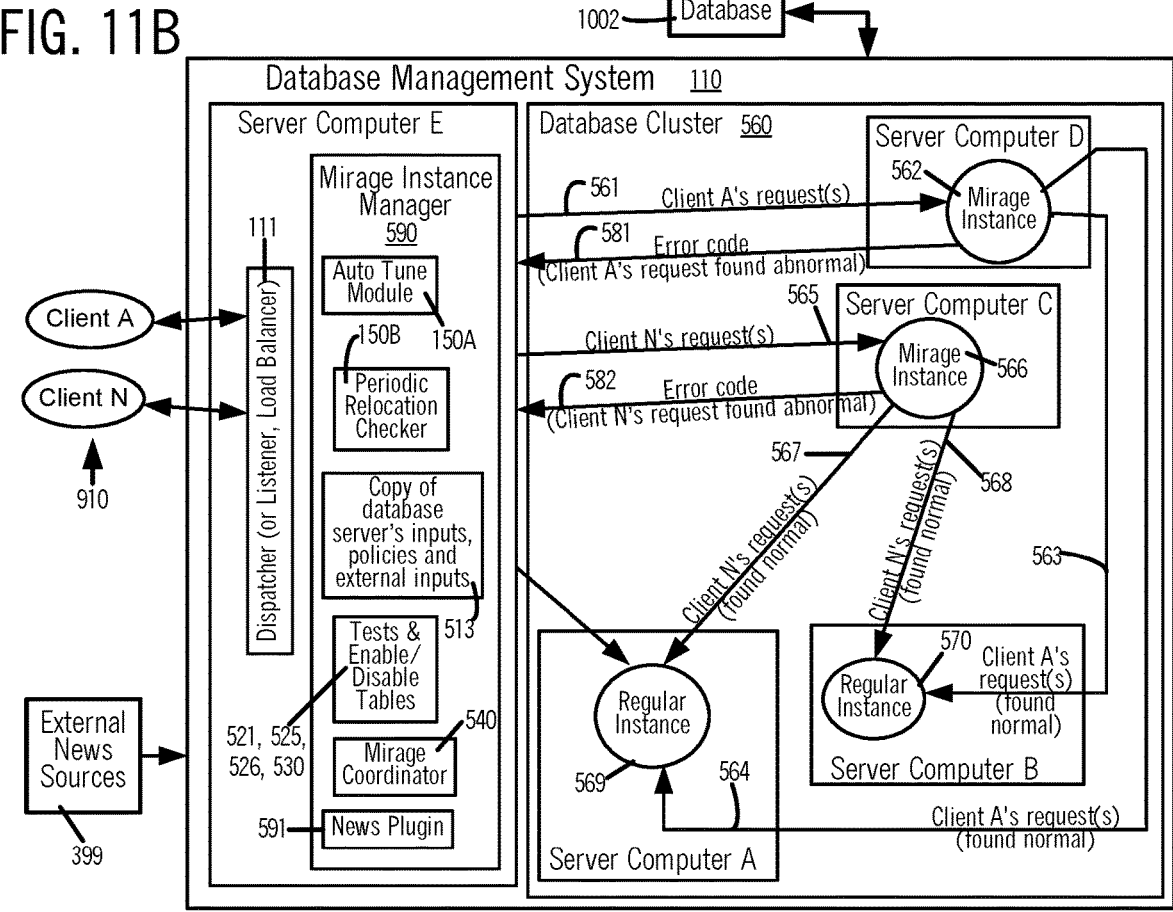
FIG. 11B illustrates, in a high level data flow diagram, database management system 110 including a mirage instance manager 590 in server computer E, and a database cluster 560 that includes regular instances 569, 570 in server computers A and B, and mirage instances 566 and 562 in server computers C and D respectively, in certain embodiments of the invention.
Figure 11C:
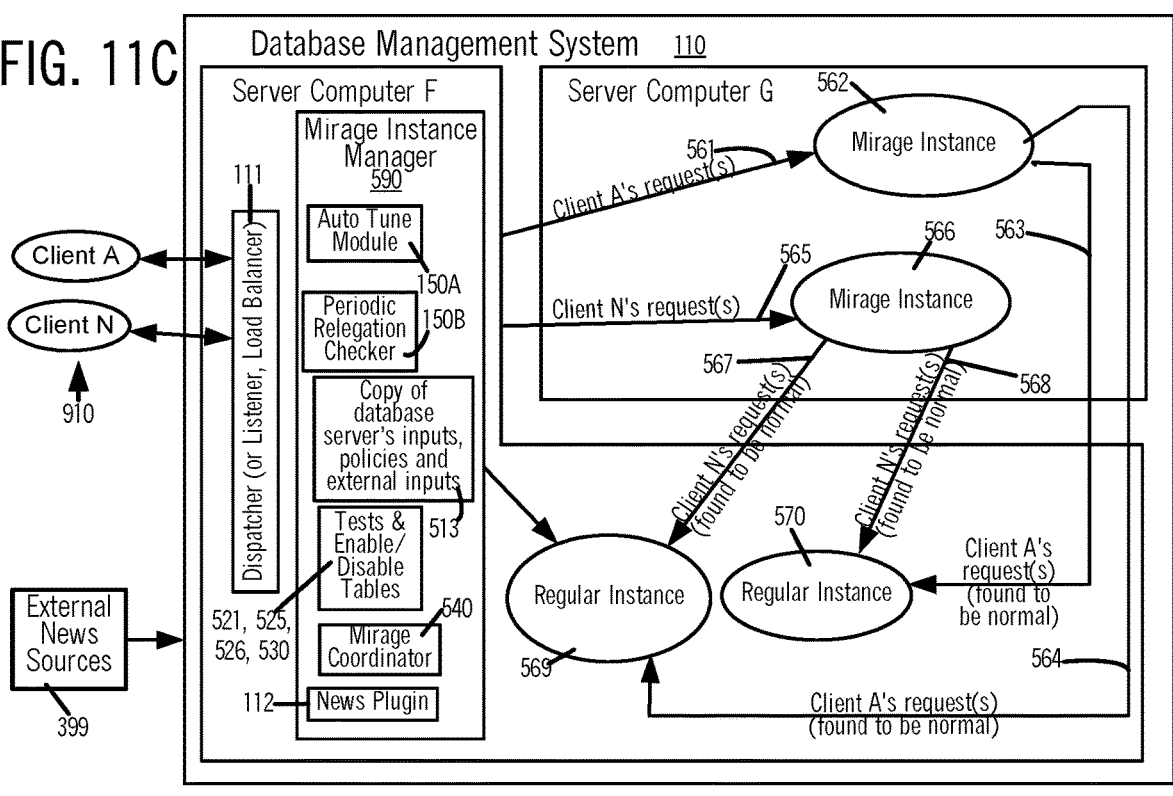
FIGS. 11C and 11D illustrate, in high level data flow diagrams, two server computers in which regular instances 569, 570 and mirage instances 566 and 562 are executed in different configurations of computers to implement database management system 110 of FIG. 11B differently in alternative embodiments of the invention.
Figure 11D:
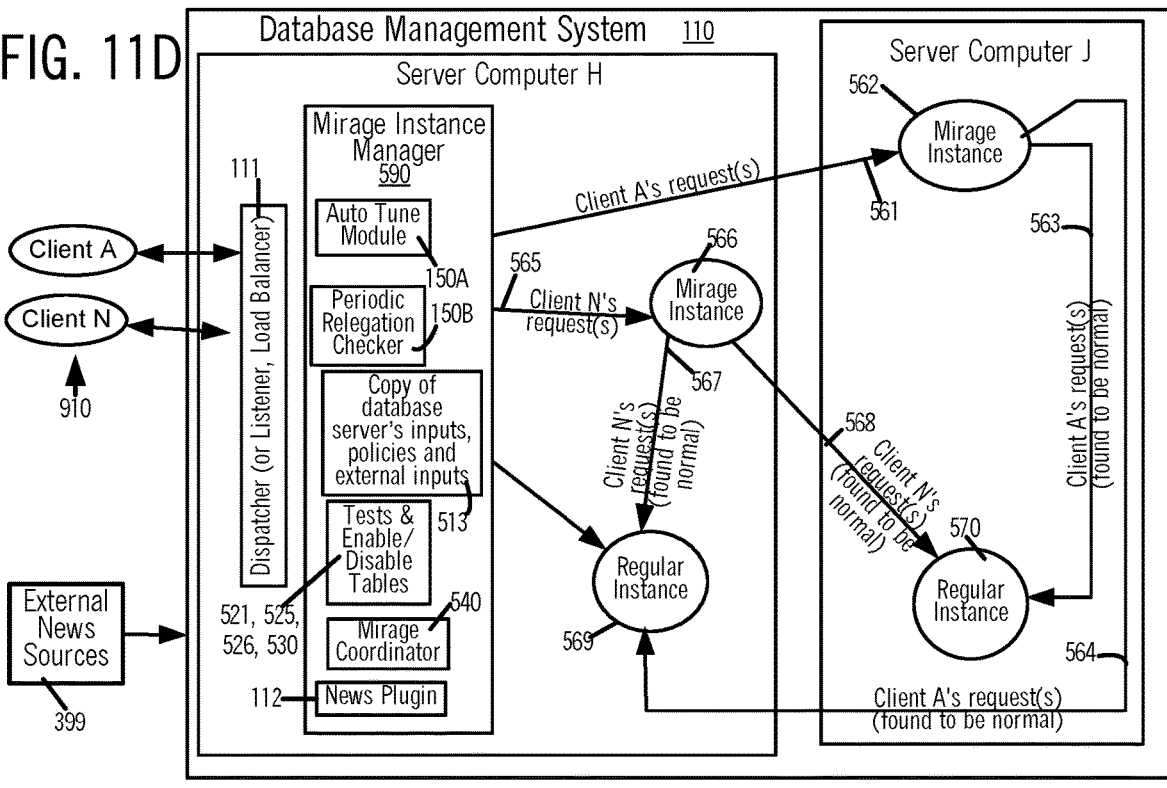

Also depending on the embodiment, mirage instance(s) 120 may execute in the same computer(s) 100 as (or alternatively execute in computers different from) computer(s) 100 in which regular instance(s) 130 execute, e.g. as shown in FIGS. 11B-11D. In some embodiments, regular instance(s) 130 and mirage instance(s) 120 access a common database 1002 (as shown in FIG. 2A), although in other embodiments mirage instance(s) 120 open a standby copy (not shown) of database 1002 which is opened by regular instance(s) 130.

After times T1-T4 as described above (see FIG. 2A), at a later time T5 (FIG. 2B) which occurs after time T4, regular instance(s) 130 continue to process requests from sessions U, V of client applications A . . . N, and from session X of client application I but not from session Y of client application I. At this time, mirage instance(s) 120 evaluate normality of session Y of client application I, by at least using in tests (also called "normality tests"), statistics generated based on processing or otherwise handling session Y's requests (e.g. statistics based off application workload) in mirage instance(s) 120, and these statistics are examples of DBMS-internal statistics. One or more normality tests (e.g. see tests 526 in FIG. 11A) used by mirage instance(s) 120 may be similar to the above-described abnormality tests (e.g. see tests 521 in FIG. 11A) used by regular instance(s) 130. For example, a first threshold in an abnormality test 521 may be identical to a second threshold used in a normality test 526, although the threshold's comparison to the statistic may be inverted (e.g. a greater than comparison may be replaced by a less than comparison). In the just-described example, the first threshold being identical to the second threshold results in identical strictness in evaluations at times T2 and T5 (e.g. performed in acts 132 and 122 in FIG. 3A, described below). For example, the first and second thresholds for number of segmentation faults in each session may be both 5, and when this value is exceeded for a session, that session is determined (by use of tests 521 and 526 by evaluation in respective acts 132 and 122) to be abnormal but below this value the session is determined to be normal. Depending on the embodiment, the just-described thresholds may be applied to statistics of a particular stage in handling (or processing) requests (e.g. parse stage or execution stage), or to statistics of individual steps within a stage, or to statistics cumulative over multiple stages, as described below in reference to FIGS. 12A and 12B, and all these statistics are examples of DBMS-internal statistics.

In some embodiments, although the thresholds are identical in tests 521 and 526, a first period of time at which tests 521 are repeated by act 132 in a regular instance 130 may be less than a second period of time at which tests 526 are repeated by act 122 in mirage instance 120, thereby to ensure that sessions which have been relocated to mirage instance 120 stay longer in mirage instance 120, and are not easily relocated back. In some embodiments, second thresholds that must not be exceeded to satisfy normality tests (e.g. in act 122 in FIG. 3A) are deliberately made different from (e.g. lower than) first thresholds that on being exceeded satisfy abnormality tests (e.g. in act 132 in FIG. 3A), so that sessions which are unexpected or problematic in some manner are relocated easily from regular instance(s) 130 to mirage instance(s) 120 but not relocated back so easily.

More specifically, in several embodiments, second thresholds used in normality tests on error statistics and resource utilization statistics are lower (e.g. by 10% or more) than corresponding thresholds used in abnormality tests on the same error statistics and resource utilization statistics. For example, the first and second thresholds for number of segmentation faults within a periodic interval of time (e.g. 1 second) for which evaluation is performed may be 6 and 4 respectively. In this example, a session with 7 segmentation faults is determined (by use of abnormality test 521 by evaluation in act 132) to be abnormal because it is greater than the first threshold of 6, and therefore this session is relocated to a mirage instance 120. Then, this session must have 4 or less segmentation faults (within the periodic time interval) in mirage instance 120 for the session to be determined (by use of normality test 526 by evaluation in act 122) to be normal because the second threshold is 4. Thus, the degree of strictness in normality evaluation at time T5 in FIG. 2B (e.g. performed in act 122 in FIG. 3A, described below) is greater than the degree of strictness in abnormality evaluation at time T2 in FIG. 2A (e.g. performed in act 132 in FIG. 3A). This greater degree of strictness ensures that sessions which are relocated to mirage instance 120, stay longer in mirage instance 120 until the stricter thresholds are met, and hence not easily relocated back.

Depending on the embodiment, certain normality tests 526 (FIG. 11A) used by mirage instance(s) 120 may have no equivalent in the above-described abnormality tests 521 (FIG. 11A) used in regular instance(s) 130 because different statistics may be tested in the normality tests which are not used in any abnormality test. For example, some normality tests 526 (FIG. 11A) may test one or more statistics at a finer granularity of processing (as illustrated by DBMS-internal statistics in columns 616, 617 and 618 of a data structure, such as an array, linked list, stack or hash table used to access memory region 614 in FIG. 12A) than abnormality tests 521 which may test cumulative statistics obtained by adding up internal statistics across multiple stages of handling a request (as illustrated by column 620 in FIG. 12A). The normality evaluation by mirage instance(s) 120 at time T5 may be repeated at a periodic interval of time or in response to a predetermined event, similar to the abnormality evaluation by regular instance(s) 130 at time T2 (described above).

Thereafter, at a time T6 (FIG. 2B) which occurs after time T5, regular instance(s) 130 continue to process requests from sessions U, V of client applications A . . . N, and session X of client application I but not from session Y of client application I. Also at time T6, in the example illustrated in FIG. 2B, statistics of session Y of client application I are found by the just-described evaluation to be normal, and in response to this finding, client application I's session Y is relocated from mirage instance(s) 120 to regular instance(s) 130 e.g. by notifying dispatcher 111 via a message 113. Thereafter, at time T7 (FIG. 2B) which occurs after time T6, regular instance(s) 130 continue to process requests from sessions of client applications A . . . N, and additionally process requests from sessions X and Y of client application I, while mirage instance(s) 120 wait to service sessions to be relocated (and wait to handle requests received therein).

Figure 2B:
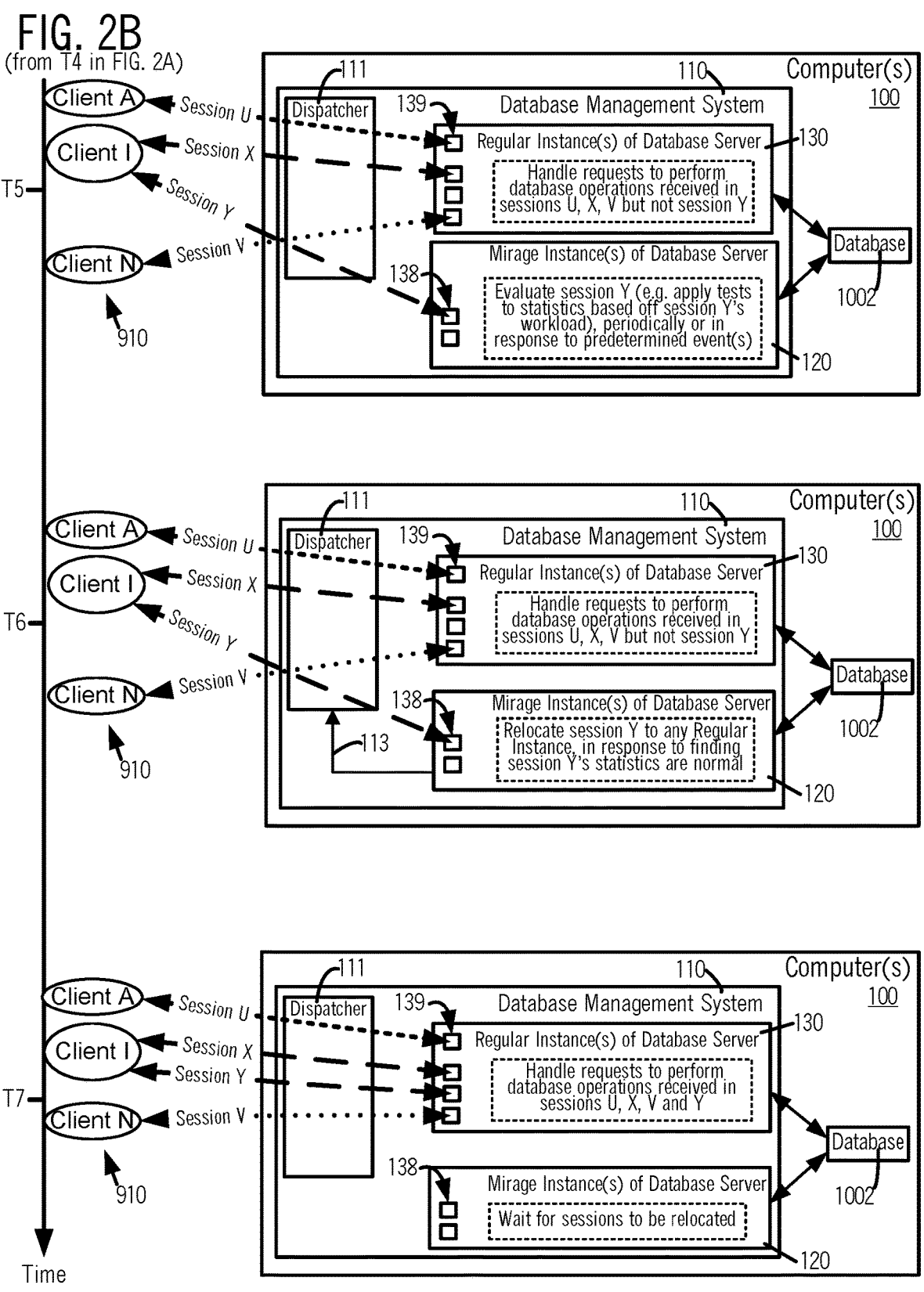
FIG. 2B illustrates, in a continuation of the timing diagram of FIG. 2A, at a later sequence of times T5-T7, data flows and acts of regular instance(s) 130 and mirage instance(s) 120 in database management system 110, in continuing to handle requests for database operations in sessions U, V . . . X, Y from the client applications A . . . I . . . N in one or more computer(s) 910.

In several embodiments of the type shown in FIGS. 2A and 2B, in one or more computer(s) 100, each of regular instance(s) 130 and mirage instance(s) 120 may be executed by one of multiple processors (e.g. see processors 1041-1044 in FIGS. 16 and 17A), in a process which has no threads, or alternatively in a thread of a process, or alternatively in any combination of threads and/or processes. In the embodiments illustrated in FIGS. 2A and 2B, instances 130 and 120 execute software of a database server in a database management system 110 (such as Oracle Database Release 19c, Version 19.1, available from Oracle Corporation) that is installed in and executes in computer(s) 100.

Thus, in embodiments of the type illustrated in FIGS. 2A and 2B, database management system 110 includes one or more mirage instance(s) 120 of a database server, and one or more regular instance(s) 130 of the database server. Mirage instance(s) 120 and regular instance(s) 130 share one or more files of software (e.g. executable code in binary) of the database server that may be executed in one or more processes that are identical to one another. In certain embodiments, at least a majority of software files (e.g. more than 50% of files) executed by mirage instance(s) 120 are identical to software files executed by regular instance(s)

130. In some embodiments, most software files (e.g. more than 95% of files) executed by mirage instance(s) 120 are identical to software files executed by regular instance(s) 130. Additionally, as noted above, in the embodiments of FIGS. 2A and 2B mirage instance(s) 120 and regular instance(s) 130 perform database operations on the same database, e.g. relational database 1002 (FIGS. 2A and 2B).

Figure 2C:
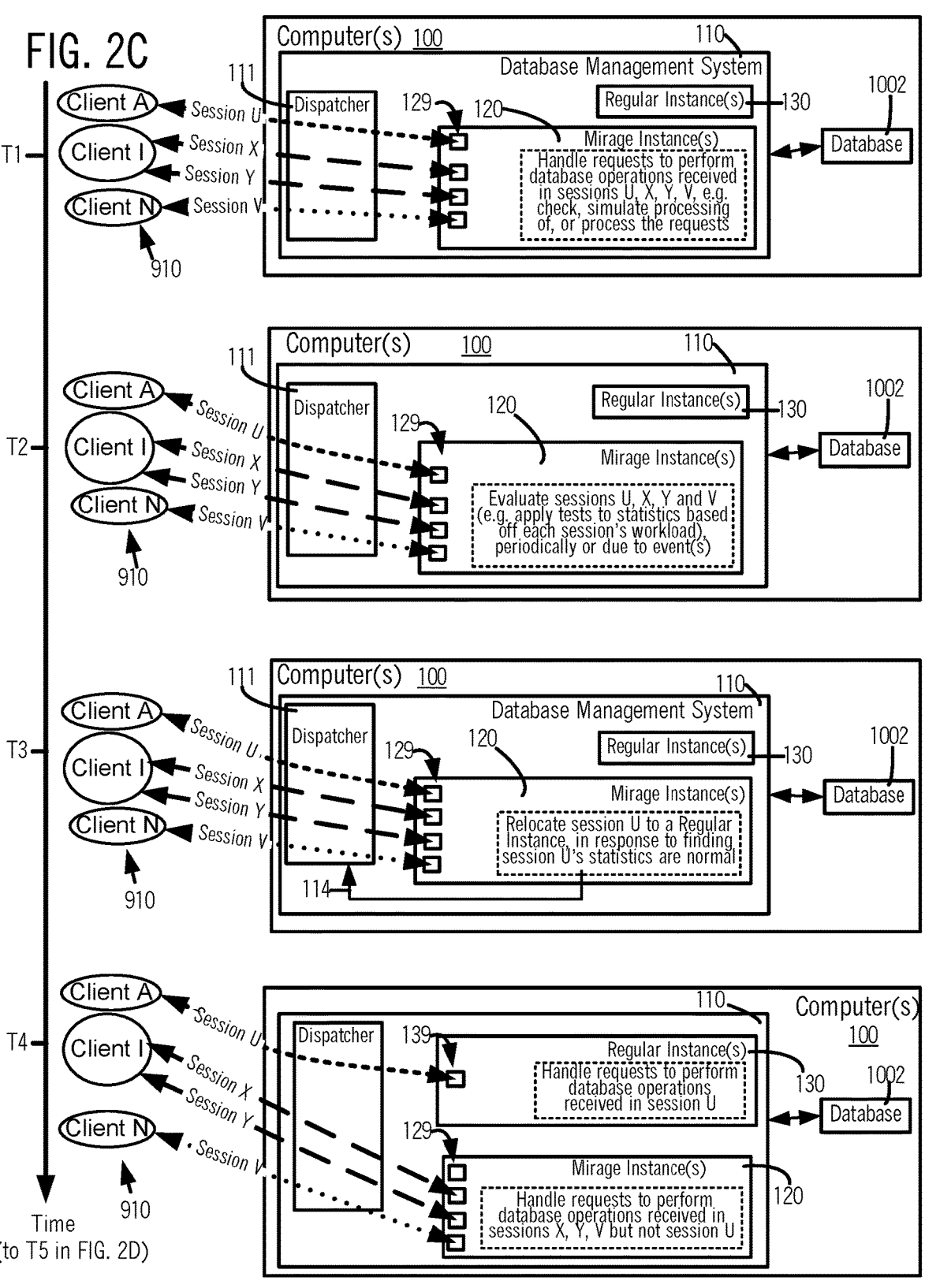
FIG. 2C illustrates a timing diagram similar to FIG. 2A, showing at a sequence of times T1-T4, but with sessions U, V . . . X, Y from client applications A . . . I . . . N initiating in mirage instance(s) 120 in some embodiments of the invention.

Although in the embodiments illustrated in FIG. 2A described above, dispatcher 111 initially sets up sessions U, X, Y, V of client applications A . . . I . . . N with regular instance(s) 130 (e.g. at time T1), dispatcher 111 in alternative embodiments may be configured (e.g. by a database administrator, also referred to as DBA), to set up one or more client applications' sessions U, X, Y, V initially with mirage instance(s) 120, e.g. as illustrated at time T1 in FIG. 2C. For example, when the DBA is unsure of effects of a new application or wants to test it, that client application's sessions can be configured to be initially set up with one of mirage instance(s) 120. In the example of FIG. 2C, initially at time T1, all sessions U, X, Y, V of client applications A . . . I . . . N in one or more computers 910 connect to one or more process(es) 129 in mirage instance(s) 120, which handle requests to perform database operations that are received in these sessions over the just-described connections, e.g. session X and session Y from client application I.

At a time T2 (FIG. 2C) which occurs after time T1, mirage instance(s) 120 evaluate normality of each of sessions U, X, Y, V with client applications A . . . I . . . N, at least using in normality tests 526 (see FIG. 11A), statistics generated in handling the above-described requests (e.g. statistics based off application workload), in a manner similar to the above description for regular instance(s) 130 at time T2 in FIG. 2A. Thereafter, at a time T3 which occurs after time T2 in the example illustrated in FIG. 2C, statistics of a session U of client application A are found in the just-described evaluation to be normal. In response to this finding, client application A's session U is relocated from mirage instance 130 to one of regular instance(s) 120, e.g. by notifying dispatcher 111 via message 114 (see FIG. 2C at time T3). Thus, at time T4 which occurs after time T3 in FIG. 2C, mirage instance(s) 120 continue to process requests in sessions X, Y and V from client applications I . . . N but not from the session U from client application A, while regular instance(s) 130 start handling requests from the session U of client application A which was found to be normal.

Thereafter, at a time T5 (FIG. 2D) which occurs after time T4 (FIG. 2C), statistics of a session V of client application N are found to be normal in evaluation by mirage instance(s) 120. In response to this finding, client application N's session V is relocated from mirage instance 130 to one of regular instance(s) 120, e.g. by notifying dispatcher 111 via message 115 (see FIG. 2D at time T5). Thus, at time T6 which occurs after time T5 in FIG. 2D, mirage instance(s) 120 continue to process requests in sessions X and Y from client application I but not from the sessions U and V from client applications A and N, while regular instance(s) 130 handle requests from the sessions U and V of client applications A and N. Thereafter, at a time T7 (FIG. 2D) which occurs after time T6, statistics of each of sessions X and Y of client application I are evaluated individually and found to be normal in the evaluation, in mirage instance(s) 120. In response to this finding, client application I's sessions X and Y are each individually relocated from mirage instance 130 to one of regular instance(s) 120 (e.g. by notifying dispatcher 111). Therefore, at time T8 (FIG. 2D) which occurs after time T7, requests received in all sessions U, X, Y, V of all client applications A . . . I . . . N are processed in regular instance(s) 130.

After time T8, at a time T9 (not shown in FIG. 2D, see time T2 in FIG. 2A), regular instances 130 evaluate abnormality of each of sessions U, X, Y, V with client applications A . . . I . . . N, as described above. Thereafter, at a time T10 (not shown in FIG. 2D, see time T3 in FIG. 2A), statistics of session Y of client application I are found by the just-described evaluation to be not normal, and in response to this finding, client application I's session Y is relocated back from regular instance 130 to mirage instance 120. Hence, at a subsequent time T11 (not shown in FIG. 2D, see time T4 in FIG. 2A), regular instance(s) 130 continue to process requests received in sessions U, V with client applications A . . . N, and in session X from client application I, while mirage instance(s) 120 again handle requests received in session Y with client application I.

In an illustrative example of the description of FIGS. 2A, 2B, 2C and 2D above, client applications A . . . I . . . N may be, for example, executing in five mid-tier nodes, and each mid-tier node may have 20 processes of the client applications, and each process may be multi-threaded, having 40 connections and correspondingly 40 sessions to database management system 110. Each of these 40 sessions can have a different client identifier. Thus, there may be 5*20*40=4,000 sessions, each session identified by a unique client identifier. In some embodiments, a client identifier may be unique for each session, or a client identifier may be used to identify multiple sessions in a group, e.g. based on a name of a software module within a client application I. In addition to a client identifier, these sessions may use one of three or more service names, such as HR, FINANCE and ERP in accessing the database. In this example, on one day, e.g. Monday, database management system 110 may have 3,000 HR connections, 300 FINANCE connections and 700 ERP connections, for a total of 4,000 connections. On another day, e.g. Wednesday, database management system 110 may have 1,000 HR connections, 1,800 FINANCE connections and 2,000 ERP connections, for a total of 4,800 connections.

Relocations by database management system 110 as described above in reference to FIGS. 2A, 2B, 2C and 2D is done individually, for each session (e.g. session X or Y) that is identified uniquely (e.g. by its client identifier). Instead of evaluating and relocating each session individually or based on client ID, the evaluation and relocation may be done on a group of sessions in some embodiments, with sessions being included in a particular group depending on a resolution level at which sessions are grouped, e.g. based on a module name within a client application I that originates the sessions (e.g. module name "new hire" in a client application I of name "HR"). Instead of grouping sessions at a module name (at a lowest resolution level), grouping of sessions may be based on a client application I that originates the sessions (e.g. at a first intermediate resolution level), or based on a service being accessed in the database management system 110 (e.g. at a second intermediate resolution level), or alternatively based on an IP address of a computer from which the sessions originate (e.g. at a high resolution level), or based on a domain to which the computer belongs (e.g. at a highest resolution level). Multiple sessions in a group (as just described) may be evaluated and relocated together, as described below for sessions X, Y and Z in FIGS. 6A, 6B, in reference to evaluation in act 132 in FIG. 7B, and in reference to memory region 614 in FIG. 12A.

In some embodiments, as illustrated in FIG. 3A, regular instance(s) 130 perform acts 131-133 (e.g. in one or more server processes, also called "foreground" processes), mirage instance(s) 120 perform acts 121-123 (e.g. in one or more server or foreground processes), and an auto tune module 160 performs operations 161 and 162 (e.g. in one or more background processes) as follows. In act 131 (FIG. 3A), regular instance(s) 130 handle request(s) in a normal manner by processing the requests on database 1002. In act 131, when there is no error, regular instance(s) 130 send the result of processing to the client application, with a success code in a normal manner, e.g. via a session in which the request was received. When an error occurs in processing the request in act 131, in some embodiments regular instance(s) 130 return an error code to the client application and update a table 694 in a relational database 1002, also referred to as an error history table 694 (FIG. 12K). As noted above in reference to branch 109C in FIG. 1C, in alternative embodiments, regular instance(s) 130 may not return an error code to the client application and instead mirage instance(s) 120 may return the error code to the client application. In some embodiments, the errors which are stored in table 694 are selected, e.g. to exclude errors that occur normally and do not indicate any issue in handling a request, such as an error indicating end of fetch (e.g. no more rows to fetch). In certain embodiments, errors stored in table 694 may be additionally documented in, e.g. a core dump or a core file/incident file.

Table 694 (FIG. 12K) is updated by regular instance(s) 130 to store each error by adding a respective row with information to describe the error, for example, a time at which the error occurred, an identifier of the error, an identifier of the session whose request was being handled when the error occurred, an identifier of regular instance 130, and software version number of the database server's software that was being executed when the error occurred. The information in each row of table 694 of some embodiments may additionally include information on an instruction stack (also called "call stack"), which is captured when the error occurs in processing the request, e.g. identifying a specific sequence of calls (also called "function calls" or "procedure calls") within software of the database server that shows transfer of control, from a top-level function (or procedure), via one or more intermediate-level functions (or procedures) to a current function (or procedure) where the error occurred.

The just-described sequence of calls may be used in some embodiments, to determine whether an error that just occurred had also occurred previously, e.g. the call stack being identical for two errors may be used as an indication that the error is not due to an update to the database server's software (e.g. see acts 722-726 in FIG. 13, described below). Table 694 (FIG. 12K) is maintained by regular instance(s) 130 and/or mirage instance(s) 120, by deletion of one or more rows, based on a preset limit, e.g. total number of rows in table 694 limited to be less than a predetermined number, such as 1000 and/or rows in table 694 limited to be no older than a predetermined duration, e.g. 24 hours. Table 694 may be further maintained by regular instance(s) 130 and/or mirage instance(s) 120, by deletion of one or more rows in which is identified a specific session that has completed or was terminated.

In some embodiments, a database server's software (which is executed by regular instance 130 and mirage instance 120) may process a request in multiple stages e.g. in three stages: (1) parse stage, (2) execution stage and (3) fetch stage. Each of these stages may include multiple steps.

For example, the parse stage may include: (a) syntax checking step, in which lexical analysis is performed on the request followed by checking it for correct syntax, and a statistic related to this step may be stored in column 626A of memory region 614 (FIG. 12A), (b) semantic checking step, in which checks are performed using metadata in the database, to find whether database objects and other object attributes in the request are correct, and a statistic related to this step may be stored in column 626B of memory region 614 (FIG. 12A), (c) authentication and access control checking step, which checks whether the session has correct authority over each object in the request, and a statistic related to this step may be stored in column 626C of memory region 614 (FIG. 12A), (d) step for requests that contain data manipulation language statements (e.g. DML in SQL), to check if the request was previously parsed, and whether reusable executable code for the request is present in library cache, and a statistic related to this step may be stored in column 626D of memory region 614 (FIG. 12A), and (e) executable code generation step, in which a plan (called "execution plan") to execute the request is prepared, including, e.g. optimization and row source generation, and a statistic related to this step may be stored in column 626E of memory region 614 (FIG. 12A).

The above-described step (d) may be skipped, when a request contains data definition language statements (e.g. DDL in SQL). Also, step (e) may be skipped, e.g. if reusable executable code is found in step (d). Moreover, the parse stage may contain additional steps (not shown). The above-described parse stage is followed by the execution stage in which database operations are performed on database 1002, by executing code generated in the parse stage, and a statistic related to this stage may be stored in column 617 of memory region 614 (FIG. 12A). The execution stage is followed by a fetch stage in which one or more rows of data are retrieved from database 1002, with the fetch stage being repeated if necessary, depending on the total number of rows responsive to the request, and a statistic related to this stage may be stored in column 618 of memory region 614 (FIG. 12A).

One class of statistics (also called "error statistics") 636 (see FIG. 12A) that may be generated in acts 131, 121 (FIG. 3A) are counts of occurrences of errors that occurred in instance(s) 130 and 120, during the above-described handling (or processing) of requests of one or more sessions. One example of error statistics 636 is shown in memory region 614 (see FIG. 12A), in cell 638 at the intersection of the first row 636A for number of segmentation faults and the second column 626A for a step of a stage (e.g. syntax checking step, in the above-described parse stage). Additional examples of such error statistics are shown in memory region 614, at the intersections of rows 636A-636F and columns 615, 626A-626E, and 616-618 in FIG. 12A. Error statistics 636, except for checksum errors, are examples of DBMS-internal statistics.

Another class of statistics (also called "resource utilization statistics") 637 that may be generated in act 131 (FIG. 3A) are measures of usage of a resource, corresponding to handling the one or more sessions. One example of resource utilization statistics 637 is shown in memory region 614 (FIG. 12A) in cell 639, at the intersection of row 637B for number of storage partitions accessed and column 626E for a specific step in processing the request (e.g. the step to generate executable code in an execution plan, which includes optimization), and this step in the database server software may determine a number of storage partitions that are to be accessed (e.g. based on use of bind values). Another example of resource utilization statistics 637 is shown in memory region 614 (FIG. 12A) in another cell at the intersection of row 637B for number of storage partitions accessed and column 617 for the execution stage. Depending on the embodiment, such a resource, whose statistics are stored in one or more rows 637, can be any other computational resource, such as memory or CPU. Resource utilization statistics 637 are examples of DBMS-internal statistics.

In some embodiments, in act 131, regular instance(s) 130 generate and store, in one or more array(s), such as memory region 614 in FIG. 12A, also referred to as internal statistics memory region 614, counts of occurrences of errors in processing multiple requests in each session (which constitute a workload) as they occur, accumulated over a most-recent time period of a predetermined duration (e.g. last 1 second). As noted above, memory region 614 is located in a portion of main memory 1060 of computer 100 (see FIG. 16). In other embodiments, in act 131, regular instance(s) 130 store in one or more error history tables 694 (see FIG. 12K), specific error codes that identify each individual error uniquely, and a specific time of the day at which that individual error occurred, and then these error history table(s) are used in act 132 periodically (e.g. every second), to generate counts of occurrences of errors, and these generated counts are stored in the internal statistics memory region 614 (FIG. 12A).

Statistic(s) of the two types described above, namely error statistics 636 and resource utilization statistics 637, are evaluated for abnormality by regular instance(s) in an act 132 (FIG. 3A) specifically by applying tests to determine whether or not the statistic(s) 636, 637 are abnormal and based thereon, whether or not new request(s) in the specific session are to be processed (e.g. by execution and fetching of data) in regular instance(s) 130. Evaluation of one or more sessions based on statistic(s) 636, 637 in act 132 (FIG. 3A) may be performed periodically, e.g. once a minute, or in response to a predetermined event, such as a crash of a process in regular instance(s) 130. Tests that are enabled, for use in evaluation of sessions based on statistic(s) 636, 637 in act 132, may be based on for example, a combination of utilization statistic(s) and/or database features that are enabled for processing this client application's request(s) and/or configuration.

Optionally, in act 132 (FIG. 3A), regular instance(s) 130 may additionally use an indication by a news outlet plug-in 591 (FIG. 11A), on presence (or absence) of hacking in a geographic location of a specific client application (or any other indication of abnormality or maliciousness of the client application, identified by name), to evaluate abnormality of the specific client application's sessions. For example, a session may be found to be abnormal in act 132 based on a threshold being exceeded by a number of news stories of hacking (or based on an indication of threat level of malicious cyber activity being higher than low), in the geographic location (e.g. a city or a state) of a computer 910 in which executes a client application I that originates the session. The just-described threshold may be specific to each geographic location, so different threshold are used for different geographic locations.

If the evaluation in act 132 (FIG. 3A) determines that a specific session's requests are normal (e.g. based on applying one or more abnormality tests to the statistics), then regular instance(s) 130 return to act 131 (FIG. 3A), to continue to process this specific session's new requests. Similarly, a change in indication from presence of abnormality (e.g. due to the threshold being met or exceeded) to presence of normality (e.g. due to the threshold not being exceeded) or an indication of threat level returning to low from a higher level, in a geographic location from which originates a session currently handled in a mirage instance 120, may be used as a predetermined event that triggers evaluation of that session's statistics for normality (e.g. in act 122 of FIG. 3A).

If the evaluation in act 132 (FIG. 3A) determines that a specific session's request(s) are abnormal then regular instance(s) 130 go to act 133, to relocate this specific session to a mirage instance 120. The relocation in act 133 may be implemented by correlating the specific session to mirage instance 120, e.g. in a row in a table (such as sessions table 696 in FIG. 12L) which may be used by dispatcher 111, and/or via message 112 at time T3 to dispatcher 111 (see FIG. 2A). Act 133 may be implemented to use, for example, another table (such as cluster table 692 in FIG. 12J) to obtain information (e.g. instance ID) to identify mirage instance 120 in message 112, e.g. by using the kind of instance as "Mirage" to retrieving a row (e.g. third row) from table 692. In embodiments where table 692 identifies multiple mirage instances (e.g. by returning corresponding multiple rows), act 133 is implemented to use additional information (described, e.g. in the next two paragraphs below) to select a mirage instance 120 that is then identified with the specific session in sessions table 696 (see last column in FIG. 12L) and/or in message 112 (see FIG. 2A). In some embodiments, table 692 (FIG. 12J) and table 696 (FIG. 12L) are included in a relational database 1002.

The additional information described, e.g. in the preceding paragraph above may relate to, for example, computational resources in a computer 100 in which a mirage instance 120 is executing, such as computing hardware in the form of number of CPUs, number of cores in each CPU, and memory in the form of portion(s) of main memory 1060 (see the last 3 columns in table 692 in FIG. 12J), which are used in act 133 of some embodiments, to determine whether a mirage instance 120 is inferior or superior relative to a regular instance 130 from which the specific session is to be relocated. A superior mirage instance 120A (FIG. 10B) is selected in act 133 of certain embodiments, e.g. when abnormal tests that were satisfied in act 132 were based on performance statistics (and not error statistics) of the specific session, e.g. as described below in reference to act 146 in FIG. 9.

Alternatively or additionally, the additional information described in, e.g. the preceding two paragraphs above may relate to, for example, specific categories of errors checked and/or additional checks 531 (e.g. see FIG. 12H) which may be enabled in respective mirage instances 120. Alternatively or additionally, the additional information may include, e.g. machine level resource utilizations in multiple mirage instances 120, which may be used in act 133 of some embodiments, to select a mirage instance 120 that has lowest resource utilization (e.g. lowest % of CPU used and/or lowest % of memory used). Hence, by performing act 133 (FIG. 3A), regular instance(s) 130 may transfer a specific session's workload that is found to be abnormal, to a selected mirage instance 120, as shown by arrow 134 (FIG. 3A). Thereafter, in regular instance(s) 130, control returns from act 133 to act 131 (described above).

In some embodiments, one or more software components of database management system 110 maintain a table 696 (FIG. 12L) that contains one row for each session whose requests are processed by an instance (such as instance(s) 120, 130 in FIG. 2A) of a database server in DBMS 110. In table 696, each row, such as row 697 (FIG. 12L), contains a column identifying the session, one or more columns identifying the client application for example by an IP address and an Application or Module name, and one or more columns to store information on relocation of the session, such as a column to identify a reason for most-recent relocation e.g. an error (or alternatively a category of the error) which satisfied an abnormality test in act 132, a column to identify the time of most-recent relocation, and column 699 to identify in reverse chronological order, the last 5 instances of the database server to which a client application I is connected by this session (so that the current instance's ID is listed first in this list).

In table 696 (FIG. 2L), a session's row, such as row 697, is automatically added when a client application initiates a session to connect to any instance of a database server in database management system 110, and this row is automatically updated when the session is relocated between instances 120, 130, and this row is automatically deleted when the session ends. Table 696 is further maintained in database 1002 by deletion of one or more rows, when these rows identify a specific session that has completed or was terminated.

Figure 13:
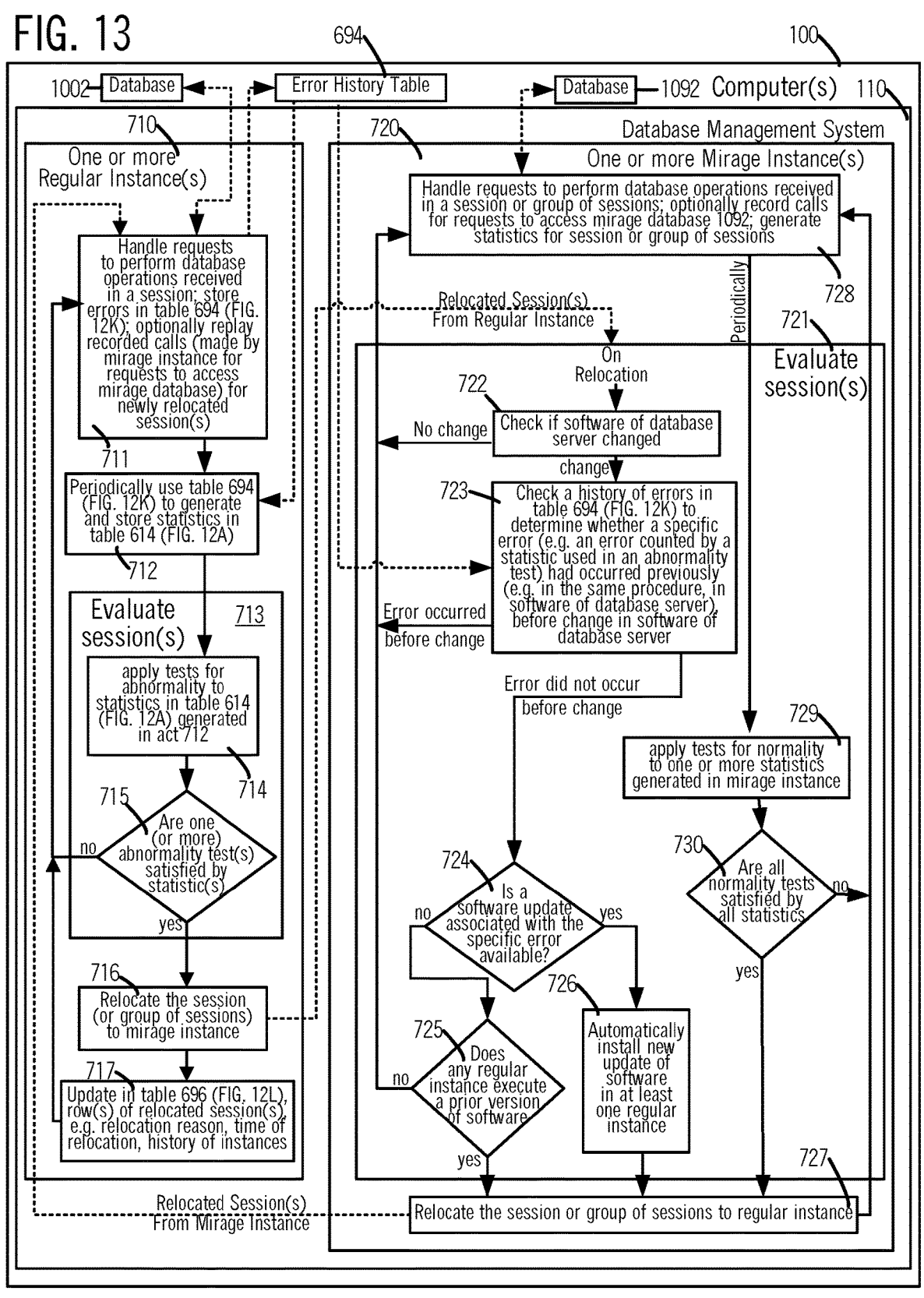
FIG. 13 illustrates, in a flow chart, acts and/or operations 711-716 performed by one or more regular instance(s) 710, and acts and/or operations 721-730 performed by one or more mirage instance(s) 720 in some embodiments of the invention.

In the illustration shown in FIG. 12L, row 697 includes "New Version" as a reason for the most-recent relocation, based on a session with ID #4 being relocated from a mirage instance with ID #3 to a regular instance with ID #2, after the mirage instance with ID #3 finds (e.g. by checking error history table 694) that a specific error that arose in executing a request in the session with ID #4 (e.g. null pointer reference, see row 698 in FIG. 12K) never occurred previously before a software update (see act 723 in FIG. 13, described below). In this example, before act 723, mirage instance #3 additionally checks and finds that a software update of itself occurred, from version 12.4 to version 12.5 (see act 722 in FIG. 13, described below). Also in this example, after act 723 mirage instance with ID #3 determines in act 724 (see FIG. 13 below) that no software update is currently available, to address this error. Finally, in this example, mirage instance with ID #3 also determines that a regular instance which is executing a prior version of database software currently exists in database management system 110, by using table 692 (FIG. 12J) to find that prior version 12.4 is currently executed by regular instance with ID #2 (see act 725 in FIG. 13). Although two instances with ID #1 and ID #3 in FIG. 12J are executing binaries of database server software of version 12.5, both these instances execute in a mode compatible with prior version 12.4, because DBMS 110 includes a third instance with ID #2 that is still executing database server software of prior version 12.4. Thus, the yes branch of act 725 in FIG. 13 is taken, and the session with ID #4 is relocated to the regular instance with ID #2 (which is executing version 12.4), and row 697 in table 696 (FIG. 2L) is updated to show instance with ID #2 as the current instance (see a value of "2" in the sequence "2, 3, 1" in a cell at row 697 and column 699, in FIG. 12L).

In an illustrative example, in act 131 (FIG. 3A), regular instance 130 generates Table A below and stores therein error statistic(s), for each client application:

TABLE A

| Application Name | Number of shared area errors in last N minutes |
|---|---|
| Client #1 | 40 |
| Client #2 | 5 |
| Client #3 | 80 |

Specifically, in an act 132, regular instance 130 (FIG. 3A) may apply a preset threshold T (e.g. 50) on the number of shared area errors in the last N minutes (e.g. 60 minutes). When a statistic (which is obtained by adding statistics of one or more sessions of a client application), crosses the preset threshold T, the sessions of this client application may be determined by act 132 to be not normal, followed by act 133 that relocates this client application's sessions to a mirage instance 120 as shown by arrow 134 (FIG. 3A). The just-described type of checking by act 132, on statistics of one or more sessions of a client application, is also referred to as coarse grained checking. The just-described coarse grained checking may be done, for example, when usage of a resource, by regular instance 130 that performs acts 131-133, is high e.g. when CPU utilization by regular instance 130 is above an upper limit for regular instances, e.g. 50%.

Mirage instance(s) 120 perform acts 121-123 (FIG. 3A) in a manner similar to acts 131-133 described above for regular instance(s) 130, except for differences noted below. In act 121 (FIG. 3A), mirage instance(s) 120 handle a specific client application's request, by performing an action that can be different in different embodiments.

In several embodiments, in act 121 (FIG. 3A), mirage instance 120 of the first feature class (described above) processes request(s) in a normal manner, e.g. by preparing an execution plan, and executing database operations on database 1002, including fetching data from database 1002. In some embodiments, in act 122, mirage instance(s) 120 perform checks that are indicated as enabled in a table (see table 650 in FIG. 12C).

In certain embodiments, mirage instance 120 of the second feature class (described above) performs act 121 to processes request(s) in a normal manner, followed by act 122 wherein it may perform the above-described checks for the first feature class and one or more additional checks, such as data validation checks 601, memory checks 602 and paranoia mode checks 603 of the type illustrated in FIG. 12H. Table 650 (FIG. 12C) may be included in relational database 1002. Moreover, in act 122 (FIG. 3A), mirage instance(s) 120 of the second feature class may additionally use an indication by a news outlet plug-in 591 (FIGS. 11A, 11B), similar to the description above in reference to act 132.

In some embodiments, in act 121, a mirage instance 120 of the third feature class (described above) checks the request(s) for syntax, and performs semantic analysis and data validation but does not execute the request(s). In certain embodiments, in act 121, mirage instance 120 of the fourth feature class (described above) also does not execute the request(s) and instead only simulates processing of the request(s) e.g. by preparing an execution plan, and simulating to execute database operations or executing the database operations on a dummy version or copy of the database being accessed.

In performing act 121, mirage instances 120 of all four feature classes (described above) use DBMS-internal information retrieved from database 1002 (see FIGS. 2A, 2B, 2C and 2D). The DBMS-internal information may be stored in database 1002 by, for example, regular instances 130 and/or mirage instances 120. Examples of DBMS-internal information include (1) DBMS-internal statistics (described above) and (2) information on data within the database, such as (a) user's rights to access a table, (b) estimate of number of rows in a table and (c) how selective is a predicate of a SQL query within a request.

In act 121 (FIG. 3A), when a request is found to be abnormal, mirage instance 120 returns an error code to the client application via a session in which this request was received (e.g. as shown by dashed arrow 581 in FIG. 11B for Client A's request, and dashed arrow 582 in FIG. 11B for Client N's request). A request may be determined to be abnormal in act 121 when the request is estimated to be too slow to execute or as being too resource intensive, e.g. based on logging which will take up disk space, or based on estimated utilization of CPU (or memory) being excessive.

Regardless of whether checking, simulating or processing is performed in act 121 (FIG. 3A), one or more DBMS-internal statistic(s) related to handling each specific client application's workload in a specific session are generated in some embodiments, similar to act 131 described above. Thus, handling of the specific session's requests by mirage instance(s) 120 in act 121 (FIG. 3A) results in new statistic(s) of the type described above.

These new statistic(s) are evaluated for normality in act 122 (FIG. 3A) periodically (e.g. every 30 minutes), or in response to a predetermined event (such as a crash of a process in mirage instance(s) 120). If these new statistic(s) are found to be abnormal (or not normal) in act 122, then control returns to act 121 (FIG. 3A), so the specific client application's requests continue to be handled by mirage instance(s) 120. But, if these new statistic(s) are determined to be normal in act 122, then act 123 (FIG. 3A) is performed wherein the specific client application's session is relocated to a regular instance 130 as shown by arrow 124 (FIG. 3A). In this manner, sessions of client applications whose requests are abnormal continue to have their requests processed in mirage instance(s) 120, and whenever any session is determined to be normal, that session is relocated to a regular instance 130.

In some embodiments, after act 121 (FIG. 3A), if the requests sent in a session were not processed in act 121 (e.g. if only checked or simulated therein), the requests are forwarded by mirage instance 120 to regular instance 130 but only when the session is found to be normal in act 122, e.g. as shown in FIG. 11B (described below) by arrows 563 and 564 for Client A's requests (and by arrows 567 and 568 for Client N's requests). Then, in act 131, regular instance 130 processes these request(s) on being forwarded from mirage instance 120 (if not processed in act 121), or processes new request(s) received in the session that has just been relocated.

In several embodiments, database management system 110 includes an auto tune module 160 (FIG. 3A) which performs operations 161 and 162 to respectively tune acts 132 and 122 (described above). Depending on the implementation, operation 161 may be performed periodically (e.g. every hour), or aperiodically (e.g. in response to an event, such as number of relocations of sessions within a time period falling below a predetermined minimum or exceeding a predetermined maximum). In some embodiments, operation 161 (FIG. 3A) tunes act 132 depending on usage of system resources at machine level in computer(s) 100 by DBMS 110, such as percentage of CPU utilized and/or percentage of memory utilized, by (1) changing which tests are enabled for use in act 132 optionally based on priorities of statistics and/or tests and/or (2) changing whether sessions are evaluated individually or as a group in act 132 e.g. by changing resolution level (described below) and/or (3) changing processing level or granularity of processing at which to perform statistics evaluation (described below). The just-described changes (1)-(3) may be combined with one another in any manner in operation 161 (and operation 162), depending on the embodiment, to reduce use of system resources by the evaluation performed in act 132 (and act 122).

In certain embodiments, a database administrator (DBA) may select a criterion to be used to identify priorities that are enabled and based thereon tests that are enabled. This DBA-selected criterion may be stored, e.g. in database 1002. The criterion's value may be generated internally within computer(s) 100, e.g. a current date and time, or a current resource utilization, or may be obtained from a source external to computer(s) 100, e.g. an indication of threat level of malicious cyber activity retrieved by computer(s) 100 from another computer accessed via the Internet. The just-described criterion's value is used by computer(s) 100 in an operation 161, to enable or disable tests that are used in evaluating sessions in act 132, as follows.

In some embodiments of operation 161, the just-described criterion's value is used by computer 100, in which regular instance 130 executes, with a table 681 (FIG. 12E) to identify which priorities are enabled and which priorities are disabled. For example, when the criterion's value matches the first row's first column in table 681, e.g. CPU utilization >90%, then priority 1 is enabled and priorities 2, 3 and 4 are disabled. Table 681 in FIG. 12E is used by regular instances 130 while table 682 in FIG. 12F is used by mirage instances 120. Hence, the just-described use of different values of the criterion in the first column of table 681 of FIG. 12E are similarly applicable to the first column of table 682 of FIG. 12F. Moreover, although only four rows are shown in table 681 of FIG. 12E (and in table 682 in FIG. 12F), other embodiments may use fewer rows or more rows.

Table 681 (FIG. 12E) and table 682 (FIG. 12F) described above may be included in relational database 1002. Although the first column in table 681 in FIG. 12E (and similarly in table 682 in FIG. 12F) is illustrated with ranges of current resource utilization (e.g. percentage of CPU used) which is a criterion internal to computer 100 in some embodiments, other embodiments may use in the first column of such a table, a criterion that is external to computer 100. One example of such an external criterion is an indication of threat level of malicious cyber activity (and corresponding potential for damage) for which a current value is obtained from (or calculated based on information from) a source (e.g. a computer of an office of homeland security of government or a cyber-security company) external to computer 100 (see FIGS. 12M and 12N, described next).

Specifically, in one example of such an embodiment, the first column of table 683 in FIG. 12M used by regular instances 130 (and similarly of table 684 in FIG. 12N used by mirage instances 120) has the following values of threat level in the corresponding four rows (from top to bottom): (1) low, (2) elevated, (3) high and (4) severe in corresponding four rows. Thus, when current value of threat level is severe (e.g. criterion's value is 4), the bottom-most row in table 683 (FIG. 12M) may be looked up by regular instances 130 of a database server, to identify all priorities as enabled (and no priorities as disabled). But, when the current value of threat level is low (e.g. criterion's value is 1), the top-most row in table 683 may be looked up by regular instances 130, to identify only the most important priority (e.g. priority 1)

as enabled (and all other priorities as disabled). Tables 683 and 684 described above may be included in relational database 1002.

Still other embodiments may use an internal criterion which is identified by a clock in computer 100, such as current time of day and day of week, as illustrated by tables 685 and 686 in FIGS. 12O and 12P that are respectively used by regular instances 130 and mirage instances 120. In such embodiments, the first column of table 685 (FIG. 12O) has the following values: (1) weekday from 9 am to 5 pm, (2) weekday after 5 pm up to mid night, (3) weekday from mid night up to 9 am, (4) weekend from 9 am to 5 pm, (5) weekend after 5 pm up to mid night, (6) weekend from mid night up to 9 am. As shown in table 685 in FIG. 12O, only the most important priority (e.g. priority 1) is enabled when the current time is between 9 am and 5 pm and current day is a weekday and all other priorities (e.g. priorities 2-4) are disabled. Additionally, as shown in FIG. 12O, when the current time is in the weekend after 5 pm and before 9 am, all priorities are enabled. Table 685 (FIG. 12O) and table 686 (FIG. 12P) described above may be included in relational database 1002.

In some embodiments, enable/disable indications of all priorities between the most important priority and the least important priority are stored and accessed via a multi-dimensional table (e.g. 2D, 3D or 4D table), or other such data structure. Depending on the embodiment, data in memory 1060 which is accessible by use of the just-described multi-dimensional table may be persisted to one or more files on disk and/or stored in a table in relational database 1002, depending on the embodiment. In certain embodiments, after act 352, in an act 353 (FIG. 3B) this multi-dimensional table is looked up, accessing a region in memory 1060 (in which data is stored), using as indices, the current values of one or more of the above-described three criteria depending on the embodiment, namely current resource utilization, current value of threat level, and current time of day and day of week, which are determined in act 352 (described below in reference to FIG. 3B). Hence, in certain embodiments, act 351 in FIG. 3B (described below) may be skipped, e.g. when all three criteria are used.

In some embodiments, as per act 351 (FIG. 3B), computer 100 receives DBA input on which particular criterion is to be used. Specifically, receipt of this DBA input by DBMS 110 simplifies implementation of use of priorities in acts 353-355 (FIG. 3B). For example, when there is no threat level input, the DBA may choose the criterion to be used as either (1) % of CPU used (or other resource utilization) or (2) current day of the week and current time of the day. When the DBA chooses the latter, the DBA may also allocate additional computational resources (e.g. computing hardware and/or memory) to DBMS 110, to maintain system performance at a desired level. As will be readily apparent in view of this detailed description, any other criteria may be used in the above-described manner, to perform acts 352 and 353 (FIG. 3B), to obtain enable/disable indications of priorities.

As described below in detail, in an act 353, priorities and respective enable/disable indications are obtained by use of the criterion, e.g. by looking up table 681 (as described above) or by use of multiple criteria to look up the multi-dimensional table. Also as described below in detail, these enabled priorities (and disabled priorities) are used by act 354 (FIG. 3B) with another table 660 (FIG. 12D), to determine which statistics (and respective tests) are enabled (and which statistics/tests are disabled). Then, act 355 stores these enable/disable indications in table 650 (FIG. 12C) for each statistic and/or test. These enable/disable indications in table 650 are then used to identify which tests (and statistics) are used by act 132 (FIG. 3A), in evaluating sessions or groups of sessions. In some embodiments, table 650 (FIG. 12C) is included in relational database 1002. In alternative embodiments, the enable/disable indications of individual tests are not stored in table 650, and instead these indications are stored only temporarily, e.g. using an array (not shown) to access a memory region in a portion of main memory 1060, and this array is internal to database management system 110 and inaccessible to a DBA.

Also, in certain embodiments, when machine level resource utilization in computer 100 is above a preset limit configured by the DBA, e.g. CPU usage >75%, operation 161 notifies regular instance 130 to evaluate sessions in groups in act 132, instead of evaluating each session individually (which is done below this limit). In several embodiments, sessions may be grouped for evaluation in act 132 (FIG. 3A) by IP address of a client application from which the sessions originate or by a client application's name (or module name), respectively illustrated by second and third columns in sessions table 696 (FIG. 12L). As noted above, in some embodiments, sessions may be grouped by a domain name, at which the client computers (in which client applications execute and from which the sessions originate) are addressable, via the Internet. As to which of the just-described groupings is used depends on an option (not shown) configured by the DBA and stored in database 1002. This option may be configured in some embodiments, to indicate to auto tune module 160 that sessions are to be evaluated individually (i.e. not grouped for evaluation), at all levels of resource utilization. In addition to enabling/disabling tests and grouping sessions, in some embodiments, depending on current resource utilization, operation 161 of auto tune module 160 may increase processing level (or coarseness of evaluation), as described below.

Additionally, in certain embodiments, operation 161 of auto tune module 160 increases a time period over which act 132 (FIG. 3A) is repeated for a session (or a group of sessions) as described herein, e.g. from once every minute to once every hour, when the session (or group of sessions) is determined by operation 161 to be relocating too often. Operation 161 determines a session to have relocated too often, e.g. when a number of relocations of the session (e.g. illustrated by a last column in table 696 in FIG. 12L) exceeds a predetermined number (such as 10). The number of relocations in table 696 is initialized to 0 when a session is first started, and thereafter incremented by 1 on each relocation between instances (e.g. in act 133 or act 123 in FIG. 3A). Moreover, in certain embodiments, when computer 100 is operating in a highest range of utilization (e.g. >95% CPU used), auto tune module 160 may totally disable evaluation of sessions in act 132 (FIG. 3A) altogether thereby to disable all relocations, e.g. to improve performance of regular instance 130.

In some embodiments, sessions are evaluated in act 132 (FIG. 3A) by tests that compare statistic(s) to thresholds, and these thresholds are not automatically changed by auto tune module 160 (FIG. 3A). However, in certain embodiments, operation 161 of auto tune module 160 changes one or more thresholds automatically, e.g. when too many sessions relocate to mirage instance(s) 120. Specifically, in some embodiments, operation 161 (FIG. 3A) uses information, which is obtained by looking up a table (e.g. sessions table 696 in FIG. 12L), to compute a percentage (also called "mirage" percentage) by dividing a current number of sessions being handled in mirage instance(s) 120 to a total number of sessions being handled in database management system 110 obtained by adding up the number of sessions in regular instance(s) 130 and in mirage instance(s) 120. When the mirage percentage is above an upper limit (e.g. 20%, configured by the DBA), operation 161 increases threshold(s) as noted next, so that fewer sessions relocate to mirage instance(s) henceforth. Specifically, in response to finding the upper limit on mirage percentage is exceeded, operation 161 (FIG. 3A) increases thresholds of abnormality tests (used in act 132) by a preset increment (e.g. 10%, configured by the DBA).

In several embodiments, thresholds are increased by the preset increment as just described in all abnormality tests, while in other embodiments one or more abnormality test(s) in which threshold(s) are increased, are automatically selected, e.g. based on statistics identified in the reasons for relocation (e.g. illustrated in the 4$^{th}$ column in table 696 in FIG. 12L). Depending on the embodiment, the just-described increase can be done on a per threshold basis. Additionally, in a few embodiments, when the mirage percentage is below a lower limit (e.g. 10%, configured by the DBA), operation 161 decreases threshold(s) as noted next, so more sessions relocate to mirage instance(s) henceforth. Specifically, in response to finding the lower limit is not exceeded, operation 161 decreases thresholds in abnormality tests by a preset decrement (e.g. 5%, configured by the DBA).

Auto tune module 160 of some embodiments includes an operation 162 (FIG. 3A) that tunes act 122 of mirage instance(s) 120 in a manner similar or identical to operation 161's tuning of act 132 of regular instance(s) 130, although specific thresholds used in normality tests applied in act 122 may be different, and in some embodiments comparisons to statistics inverted. In operation 162, auto tune module 160 computes another percentage (also called "regular" percentage), e.g. by dividing a current number of sessions being handled in regular instance(s) 130 to the total number of sessions being handled in database management system 110. When the regular percentage is below a lower limit (e.g. 10%, configured by the DBA), operation 162 increases threshold(s) as noted next, so that more sessions relocate to regular instance(s) henceforth. Specifically, in response to finding the lower limit is not exceeded, operation 162 increases thresholds of normality tests by a preset increment (e.g. 5%, configured by the DBA).

In several embodiments, thresholds are increased by the preset increment as just described in all normality tests, while in other embodiments one or more normality test(s), in which threshold(s) are increased, are automatically selected, e.g. based on reasons for relocation (e.g. illustrated in the 4$^{th}$ column in table 696 in FIG. 12L). Additionally, in a few embodiments, when the regular percentage is above an upper limit (e.g. 30%, configured by the DBA), operation 162 (FIG. 3A) decreases threshold(s) as noted next, so fewer sessions relocate to regular instance(s) henceforth. Specifically, in response to finding the upper limit is exceeded, operation 162 (FIG. 3A) decreases thresholds in normality tests by a preset decrement (e.g. 5%, configured by the DBA). Also, as indicated briefly above, operation 162 (FIG. 3A) tunes act 122 in a manner similar to operation 161's tuning of act 132.

Also, in some embodiments, a wellness measure that may be optionally used in operation 162 (FIG. 3A) may be, for example, a ratio of a number of normal requests that are processed by mirage instance 120 to the total number of normal requests that are processed by all instances (both regular instance 130 and mirage instance 120, in one embodiment). Thus, operation 162 (FIG. 3A) may change which tests are enabled for use in act 131, e.g. depending on the just-described wellness measure and/or utilization of a resource by mirage instance(s) 120, such as percentage of CPU utilized. Operation 162 (FIG. 3A) may also be performed periodically (e.g. every hour), or aperiodically (e.g. in response to an event, such an indication by news plugin on absence of abnormality (or an indication of threat level being low) in a geographic location that previously had an indication of presence of abnormality (or an indication of threat level being higher than low)).

Moreover, in operation 162 (FIG. 3A) of some embodiments, a number of times of relocation of a specific session from a regular instance 130 to a mirage instance 120 and back, within a predetermined period of time (e.g. over the last N hours), is counted, stored and compared to a limit, and when the limit is exceeded, that specific session's evaluation for normality by mirage instance 120 is delayed (to reduce usage of resources by repeated relocations), e.g. by changing a periodic time interval at which statistics are evaluated in act 122, e.g. by increasing it from one second to one minute. In certain embodiments of the type illustrated in FIG. 7B and described below, the just-described number of times of relocation is aggregated by operation 162 (e.g. by adding up) across all sessions of a client application, and this aggregate number is used by operation 162, to increase the periodic time interval of repeating act 122 for all sessions of this client application, thereby to reduce the number of relocations of this client application's sessions between mirage instance(s) 120 and regular instance(s) 130. As described below in reference to FIG. 7B, the just-described aggregation, over a group of sessions that originate in a client application, may be done differently, e.g. by aggregating over a group of sessions that access a particular service, or by aggregating over a group of sessions that originate in a computer with a specific IP address, as described below.

In some embodiments, operation 161 for regular instances (and similarly, operation 162 for mirage instances) is implemented by acts 351-359 and 361-371 of an auto tune module 160, as illustrated in FIG. 3B, as follows. Specifically, in act 351, auto tune module 160 retrieves from database 1002, a criterion to be used in automatic identification of priorities. As noted above, the criterion may be any one of the following: % of CPU utilization, or threat level or date and time, e.g. whichever one of these was selected by the DBA. Depending on the embodiment, act 351 (FIG. 3B) may be skipped, e.g. in embodiments wherein only one criterion is supported, which may be hard-coded into the software of auto-tune module 160.

Thereafter, in an act 352, auto tune module 160 determines a current value of the criterion. So, if the criterion received in act 351 is % of CPU utilization, then in act 352 (FIG. 3B), auto tune module 160 retrieves a current value of % of CPU utilization, by making a call to the operating system. If the criterion received in act 351 is date and time, then in act 352, auto tune module 160 retrieves a current value of date and time, by making another call to the operating system. If the criterion received in act 351 is threat level, then in act 352 (FIG. 3B), auto tune module 160 retrieves a current value of threat level, by invoking a plugin, such as news plugin 591 illustrated in FIG. 11A (described below).

Thereafter, in act 353 (FIG. 3B), auto tune module 160 identifies an indication of enablement or disablement of priorities, e.g. by using the current value of the criterion to look up a table (also called first table), and this table is selected to be one of tables 681 (FIG. 12E), 683 (FIG. 12M)

or 685 (FIG. 12O), based on the criterion received in act 351. Then, auto tune module 160 performs acts 354 and 355 for each statistic (and/or test), as follows. In act 354, auto tune module 160 uses a priority of a current statistic and/or test retrieved from a table, such as table 660 in FIG. 12D, with that priority's indication of enablement/disablement which was identified in act 353, to determine an indication of enablement or disablement of the current statistic and/or test. Then, in act 355, auto tune module 160 stores in a table, such as table 650 (FIG. 12C) or alternatively stores in a memory region, accessed via an array (not shown), in memory 1060, the indication of enablement or disablement of the statistic and/or test, as determined in act 354. After all statistics and/or tests are processed in acts 354 and 355 (FIG. 3B), auto tune module 160 goes to act 356.

In act 356 (FIG. 3B), auto tune module 160 checks if a resource's utilization is above a corresponding upper limit (e.g. % of CPU utilization, upper limit 80%), and if yes then auto tune module 160 goes to act 357 but if not then auto tune module 160 goes to act 358. In act 357, auto tune module 160 sets the resolution to group level and notifies the above-described evaluation performed in act 132 (see FIG. 3A), and then goes to act 358. In act 358 (FIG. 3B), auto tune module 160 checks if resource utilization is below a corresponding lower limit (e.g. % of CPU utilization, lower limit 20%), and if yes then auto tune module 160 goes to act 359 but if not then auto tune module 160 goes to act 361. In act 359, auto tune module 160 sets the resolution to session level and notifies evaluation in act 132 (see FIG. 3A), and then goes to act 361.

Auto tune module 160 performs all of acts 361-366 (FIG. 3B) described below all sessions in some embodiments, although in certain embodiments any of these acts may be skipped. Act 361 and/or act 362 may be skipped in certain embodiments, e.g. if there is to be no limit on how many times a session is relocated between instances 120, 130, or alternatively if a session is to be never relocated from mirage instance 120. Similarly, acts 363-366 may be skipped in certain embodiments, and in other embodiments all of acts 361-366 may be skipped. Some of these acts, e.g. acts 361 and/or 362, may be performed for certain sessions while being skipped for other sessions, depending on the embodiment. In act 361, auto tune module 160 checks if a session is relocating too often, and if yes then auto tune module 160 goes to act 362 but if not then auto tune module 160 skips act 362 by looping back to act 361 or going to act 363. To perform the check in act 361, depending on the embodiment, auto tune module 160 in a mirage instance 120 (or in a regular instance 130) may compare either or both of (a) number of relocations of the current session during its lifetime, as retrieved from the right-most column of table 696 (FIG. 12L) with a predetermined limit thereon (e.g. 10, set by a DBA), also called "lifetime limit", (b) number of relocations of the current session during a predetermined duration (e.g. last hour), as retrieved from the seventh column of table 696 (FIG. 12L) with another predetermined limit thereon (e.g. 2, also set by a DBA), also called "periodic limit".

In act 362, some embodiments of auto tune module 160 changes a time period over which the current session is repeatedly evaluated, e.g. increases a current time period by a preset amount or doubles the current time period, and notifies the changed time period to evaluation, e.g. in act 132 or 122 (see FIG. 3A). In certain embodiments, in act 362, instead of changing a time period of evaluation, auto tune module 160 marks the current session as not-to-be-relocated (e.g. in table 696 in FIG. 12L, in a column that is not shown)

and optionally notifies this marking to evaluation in act 122 (see FIG. 3A). So, in the just-described embodiments, evaluation in act 122 uses this not-to-be-relocated marking to skip relocation of the current session from mirage instance 120 to regular instance 130, so the current session continues to be serviced by mirage instance 120, indefinitely. The not-to-be-relocated marking of a current session may be additionally or alternatively performed by evaluation, e.g. in act 132 or 122, based on, for example, an indication of maliciousness, in any information related to a current session, such as a geographic location of a client application from which the current session originated, to implement a honey-pot. In some embodiments of auto tune module 160, acts 361 and 362 are skipped, to implement no limit on how many times a session is relocated, between regular instance 130 and mirage instance 120, so in these embodiments a session may be relocated any number of times.

In act 363 (FIG. 3B), auto tune module 160 checks if too many sessions have relocated from regular instances 130 to mirage instances 120, and if yes then auto tune module 160 goes to act 364 but if not then auto tune module 160 goes to act 365. To perform the check in act 363, auto tune module 160 of some embodiments may compute a mirage percentage (as described above), and compare this computed value to an upper limit (e.g. 20%), and if the upper limit is exceeded then this check is met (or satisfied) and the answer is yes. In act 364, certain embodiments of auto tune module 160 may change thresholds of abnormality tests (used in act 132) e.g. by increasing them by a preset increment (e.g. 10%), so fewer sessions relocate from regular instance(s) to mirage instance(s) henceforth. When performing the check in act 363, auto tune module 160 may additionally or alternatively compute a regular percentage (as described above), and compare this computed value to a lower limit (e.g. 10%), and if regular percentage is below this lower limit, this test is satisfied. In act 364 (FIG. 3B), if the regular percentage is found to be below its lower limit, in act 364, some embodiments of auto tune module 160 may change thresholds of normality tests (used in act 122) e.g. increasing them by a preset increment (e.g. 5%), so more sessions relocate from mirage instance(s) to regular instance(s) henceforth.

In act 365 (FIG. 3B), auto tune module 160 checks if too few sessions have relocated from regular instances 130 to mirage instances 120, and if yes then auto tune module 160 goes to act 366 but if not then auto tune module 160 goes to act 367. To perform the check in act 365, auto tune module 160 of some embodiments may compare the mirage percentage (described above) to a lower upper limit (e.g. 10%), and if the mirage percentage is below this lower limit, this test is satisfied. In act 365, auto tune module 160 decreases thresholds of abnormality tests (used in act 132) by a preset decrement (e.g. 10%), so more sessions relocate from regular instance(s) to mirage instance(s) henceforth. When performing the check in act 363, auto tune module 160 of some embodiments may additionally or alternatively compare the regular percentage (described above) to an upper limit (e.g. 30%), and if this upper limit is exceeded, this test is satisfied. In act 365 (FIG. 3B), if the upper limit is found to have been exceeded, in act 366, auto tune module 160 may decrease thresholds of normality tests (used in act 122) by a preset decrement (e.g. 5%), so more sessions relocate from regular instance(s) to mirage instance(s) henceforth.

Although some embodiments use a regular percentage as just described, other embodiments of auto tune module 160 may perform act 362 and/or act 365 in other ways, e.g. by checking whether a number of sessions in a regular instance exceeds a limit (also called session limit) and/or whether resource utilization (e.g. % of CPU used) of a regular instance exceeds another limit (also called resource limit). In some embodiments, acts 363, 365 and corresponding dependent acts 364 and 366 are skipped via branch 374 (FIG. 3B), when auto tune module 160 finds a flag (not shown) set to a value of "not", which indicates that automatic change of all thresholds is disabled. This flag's value may be cleared or set by a DBA in several embodiments. In some embodiments, the just-described acts 363-366 (FIG. 3B) are performed, and one or more thresholds are automatically changed as described above, when the just-described flag is found to be set to the value of "auto".

Although a description, e.g. in the immediately preceding two paragraphs above, is for some embodiments in which thresholds of all tests are automatically changeable (or all tests are not automatically changeable, as per branch 374 in FIG. 3B), other embodiments may be configured to selectively change thresholds only in certain tests and not in other tests, based on each test being flagged individually to be changeable by the value "auto" or to be unchangeable by the value "not" indicated in, e.g. a table (not shown) that is similar to table 671 (FIG. 12S) described below. Also, the changes of thresholds in acts 364 and 365 (FIG. 3B) may be made depending on a direction indicated in, e.g. another table (not shown) that is similar to table 672 (FIG. 12T) described below. Also, the amounts of preset increments or preset decrements used in acts 364 and 365 (FIG. 3B) may be different for different tests, depending on respective values thereof indicated, e.g. in yet another table (not shown).

In certain embodiments, when too few sessions are found to have relocated in act 365 (FIG. 3B), then act 366 is skipped in a situation where auto tune module 160 determines that regular instance 130 is performing well (e.g. based on finding that % of CPU used is below 30%). In this situation, as regular instance 130 is performing well, the DBA may not reduce (or otherwise change) thresholds in table 640 (FIG. 12B) and thereby not trigger relocation of sessions to mirage instance 120, in which case mirage instance 120 may have no sessions or have very few sessions.

After act 366 (FIG. 3B), auto tune module 160 performs acts 367 and 369 for each test whose priority may be automatically changed (e.g. based on each test being flagged individually as auto-prioritized in table 671 (also called "auto-prioritization table") shown in FIG. 12S, e.g. for all tests except tests on number of buffer overflows. In some embodiments, each test's flag's value of "auto" or "not" as shown in table 671 (FIG. 12S) is configurable (e.g. by a DBA). Depending on the outcome of these acts 367 and 369, auto tune module 160 additionally performs acts 368 and 370 respectively if needed, as described in, e.g. the next paragraph. Acts 367-370 (FIG. 3B) may be skipped for any tests whose flag's value is set to "not" in table 671 in FIG. 12S, e.g. for tests on number of buffer overflows because table 671 indicates that these tests' priority may not be automatically changed. Whenever there are no tests to be automatically prioritized, auto tune module 160 goes via branch 372 to act 371 (e.g. after act 366 when table 671 indicates that no tests are automatically prioritizable).

In act 367 (FIG. 3B), auto tune module 160 checks if a test that is flagged as auto prioritized (also called "current test") in table 671, is being met frequently, and if yes then auto tune module 160 goes to act 368 but if not then auto tune module 160 skips act 368 and goes to act 369. To perform the check in act 367, auto tune module 160 of some embodiments may compare the number of times the current test has been met in a predetermined duration (e.g. one hour), the number being retrieved from table 670 (FIG. 12Q), with an upper limit, the limit being retrieved from another table 680 (FIG. 12R). In some embodiments, table 670 (FIG. 12Q) is included in relational database 1002, although alternative embodiments of regular instance 130 or mirage instance 120 may use a portion of memory 1060, accessed via a data structure (e.g. array, linked list, stack or hash table), to store internally, the number of times a test has been met within a predetermined duration (e.g. 1 hour). Table 680 (FIG. 12R) may be included in a relational database 1002, depending on the embodiment.

When act 367 (FIG. 3B) indicates the respective limit is exceeded, act 368 is performed for the current test. Specifically, in act 368, a current priority associated with the current test is retrieved from table 660 (FIG. 12D), changed, and this changed value is stored back in table 660. The just-described change made by act 368 may decrease or increase a test's current priority or keep it unchanged, depending on a direction indicated in a table (also called prioritization-direction table) in database 1002, such as table 672 in FIG. 12T. Thus, based on the direction specified in table 672 for the current test, act 368 may decrease the priority (unless it is currently at the least important priority value of 4) or increase the priority (unless it is currently at the most important priority value of 1) which is then associated with the current test (by storage of the changed priority in table 660 in FIG. 12D). Table 672 (FIG. 12T) may be initialized to predetermined directions (used in act 368 or 370), and these directions may be changed manually by a DBA or changed automatically using a predetermined method (not shown) depending on the embodiment.

In some embodiments, a decrease in a priority's value associated with a current test in act 368 results in more frequent usage of the current test, and this higher usage increases the likelihood of this test being found to be met henceforth, thereby making this test more important. In one example, a current test compares the number of segmentation faults (see a cell at the intersection of row 636A and column 615 in FIG. 12C), which is an example of DBMS-internal statistics, to a limit thereon (see another cell at the intersection of row 636A and column 615 in FIG. 12D).

The just-described segmentation fault test, when flagged as auto-prioritized in the auto-prioritization table (e.g. see table 671 in FIG. 12S), may have its associated priority automatically changed (e.g. decremented by 1 to increase its importance), by act 368 being performed one or more times, until this associated priority reaches the value 1 based on which this test is used most frequently in act 132 (e.g. used at all values of the criterion, as shown in FIGS. 12E, 12M and 12O). This increase in priority of segmentation fault test may be based on a direction to increase its priority, as specified in table 672 (FIG. 12T), which is therefore an example of auto increase. In some embodiments, segmentation faults (whose frequency of occurrence may be checked in the segmentation fault test) can cause incident reports and slow down execution of other applications. Hence, when the number of segmentation faults are found to exceed a limit thereon (found by evaluation in act 132 in FIG. 3A), sessions in which these segmentation faults occur are relocated, e.g. from a regular instance to a mirage instance by act 133 in FIG. 3A.

In another example, a particular statistic (e.g. number of out-of-memory errors) exceeding a threshold thereon does not indicate any problem with requests received in the session(s) being evaluated, and instead there may be a problem in, for example, a function of an instance 710 (FIG. 13) which is currently executing a new version of database server software and this problem did not occur previously during execution of prior versions of the database server software (as described in reference to acts 722 and 723 in FIG. 13). In this example, table 672 (FIG. 12T) may contain a direction that the priority's value is to be incremented for this particular statistic (e.g. out-of-memory errors), so the corresponding test becomes less important in priority and is thereafter used less frequently, which reduces relocation of sessions from regular instances 130 to mirage instances 120 based on this statistic (e.g. out-of-memory errors) exceeding its threshold. This decrease in priority of out-of-memory errors is an example of automatically reducing noise from less important errors.

Auto tune module 160 goes from act 368 to act 369 (FIG. 3B). In act 369, auto tune module 160 checks if the current test is being met too infrequently, and if yes then auto tune module 160 goes to act 370 but if not then auto tune module 160 skips act 370 and returns to act 367 if any additional tests need to be checked in acts 367 and 369 based on which tests are flagged as auto-prioritized, but if all tests that are flagged as auto-prioritized have been checked, auto tune module 160 goes to act 371. To perform the check in act 369 (FIG. 3B), auto tune module 160 of some embodiments may compare the number of times the current test has been met in the predetermined duration which is retrieved from table 670 (FIG. 12Q), with a lower limit retrieved from yet another table (not shown, similar to table 680 in FIG. 12R). When the number of times is below the lower limit, act 370 is performed for the current test. Specifically, in act 370 (FIG. 3B), a current priority of the current test is retrieved from table 660 (FIG. 12D), changed inversely relative to act 368 (e.g. incremented by 1), and this changed value is stored back in table 660 (FIG. 12D). As noted above, an increase in the priority's value which is associated with the current test results in less frequent usage of the current test, and this lower usage decreases the likelihood of this test being found to be met henceforth, thereby making this test less important.

In one example, a test compares the number of checksum errors (see a cell at the intersection of row 636E and column 615 in FIG. 12C) to a limit thereon (see another cell at the intersection of row 636E and column 615 in FIG. 12D). When the comparison indicates that the number of checksum errors is less than the limit, the checksum error test, when flagged as auto-prioritized, may have its associated priority automatically changed (e.g. incremented by 1 to decrease its importance), by act 370 being performed one or more times, until this associated priority reaches the value 4 based on which this test is used least frequently in act 132 (e.g. used only when the criterion's value is at a specific end, e.g. date and time is in the weekend and/or when resource utilization is in the lowest range and/or when threat level is highest, as shown in FIGS. 12E, 12M and 12O). Thus, when the checksum error test is associated with the least important priority, this test is disabled at all values of the criterion except at the specific end, which correspondingly reduces resource utilization (e.g. % CPU used) otherwise needed to perform this test in evaluation unless the criterion has the just-described value at the specific end.

Auto tune module 160 goes from act 370 (FIG. 3B) to sleep in act 371 (described below) when all tests flagged as auto-prioritized have been processed in acts 367, 369, but at the end of act 370 if any auto-prioritized tests have not yet been processed in acts 367, 369 then auto tune module 160 returns to act 367 via branch 373, to process any remaining auto-prioritized tests. In act 371, auto tune module 160 goes to sleep, e.g. for a predetermined duration such as one hour, or until a specific time such as start of the next hour. On being awakened from sleep in act 371, auto tune module 160 returns to act 351 (described above in reference to FIG. 3B), thereby to implement auto-tune module 160 for regular instance 130. A similar or identical set of acts (not shown) are used to implement an auto-tune module 160 for mirage instance 120, as will be apparent from this detailed description.

Figure 4A:
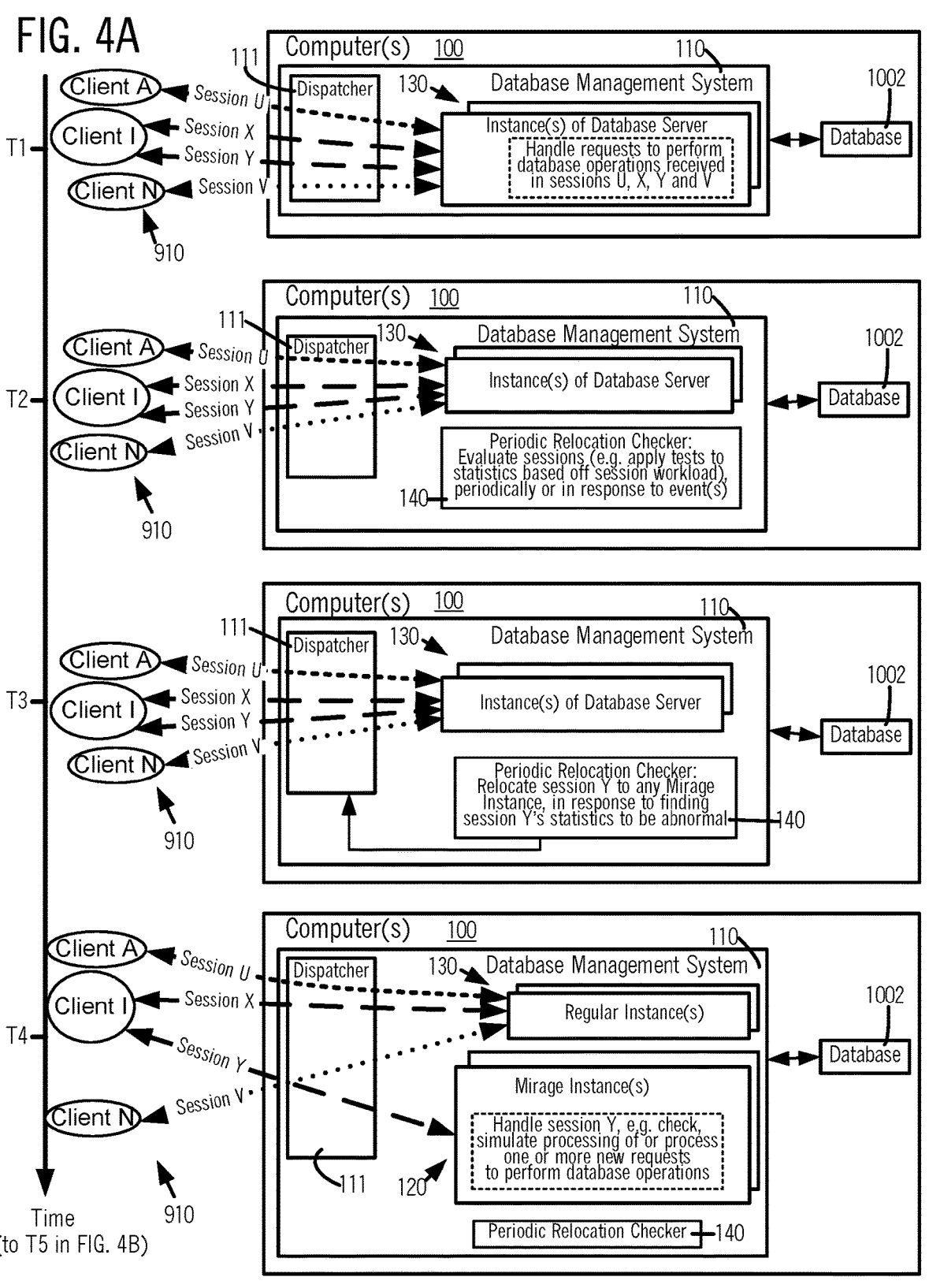
FIG. 4A illustrates, in a timing diagram similar to FIG. 2A, at a sequence of times T1-T4, data flows and acts of regular instance(s) 130 and mirage instance(s) 120 in database management system 110 that uses a periodic relocation checker 140 in some embodiments of the invention.
Figure 4B:
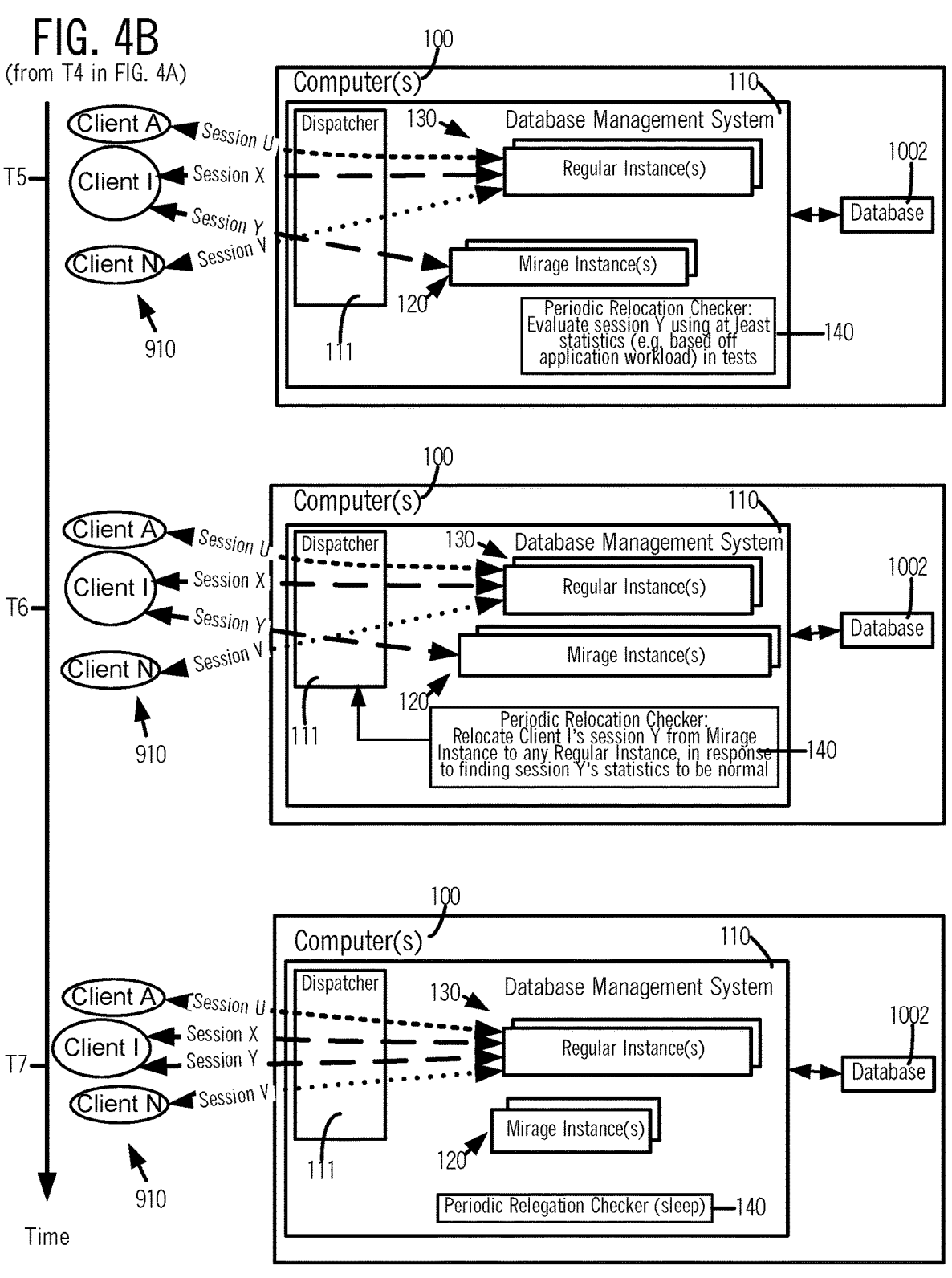
FIG. 4B illustrates, in a continuation of the timing diagram of FIG. 4A, at a later sequence of times T5-T7, data flows and acts of regular instance(s) 130 and mirage instance(s) 120 in database management system 110 in continuing to handle requests for database operations from client applications A . . . I . . . N, using the periodic relocation checker 140 of FIG. 4A.
Figure 5:
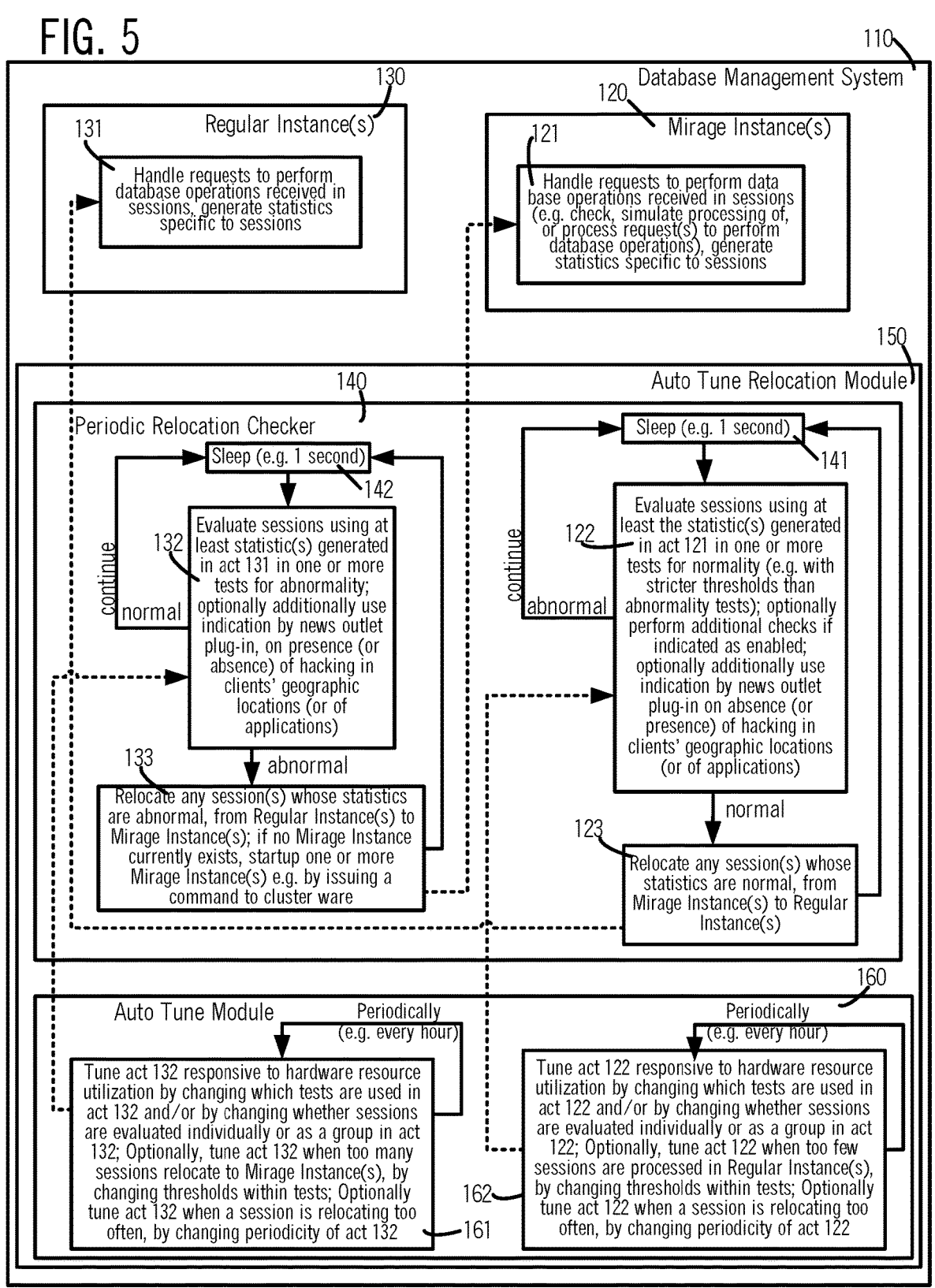
FIG. 5 illustrates, in a flow chart, acts performed by regular instance(s) 130, mirage instance(s) 120, and auto tune relocation module 150 which includes the periodic relocation checker 140 of FIGS. 4A and 4B, in some embodiments of the invention.

Although regular instance(s) 130 are shown in FIG. 2A as performing abnormality evaluation of one or more session(s) by use of statistics at time T2 and relocation of client application I's session(s) at time T3, and mirage instances are shown in FIG. 2B as performing normality evaluation of one or more session(s) by use of statistics at time T5 and relocation of client application I's session(s) at time T6, these actions may be performed outside these instances to minimize impact thereon, e.g. performed in a periodic relocation checker 140 in alternative embodiments illustrated in corresponding FIGS. 4A and 4B. Periodic relocation checker 140 may be included in an auto tune relocation module 150 that also includes auto tune module 160 (described above), as illustrated in FIG. 5. In FIG. 5, acts 131, 132, 133, 121, 122, 123, and operations 161 and 162 are similar or identical to the same acts and/or operations shown in FIG. 3A, although in FIG. 5 the acts 132, 133 are not performed in regular instance(s) 130 and the acts 122 and 123 are not performed in mirage instance(s) 120, and instead in FIG. 5 the acts 122, 123, 132 and 133 are all performed in periodic relocation checker 140. Periodic relocation checker 140 (FIG. 5) may include acts 141 and 142 of sleep for the above-described periodic time interval, after which statistics are evaluated in corresponding acts 122 and 132, respectively followed by acts 123 and 133, in turn followed by returning to the respective sleep acts 141 and 142.

Although in FIGS. 2A, 2B, 2C, 2D, 3A, 3B, 4A, 4B, and 5 described above, statistics of each session of a client application I are evaluated individually and each session is individually relocated between instances 130 and 120, in other embodiments may evaluate sessions individually followed by relocating multiple sessions, or alternatively evaluate multiple sessions as a group (depending on resolution level) followed by relocating the group of multiple sessions. As noted above, sessions may be grouped, e.g. by a module name within a client application from which sessions originate, or by a service of database management system 110 that is accessed, or by a client application I from which the sessions originate, or by an IP address of one or more client applications from which the sessions originate, depending on the embodiment, or by a domain e.g. as described below in reference to FIG. 7B.

Figure 6A:
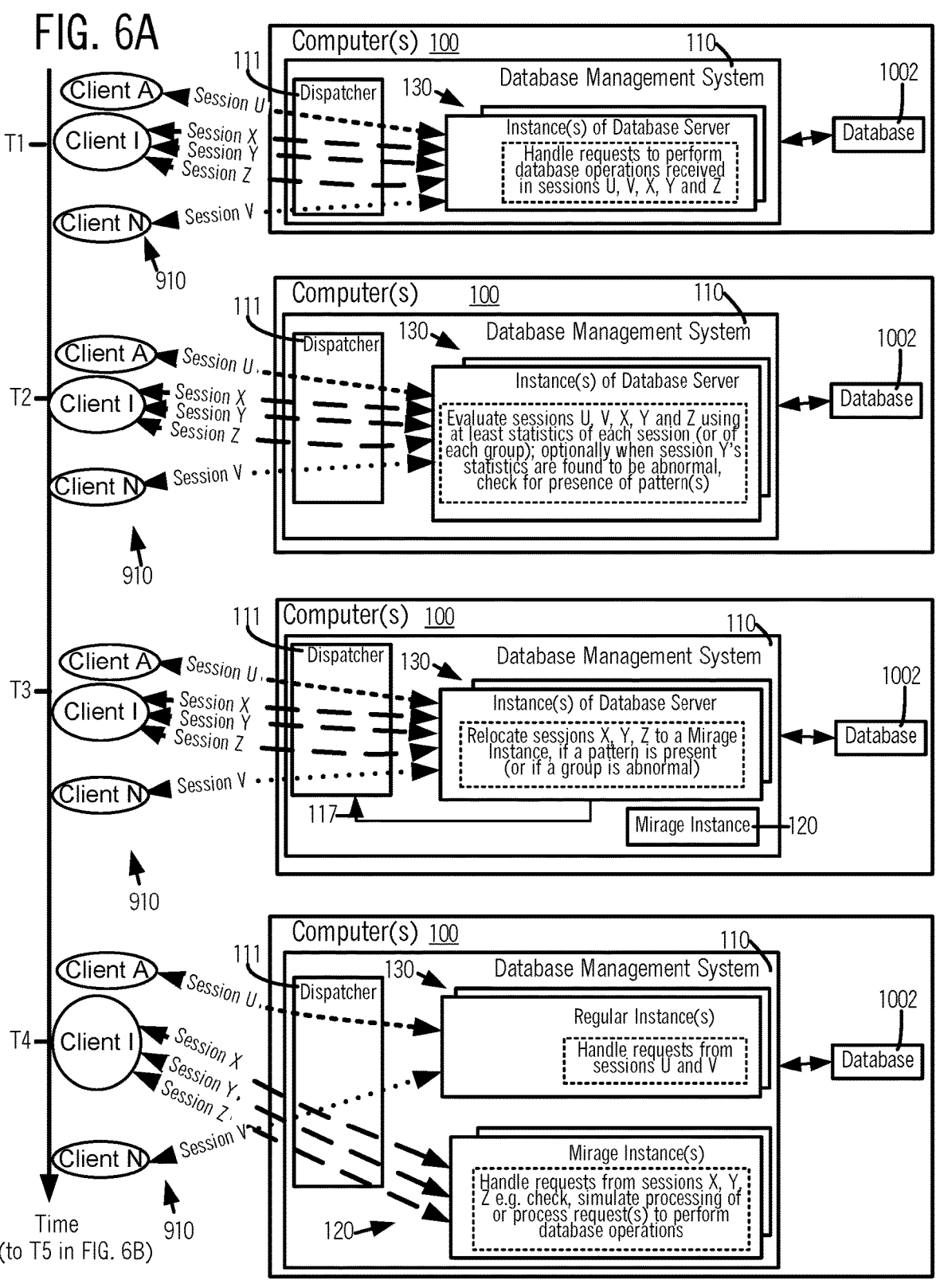
FIG. 6A illustrates, in a timing diagram similar to FIG. 2A, at a sequence of times T1-T4, data flows and acts of regular instance(s) 130 and mirage instance(s) 120 in database management system 110 that performs relegated relocations on all sessions X . . . Y . . . Z of a specific client application I to mirage instance(s) 120 while remaining sessions U . . . V continue to be handled by regular instance(s) 130, in some embodiments of the invention.

In one embodiment illustrated in FIG. 6A, at time T1, client application I has sessions X, Y and Z with a regular instance 130. Thereafter, at time T2 evaluation (e.g. based on statistics) of each of sessions X, Y and Z of client application I is performed individually or as a group (depending on the embodiment), in addition to evaluation (e.g. based on statistics) of sessions of client applications A and N. In embodiments that evaluate each session individually, at the end of this evaluation, client application I's session Y may be found to be abnormal, and all remaining sessions found to be normal (including client application I's sessions X and Z). In response to this finding, regular instance 130 uses the origin of session Y, namely client application I, to check if one or more patterns are present (e.g. in act 135 of FIG. 7A, described below).

At time T3 (FIG. 6A), which occurs after time T2, when a pattern is present or when client application I's statistics for all sessions evaluated as a group are abnormal regular instance 130 decides to relocate sessions X and Z in addition to session Y to mirage instance(s) 120, e.g. by a message 117 to dispatcher 111. As described more fully below in reference to FIG. 7A, sessions X and Z may be relocated even though the statistics of these two sessions X and Z are currently still below thresholds (and therefore even though these sessions X and Z are still normal). Although in the example illustrated in FIG. 6A, regular instance 130 relocates all sessions X, Y and Z of client application I, in other examples, regular instance 130 may be configured to relocate only a percentage of sessions in a group.

Figure 6B:
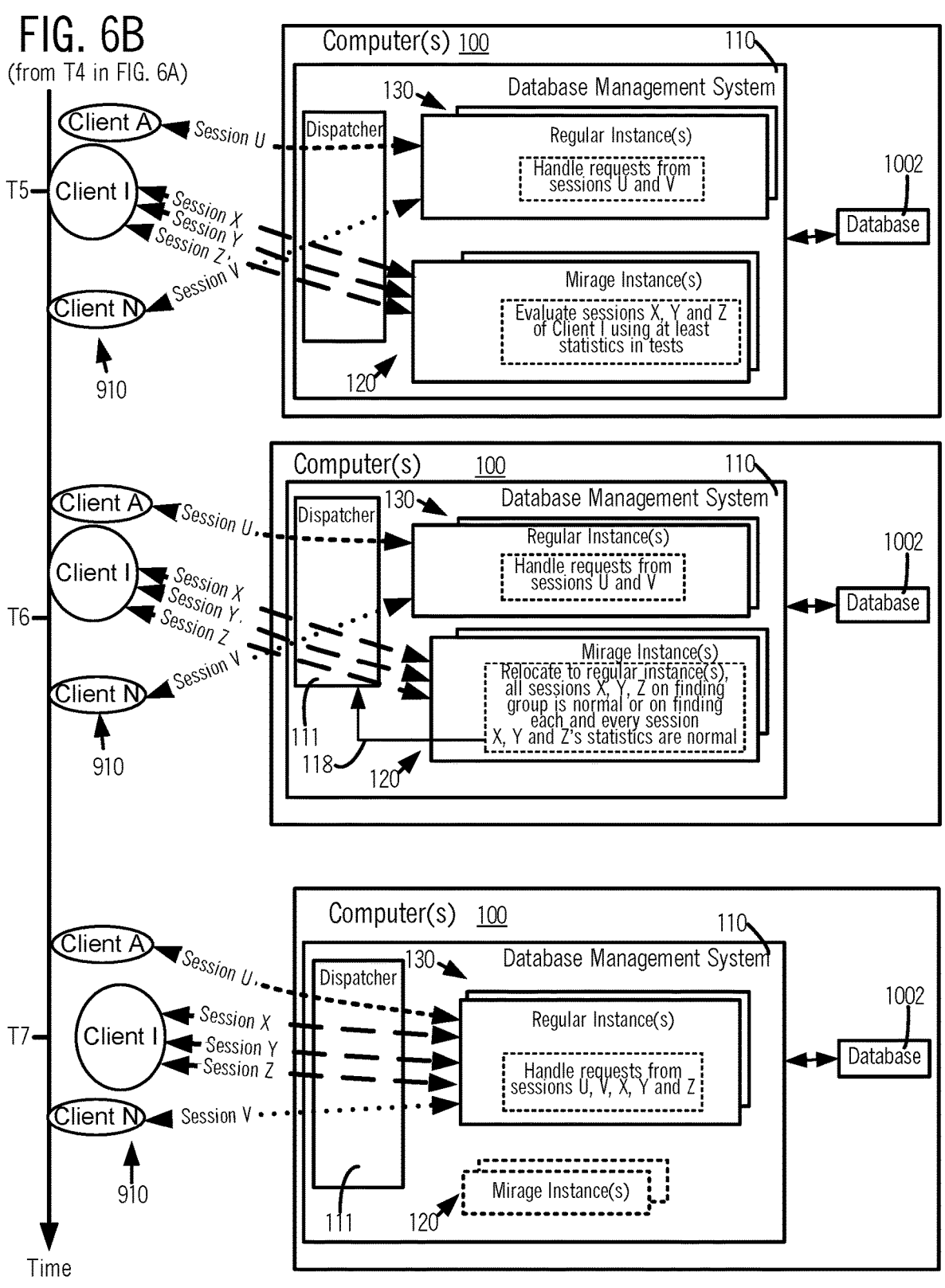
FIG. 6B illustrates, in a continuation of the timing diagram of FIG. 6A, at a later sequence of times T5-T7, data flows and acts of regular instance(s) 130 and mirage instance(s) 120 in database management system 110 performs return relocations on all sessions X . . . Y . . . Z of client application I from mirage instance(s) 120 to regular instance(s) 130, while remaining sessions U . . . V continue to be handled by regular instance(s) 130.

At time T4 (FIG. 6A), sessions X, Y and Z of client application I are handled by mirage instance(s) 120, while the sessions U and V of respective clients A and N continue to be handled by regular instance(s) 130. Thereafter, as illustrated in FIG. 6B, at a time T5 which occurs after time T4 in FIG. 6A, mirage instance(s) 120 evaluate statistics of each session X, Y and Z of client application I, for normality. For as long as sessions X, or Y or Z of client application I have statistics that are found to be not normal by mirage instance(s) 120, these sessions continue to be handled by mirage instance(s) 120. Subsequently, at a time T6, all sessions X, or Y or Z of client application I have statistics that are found to be normal, so all sessions X, Y and Z are relocated by mirage instance(s) 120 to one of regular instance(s) 130, e.g. by notifying dispatcher 111 via messages 118. Accordingly, at time T7 which occurs after time T6, sessions X, Y and Z of client application I are serviced by regular instance(s) 130, in addition to the sessions of client applications A and N.

Figure 7A:
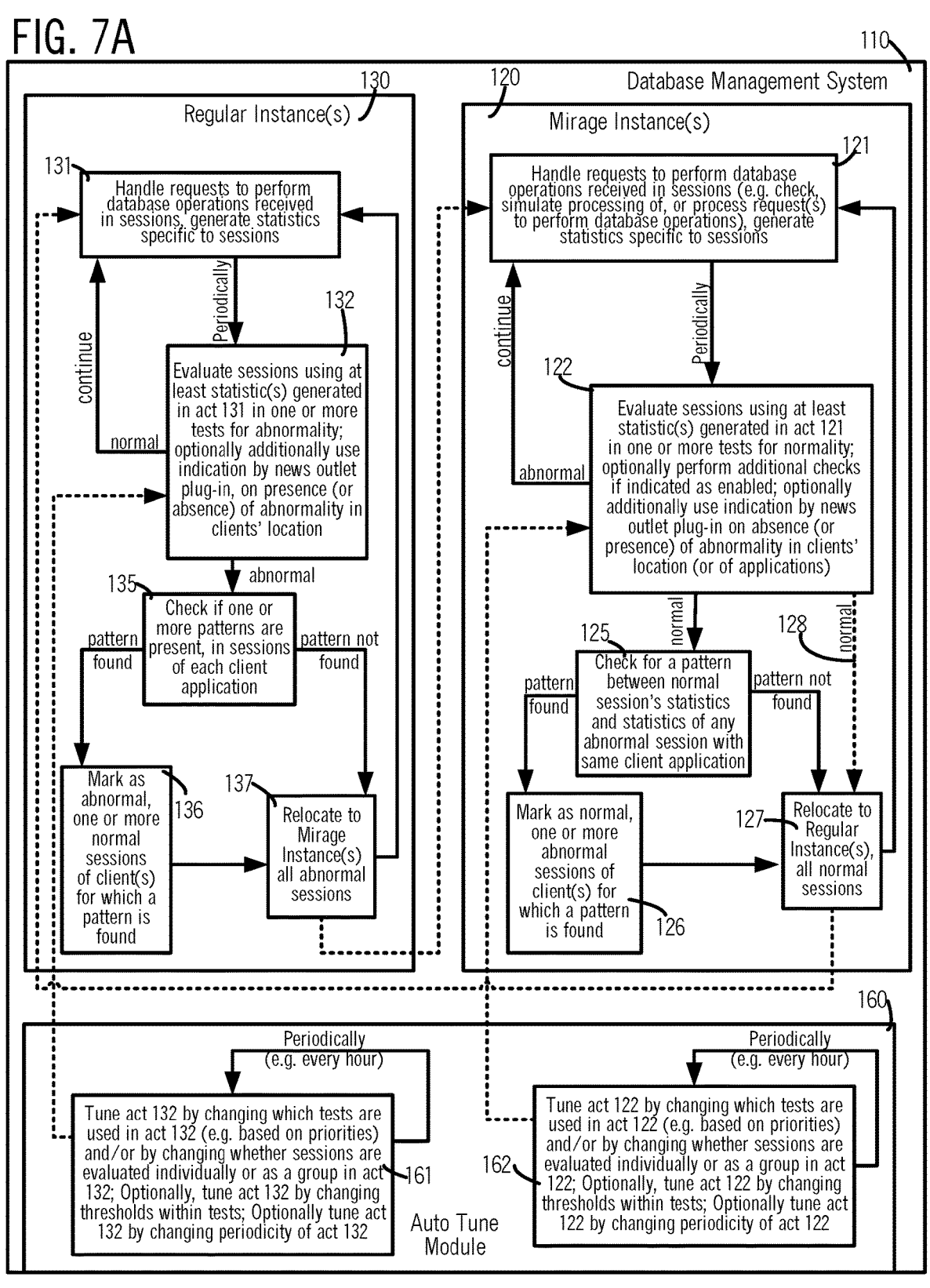
FIG. 7A illustrates, in a flow chart, acts performed by regular instance(s) 130 and mirage instance(s) 120, including acts 135-137 and acts 125-127 respectively, to evaluate and relocate normal sessions X and Z of client application I when even one of these sessions' statistics have a pattern relative to an abnormal session Y of client application I, as illustrated in FIGS. 6A and 6B, in some embodiments of the invention.

In some embodiments, acts performed by regular instance(s) 130 and mirage instance(s) 120 of FIGS. 6A-6B are illustrated in FIG. 7A. Specifically, after evaluation of statistics of each session individually in act 132, regular instance(s) 130 go to act 135 when a session (e.g. session Y) is found to be abnormal. In act 135, regular instance(s) 130 check if one or more pattern(s) are present, e.g. in sessions of the client application that originated the abnormal session. When a pattern is found in act 135 (as described more completely below), one or more sessions are marked as abnormal in act 136 even though these sessions are normal, followed by act 137.

The pattern(s) checked in act 135 by regular instance 130 depend on the embodiment. In some embodiments, regular instance 130 uses the abnormal session to identify its originating client application I, followed by identifying other sessions X and Z with this client application, and then checks if statistics of the other sessions are in pattern (also called "statistics similarity pattern") with statistics of abnormal session Y. A statistics similarity pattern may be present, if a difference between a specific statistic of session Y and a corresponding statistic of another session of the same client application I (such as session X or session Z) is less than a predetermined percentage, e.g. 30%. For example, session X's one or more specific statistics (which may be predetermined, e.g. segmentation faults) and session Z's corresponding statistics may be found by regular instance 130 to be in similarity pattern with session Y's corresponding statistics that exceeded thresholds.

In response to finding presence of the just-described pattern in act 135, regular instance 130 goes to act 136. In act 136, regular instance 130 marks sessions X and Z as abnormal (in addition to session Y), even when the statistics of each of sessions X and Z are currently still below thresholds (and thus even when these sessions X and Z are normal). Thereafter, in act 137, these sessions X and Z are relocated to mirage instance(s) 120, e.g. by a message 117 to dispatcher 111, in addition to session Y. Although in the above example, in act 136, regular instance 130 marks all other sessions X and Z of client application I, in other examples, regular instance 130 may be configured to mark only a percentage of these other sessions (e.g. 50%), in which a statistics similarity pattern is present.

In act 135 of certain embodiments, instead of or in addition to the above-described statistics similarity pattern, regular instance 130 checks for presence of a different type of pattern (called "movement-based pattern") as follows. Specifically, regular instance 130 checks in act 135 whether more than a certain number of sessions (more than N1 sessions, e.g. N1=5) in a group have been individually moved (or relocated) to a mirage instance 120, and if the answer is yes, a movement-based pattern is determined to be present. In the just-described embodiments, the sessions that were individually moved to a mirage instance 120, could have been moved in response to each specific session meeting a different abnormality test. The just-described group of sessions may be formed by grouping at any predetermined level of resolution (described below), e.g. at a level of a client application (e.g. one specific group corresponding to each specific client application). For example, a specific group for client application I may contain 5 sessions, and act 135 may find a preset limit of N1=2 is exceeded by a count (e.g. 3) of sessions in this specific group which relocated from regular instance 130 to mirage instance 120.

On finding the just-described movement-based pattern present, regular instance 130 may be configured to perform act 136 e.g. by marking as abnormal all remaining sessions of this group, or alternatively by marking as abnormal a specific percentage of sessions in the group. The just-described percentage may be scaled proportionately with the number of sessions that were moved individually. Thus, in one embodiment, when N1 sessions of a specific group are found by act 135 to have been individually moved to mirage instance(s) 120, act 136 may be configured to mark 20% of sessions in the specific group as abnormal, and correspondingly when 2*N1 sessions of the specific group are found by act 135 to have been individually moved to mirage instance(s) 120, act 136 may be configured to mark 2*20% of sessions in the specific group as abnormal.

In act 137 (FIG. 7A), some embodiments of regular instance(s) 130 relocate to mirage instance(s) 120, all abnormal sessions (e.g. marked in act 136). Act 137 is also performed in certain embodiments, when a pattern is not found in act 135, for specific individual sessions that are found to be abnormal in act 132 (described above).

Mirage instance(s) 120 (FIG. 7A) may be configured similarly to regular instance(s) 130 described above. Specifically after evaluation based on statistics of each session individually in act 122 (FIG. 7A), mirage instance(s) 120 go to act 125 when a session is found to be normal. In act 125 (FIG. 7A), mirage instance(s) 120 may also check for a pattern between the normal session and any abnormal session with a specific client application (or specific group). When a pattern is found, all sessions or a percentage of sessions with that specific client application (or specific group) may be marked as normal in act 126 (FIG. 7A), followed by act 127. The percentages used by mirage instance(s) 120 in act 126 may be different from percentages used by regular instance(s) 130 in act 136 (FIG. 7A). For example, in one embodiment, when N2 sessions of a specific group are found by act 125 to have been individually moved to regular instance(s) 130, act 126 (FIG. 7A) may be configured to mark 15% of sessions in the specific group as normal, and correspondingly when 2*N2 sessions of the specific group are found by act 125 (FIG. 7A) to have been individually moved to regular instance(s) 130, act 126 (FIG. 7A) may be configured to mark 2*15% of sessions in the specific group as normal.

In act 125 (FIG. 7A), if no pattern is found, or if no session with the same client application is abnormal, mirage instance(s) 120 may go to act 127 to relocate to regular instance(s) 130, all normal sessions. In some embodiments, mirage instance(s) 120 may be configured to go from act 122 (FIG. 7A) directly to act 127 (via branch 128 that avoids use of patterns as described above), so that in act 127 all sessions that are individually evaluated as normal are relocated to regular instance(s) 130.

Figure 7B:
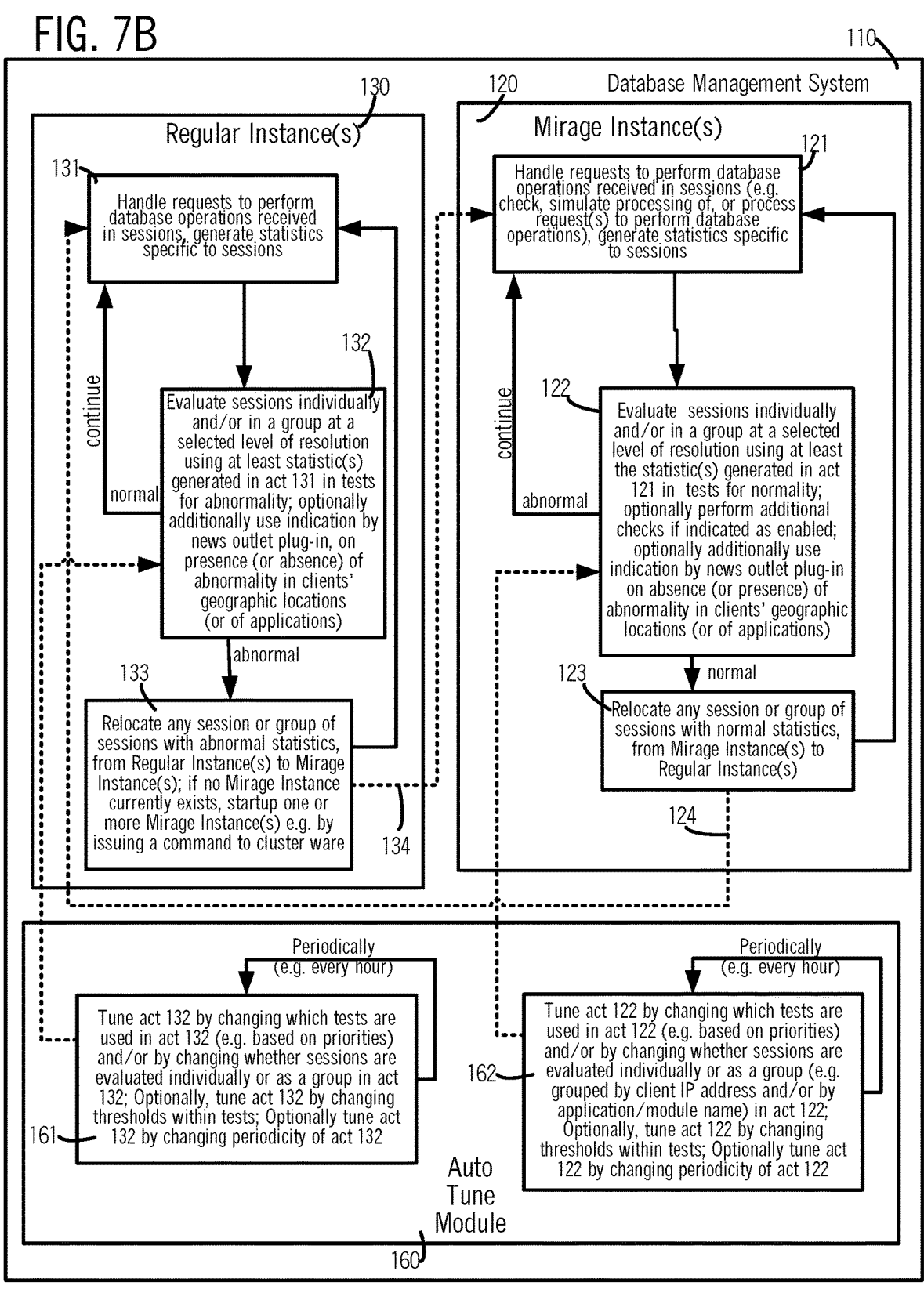
FIG. 7B illustrates, in a flow chart, acts performed by regular instance(s) 130 and mirage instance(s) 120, to evaluate and relocate sessions at a selected level of resolution, e.g. all sessions X . . . Y . . . Z of a specific client application I as illustrated in FIGS. 6A and 6B, in certain embodiments of the invention.

In certain embodiments, acts performed by regular instance(s) 130 and mirage instance(s) 120 of FIGS. 6A-6B are illustrated in FIG. 7B. Specifically, evaluation based on statistics in act 132 (FIG. 7B) is performed at a level of resolution that can be different at different times. The level of resolution used in act 132 is set by, for example, operation 161 in FIG. 7B which selects this resolution level from among multiple levels of resolution, including, for example selected) or performed similarly on statistics aggregated across multiple sessions that are grouped at the selected level of resolution. Thus, in such embodiments, regular instance 130 (FIG. 7B) is configured to evaluate all sessions of a specific client application together as a group e.g. by summing statistics of these sessions to obtain a group-level total and comparing this total to a group-level threshold obtained by scaling up a corresponding session-level threshold (e.g. shown in a cell in FIG. 12B) by the number of sessions in the group. Accordingly, in act 133 (FIG. 7B), group of sessions (or any specific session) is found to be abnormal in act 132 is relocated by regular instance(s) 130 to mirage instance(s) 120. Moreover, operation 162 of FIG. 7B is performed in a manner similar to the above description for operation 161 of FIG. 7B. Also, acts 122 and 123 of FIG. 7B are performed similar to the above description for acts 132 and 122 of FIG. 7B. In some embodiments, operation 162 of FIG. 7B may also change periodicity of act 122.

In an illustrative example, evaluation in act 132 (FIG. 7B) uses Table B below, in which each cell contains a statistic (also called "aggregate statistic") that is generated at the IP address level of resolution (described above), by aggregating session-level statistics for all sessions of all client applications executing in a specific client computer 910 having a given IP address, by act 131 (FIG. 7B). The just-described aggregating may be done, for example, when resource usage by an instance that performs acts 131-133 is high, e.g. when % of CPU utilization by a regular instance exceeds an upper limit for regular instances, e.g. 60%.

TABLE B

| I P address | Category1 Number of storage partitions accessed in period N | Category2 Percentage of CPU used in period N | Category3 Number of segmentation faults in a particular module (e.g. buffer cache) in last time period N |
|---|---|---|---|
| IPaddress1 | 40 | 0.01 | 10 |
| IPaddress2 | 5 | 0.004 | 2 |
| IPaddress3 | 80 | 1.3 | 20 |

(a) highest level of resolution for individual sessions (also called "session level"), (b) a first intermediate level of resolution for sessions that originate in a specific module of a particular client application, (c) a second intermediate level of resolution for sessions that originate in a client application that access a particular service of database management system 110 (also called "service level"), (d) a third intermediate level of resolution for all sessions of a specific client application regardless of services being accessed (also called "client application level") and (e) lowest level of resolution for sessions of all client applications that have a unique IP address (also called "IP address level"). In some embodiments, operation 161 (FIG. 7B) selects a particular resolution level, based on comparing utilization of resources to thresholds that correspond to the multiple levels of resolution. For example, when % of CPU utilization exceeds 90%, the IP address level is selected, and when % of CPU utilization is below 10%, the session level is selected, and when % of CPU utilization is greater than or equal to 10% but less than 50%, the service level is selected, and when % of CPU utilization is greater than or equal to 50% but less than 90%, the client application level is selected.

Thus, in act 132 (FIG. 7B), the evaluation is performed in the manner described above in reference to FIGS. 3A and 5 on statistics of individual sessions (when session level is In this example, act 132 (FIG. 7B) performs checking by applying a first preset threshold T (e.g. 60) on each number of Category1 errors, a second preset threshold (e.g. 1%) on each fraction in Category2, and a third preset threshold (e.g. 15) on each number of Category3 errors. In some embodiments, when any of these three thresholds is exceeded (e.g. for IPaddress3 in the last row), all sessions of all client applications in the specific client computer 910 having this IP address are relocated by act 133 (FIG. 7B) to a mirage instance 120. In certain embodiments, only when all these three thresholds are exceeded, then all sessions of all client applications in the specific client computer 910 having this IP address are relocated by act 133 (FIG. 7B) to a mirage instance 120. Moreover, as discussed above, when a certain group of sessions (e.g. grouped by IP address) is found to be relocating too often between mirage and regular instances, a periodic interval at which this group of sessions is evaluated may be changed, e.g. increased.

Figure 8:
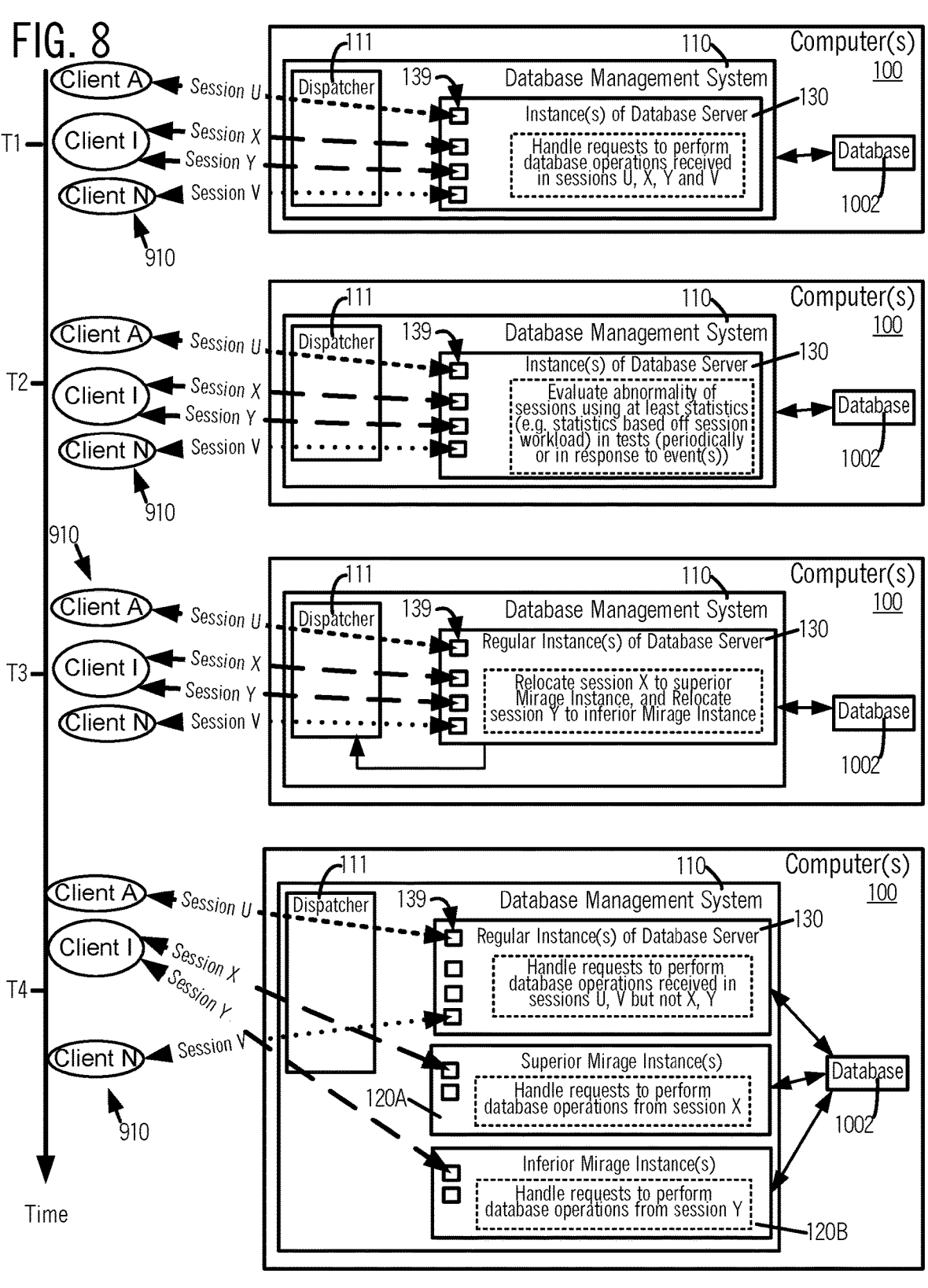
FIG. 8 illustrates, in a timing diagram similar to FIG. 2A in a sequence of times T1-T4, data flows and acts of a database management system 110 in one or more computer(s) 100, wherein session X is found to have abnormal utilization of resources and relocated to a superior mirage instance 120A while session Y is found to have abnormal number of errors and relocated to an inferior mirage instance 120B, in several embodiments of the invention.

In some embodiments, the descriptions of times T1 and T2 in FIG. 2A are applicable to times T1 and T2 shown in FIG. 8. After time T2, at a time T3 (see FIG. 8), regular instances 130 find that sessions X and Y are both abnormal, but different thresholds are exceeded by these two sessions. Specifically, at time T3 session X is found to have exceeded threshold(s) on resource utilization statistic(s), such as percentage of CPU used, or number of storage partitions accessed. In this example, session X is found to have not exceeded any thresholds on error statistics, and based on these findings session X is relocated to a superior mirage instance 120A as shown at time T4 in FIG. 8. In certain embodiments, superior mirage instance 120A may execute in a higher capacity computer (e.g. server computer D in FIG. 10B described below), although in other embodiments superior mirage instance 120A may execute in computing hardware and/or memory identical to the computing hardware and/or memory of regular instance 130.

Additionally, as shown in FIG. 8, at time T3 session Y is found to have exceeded a threshold on an error statistic (e.g. number of buffer overflow errors), and based on this finding session Y is relocated to inferior mirage instance 120B. In certain embodiments, inferior mirage instance 120B may execute in a lower capacity computer (e.g. server computer C in FIG. 10B described below), although in other embodiments inferior mirage instance 120B may execute in computing hardware and memory identical to the computing hardware and memory of regular instance 130.

Figure 9:
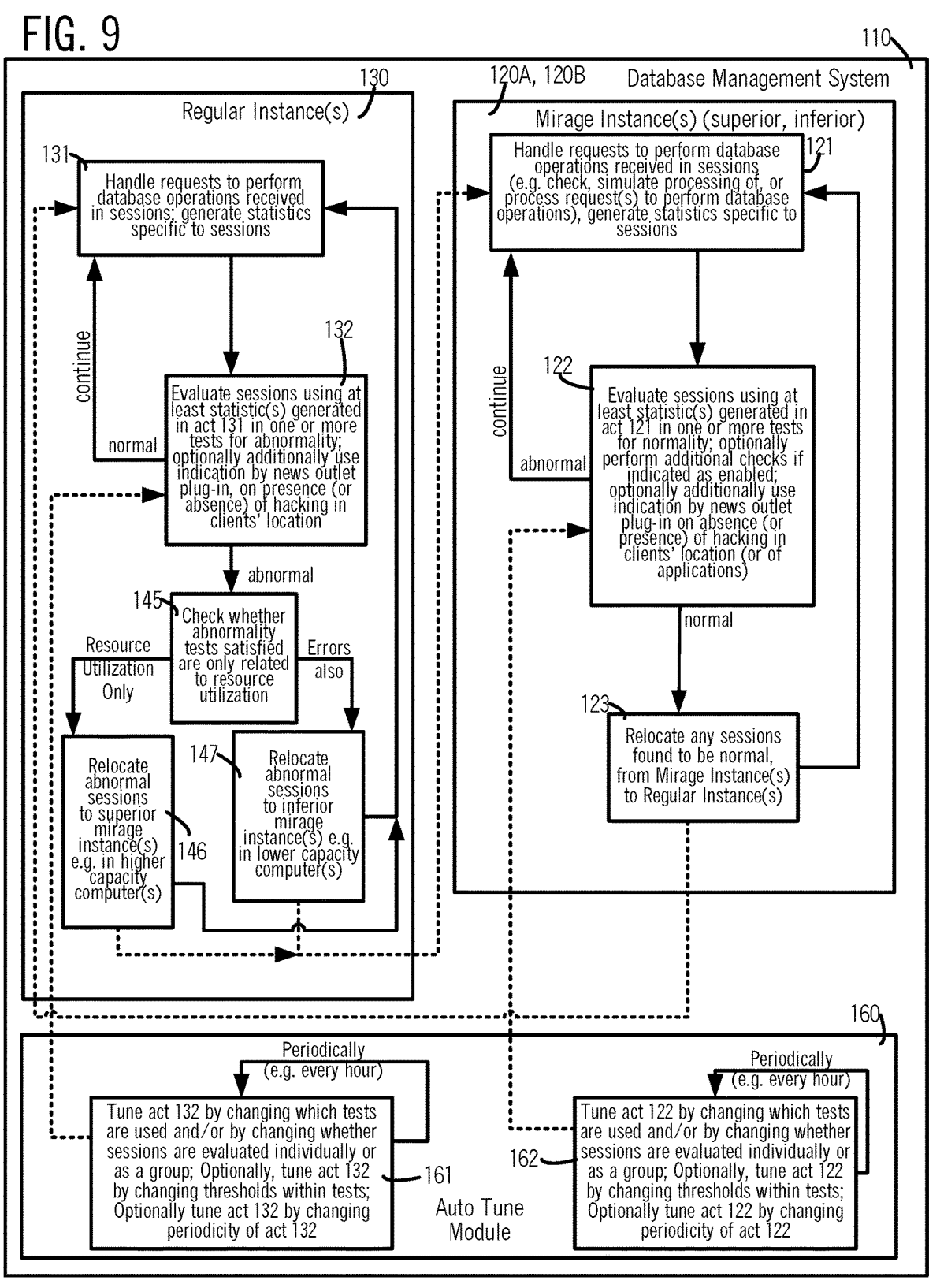
FIG. 9 illustrates, in a flow chart, acts performed by regular instance(s) 130 and mirage instance(s) 120 of FIG. 1C, to relocate sessions whose abnormal statistics are related to resource utilization, to superior mirage instance 120A in server computers with higher capacity (e.g. server computer D in FIG. 10B), and to relocate sessions whose abnormal statistics are related to errors to inferior mirage instance 120B in server computers with lower capacity (e.g. server computer C in FIG. 10B), in some embodiments of the invention.

In certain embodiments, acts performed by regular instance(s) 130 and mirage instance(s) 120A and 120B of FIG. 8 are illustrated in FIG. 9. Specifically, in FIG. 9, regular instance(s) 130 perform acts 131 and 132 as described above, e.g. in reference to FIG. 3A, and thereafter relocate sessions to different categories of mirage instance(s) 120 (described next), depending on which tests for abnormality are satisfied. In the embodiments of FIG. 9, each of mirage instance(s) 120A and 120B (together referred to as mirage instance(s) 120) performs acts 121-123 as described above, e.g. in reference to FIG. 3A. A first classification of mirage instance(s) 120B, also called "inferior" mirage instance(s), execute in server computer(s) 100 of lower capacity relative to server computers 100 in which execute regular instance(s) 130. A second classification of mirage instance(s) 120A, also called "superior" mirage instance(s), execute in server computer(s) 100 of higher capacity relative to server computers 100 in which execute regular instance(s) 130. Depending on the embodiment, "inferior" mirage instance(s) can be configured into any one of the four feature classes described above, and "superior" mirage instance(s) can also be configured into any one of the four feature classes.

In some embodiments, a database management system 110 includes mirage instances 120 of two or more feature classes described above, and a regular instance 130 relocates sessions to a specific class of mirage instances 120 that is selected based on a category in which statistics exceed respective thresholds. Specifically, in these embodiments, errors are assigned a specific category that is selected from among a set of predetermined categories (e.g. one of four categories). In a first example, errors that are segmentation faults (see row 636A in FIG. 12A) are assigned to a first category, and if a count of any statistic of this first category exceeds its respective threshold, the session (or group of sessions) is relocated to one specific class of mirage instances 120 (e.g. inferior mirage). In some embodiments, the just-described mirage instances 120 execute database server software similar or identical to regular instance(s) 130, and in other embodiments these mirage instances 120 are configured to execute additional checks (e.g. data validation checks 601, memory checks 602, and paranoia mode checks 603, as shown in FIG. 12H).

Figure 10A:
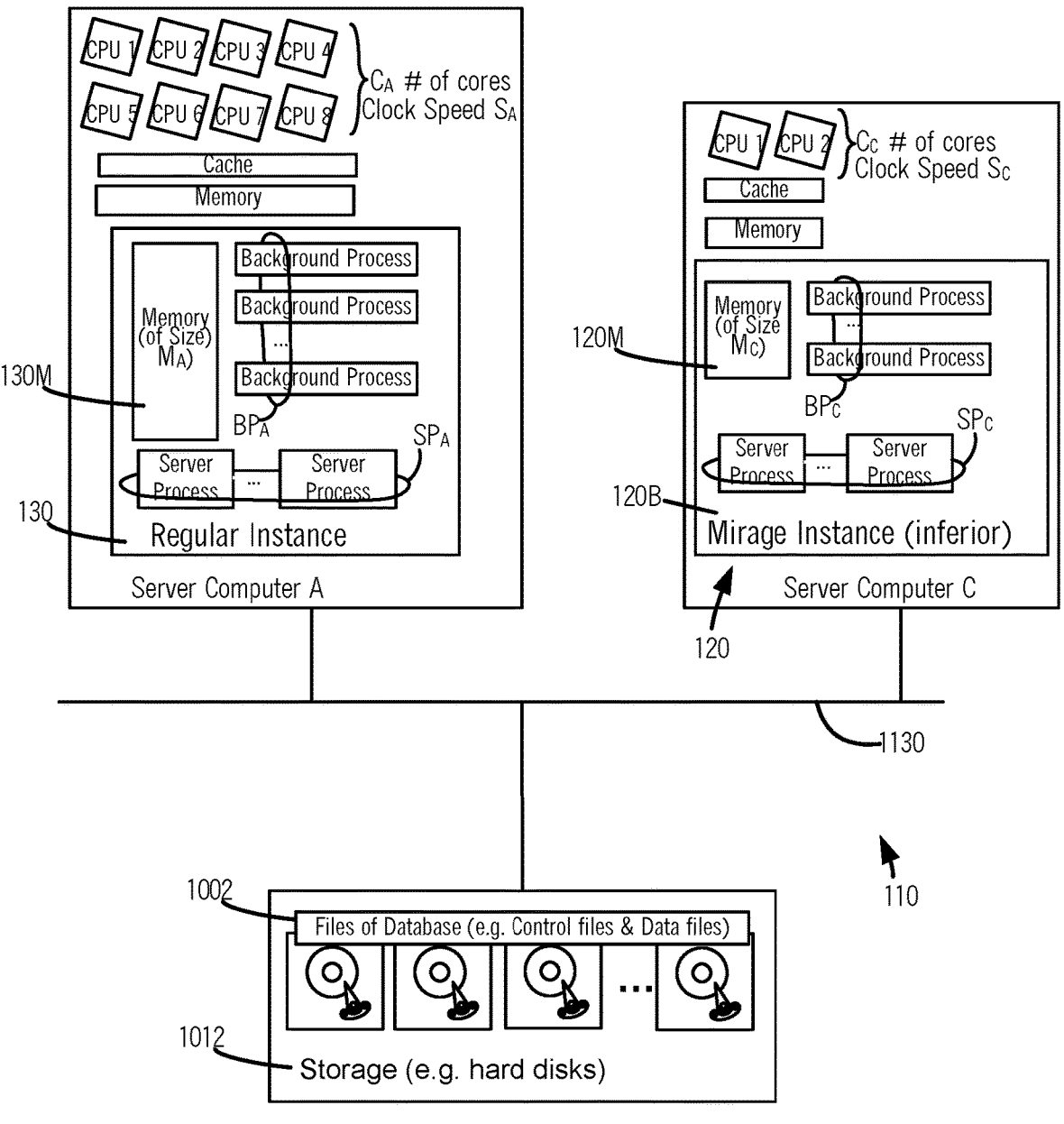
FIG. 10A illustrates, in a high level block diagram, hardware used by a regular instance 130 in server computer A, and hardware used by an inferior mirage instance 120B in server computer C which has lower capacity relative to server computer A, in some embodiments of the invention.
Figure 10B:
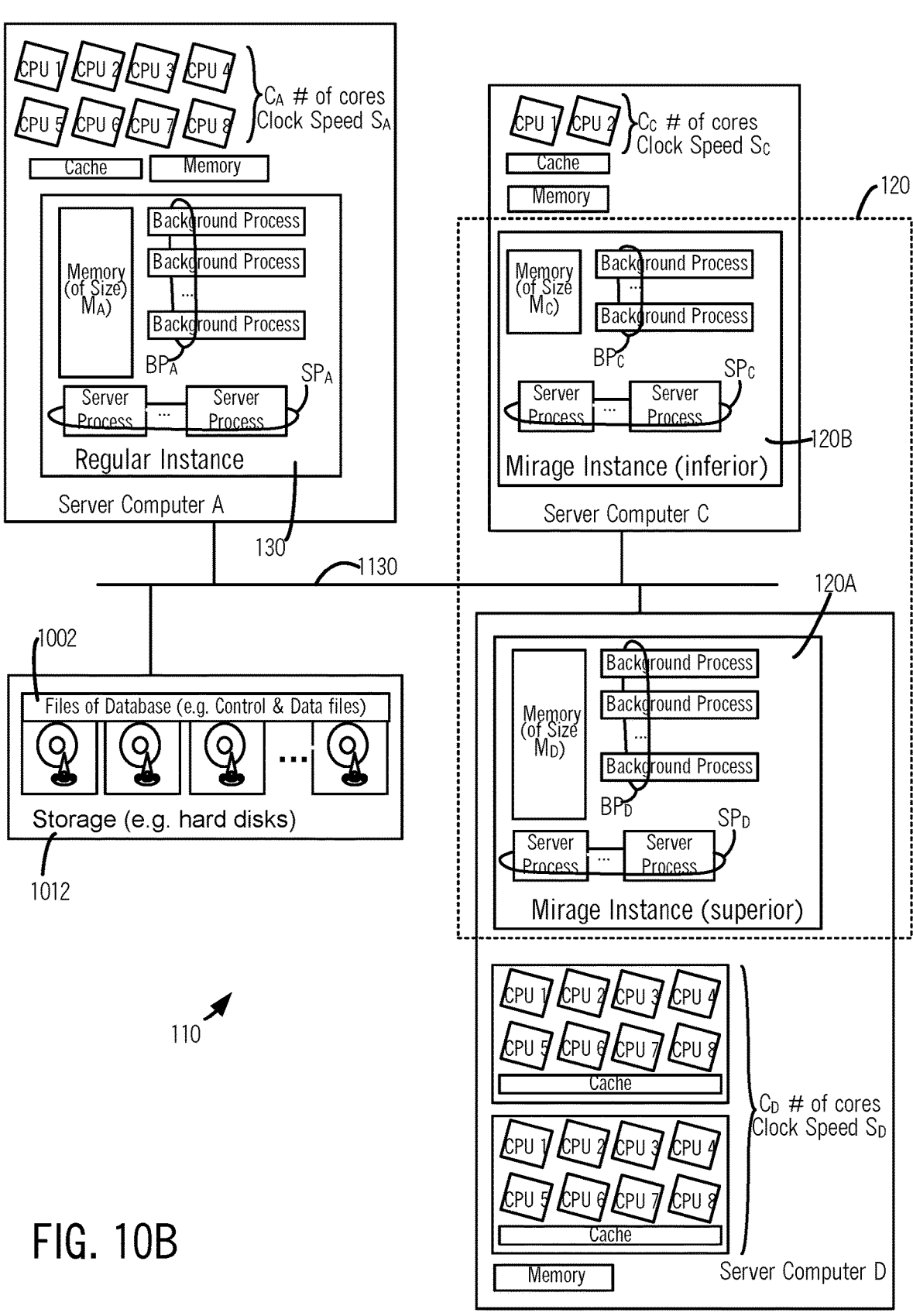
FIG. 10B illustrates, in a high level block diagram, hardware used by instances 130 and 120B in respective server computers A and C of FIG. 10A, and instance 120A executing in a server computer D which has higher capacity relative to server computer A, in some embodiments of the invention.

In a second example, out-of-memory errors (see row 636C in FIG. 12A) are assigned to a second category, and if a count of any statistic of this second category exceeds its respective threshold, the session (or group of sessions) is relocated to another specific class of mirage instances 120 (e.g. see superior mirage instance 120A in FIG. 10B). In this second example, the mirage instances 120 may be executing in a higher capacity server computer 100 relative to regular instances 130, so that the relocated sessions (or groups of sessions) are allocated resources sufficient to meet their service guarantee requirements.

After act 132 (FIG. 9) described above, in an act 145 (FIG. 9), regular instance(s) 130 check if the abnormality tests that were satisfied, in determining abnormality of a session, are only related to resource utilization statistics. In act 145, if the answer is yes (satisfied abnormality tests are only related to resource utilization) then act 146 is performed. In act 146 (FIG. 9), one or more abnormal sessions (whose resource utilization statistics are abnormal) are relocated to superior mirage instance(s) 120A, e.g. in server computer D of the type described below in reference to FIG. 10B. In act 145, if the answer is no (one or more satisfied abnormality tests are related to errors) then act 147 is performed. In act 147 (FIG. 9), one or more abnormal sessions (which have at least one error statistic that is abnormal), are relocated to inferior mirage instance 120B, e.g. in server computer C of the type described below in reference to FIG. 10A.

In some embodiments, a mirage instance 120B (FIG. 10A) executes in a server computer C that is of lower capacity than a server computer A in which executes a regular instance 130. In FIG. 10A, server computer A and server computer C are coupled to one another by a network link 1130. All the hardware components shown in FIG. 10A are used by a database management system 110 of some embodiments. Network link 1130 is also coupled to storage (e.g. in hard disks 1012) on which is stored database 1002. Although hard disks 1012 are used in some embodiments to implement storage, other embodiments may use other forms of non-volatile storage media, such as non-volatile random access memory (NV RAM), solid state drive (SSD), magnetic tape in a tape drive, etc. Network link 1130 implements a communications network that is internal to database management system 110, which is not accessible to any client computer such as client computer(s) 910, 1010. Instead, client computer(s) 910, 1010 communicate with database management system 110 via an external communications network implemented by network link 1120 (described below in reference to FIGS. 17A and 17B).

Note that a shared disk architecture is used by regular instance(s) 130 and mirage instance(s) 120B (and 120A when present) to access data in database 1002 in some embodiments as illustrated in FIG. 10A (and also in FIG. 10B), although other embodiments of database management system 110 use a sharding architecture or a shared nothing architecture to access the data in database 1002, in a manner readily apparent in view of this detailed description. For example, an internal communication channel may be used to communicate metadata, between multiple instances of a database server in a shared nothing architecture or a sharding architecture, and this same internal communication channel is also used to transfer any information related to relocating sessions between regular instances 130 and mirage instances 120. The just-described information which is transferred between instances 130 and 120 may include, for example, abnormality or normality status of a session, and/or which tests for normality or abnormality are satisfied for a session and trigger its relocation and/or number of times the status of the session changed from abnormal to normal and back within a time period, and/or statistics etc, any or all of which may be stored in a session-specific memory portion in memory 1060.

In the embodiments of FIG. 10A, server computer A includes hardware that in turn includes three or more types of hardware components, such as processors (or cores), memory, and cache. Specifically, the hardware of server computer A includes computing hardware in the form of CA number of cores (also called "first type" of hardware components) labeled CPU 1-CPU 8 that are clocked at, for example speed $S_A$. Similarly, the hardware of server computer C also includes computing hardware in the form of one or more of the first type of hardware components, namely $C_C$ number of cores labeled CPU 1-CPU 2 that are clocked at, for example speed $S_C$. Depending on the embodiment, $C_A$ (e.g. value 8) may be greater than $C_C$ (e.g. value 2) and/or, $S_A$ (e.g. value 2 GHz) may be greater than $S_C$ (e.g. value 1 GHz) thereby to make the first type of hardware component in computer C of lower capacity than the first type of hardware component in computer A. This difference in processor attributes makes server computer C inferior to server computer A.

Server computers A and C described above are both illustrated by computer 100 in FIGS. 2A, 2B, 2C, 2D, 4A, 4B, 6A, 6B, 8, 11A, 12A-12T, 13, 16 and 17A in some illustrative embodiments. Thus, DBMS 110 may contain one or more software components therein that are installed in and execute in one or more of server computers A and C illustrated in FIG. 10A, e.g. a regular instance 130 of a database server may execute in server computer A, an inferior mirage instance 120B of the database server may execute in server computer C, and one or more files of database 1002 (such as one or more control files and one or more data files) used by instances 120B and 130 may be stored on shared hard disk(s) 1012, as shown in FIG. 10A.

In addition, in the embodiments of FIG. 10A, in server computer A, regular instance 130 has allocated thereto and uses memory (also called "second type" of hardware component) 130M of size $M_A$ and stored therein software of at least two types of processes, namely server processes (which are processes of a first type, also called "foreground" processes) that are $SP_A$ in number and background processes (which are processes of a second type) that are $BP_A$ in number. Similarly, in server computer C, a mirage instance 120B has allocated thereto and uses memory 120M of size $M_C$ and includes server processes that are $SP_C$ in number and background processes that are $BP_C$ in number. Depending on the embodiment, $SP_A$ (e.g. value 30) may be greater than $SP_C$ (e.g. value 25) and/or, $BP_A$ (e.g. value 30) may be greater than $BP_C$ (e.g. value 10). This difference in number of processes makes mirage instance 120B in server computer C of a first classification (e.g. due to lower capacity in computing power) relative to regular instance 130 in server computer A (FIG. 10A). Use of memory 120M (which is of size $M_C$ as shown in FIG. 10A) in handling requests by one or more processes (also called "mirage processes") of mirage instance 120B cannot corrupt any data within memory 130M (which is of size $M_A$ as shown in FIG. 10A) in regular instance 130, at least because mirage processes do not have access to memory 130M of regular instance 130, in certain embodiments.

Depending on the embodiment, $BP_C$ may be set to zero (or to a minimal number, e.g. 2) in a specific configuration whereby a mirage instance 120B has no background processes (or the minimal number of background processes), e.g. in embodiments wherein mirage instance 120B is of the third feature class or fourth feature class (described above). Furthermore, in some embodiments, e.g. wherein a mirage instance 120B is of the third feature class or fourth feature class, memory 120M may be configured to contain no user data, except for requests being handled therein, so that any adverse effect from handling requests by mirage processes happens in memory 120M, and does not affect memory 130M.

Moreover, the second type of hardware component, namely memory 130M of size $M_A$ (e.g. value 64 GB) that is allocated to and used by regular instance 130 may be greater than memory 120M of size $M_C$ (e.g. 8 GB) allocated to and used by mirage instance 120B, thereby to make the second type of hardware component in computer C of lower capacity than the second type of hardware component in computer A. This difference in memory size also makes mirage instance 120B in server computer C of the first classification (e.g. due to lower capacity in memory) relative to regular instance 130 in server computer A (FIG. 10A). Instances 130 and 120A, 120B shown in FIGS. 10A and 10B may perform acts illustrated in flow charts shown in FIGS. 1A, 1B, 1C, 3A, 3B, 5, 7A, 7B, 9, 13, 14 and 15. In some embodiments (not shown in FIG. 10A), mirage instance 120B may be installed in and execute in a server computer that is identical in computing hardware and/or memory to server computer A in which is installed and executes regular instance 130.

In certain embodiments, a database management system 110 of the type shown in FIG. 10A may include an additional mirage instance 120A installed and executing in an additional server computer D, as shown in the bottom right side of FIG. 10B. This additional server computer D includes $C_D$ number of cores that are clocked at, for example speed $S_D$. In the embodiments shown in FIG. 10B, $C_D$ (e.g. value 16) may be greater than $C_A$ (e.g. value 8) which in turn may be greater than $C_C$ (e.g. value 2) and/or $S_D$ (e.g. value 3 GHz) may be greater than $S_A$ (e.g. value 2 GHz) which in turn may be greater than $S_C$ (e.g. value 1 GHz) thereby to make computer C of lower capacity than computer A, and computer A in turn of lower capacity than computer D.

Within server computer D (FIG. 10B) is installed and executing, additional mirage instance 120A uses memory of size MD and includes at least server processes that are $SP_D$ in number and background processes that are BPD in number. Thus, in the embodiments of FIG. 10B, $SP_D$ (e.g. value 35) may be greater than $SP_A$ (e.g. value 30) which in turn may be greater than $SP_C$ (e.g. value 25) and/or, BPD (e.g. value 40) may be greater than $BP_A$ (e.g. value 30) which in turn may be greater than $BP_C$ (e.g. value 10) and/or MD (e.g. value 128 GB) may be greater than $M_A$ (e.g. value 64 GB) which in turn may be greater than $M_C$ (e.g. 8 GB).

Therefore, mirage instance 120A (FIG. 10B) in server computer D is superior to regular instance 130, while mirage instance 120B in server computer C is inferior to regular instance 130. Regular instance 130 relocates sessions that are abnormal for exceeding resource utilization thresholds (but not exceeding error thresholds) to mirage instance 120A in server computer D as described above in reference to act 146 in FIG. 9, and relocates sessions that are abnormal for exceeding error thresholds (whether or not resource utilization thresholds are exceeded) to mirage instance 120B in server computer C as described above in reference to act 147 in FIG. 9.

In certain embodiments, database management system 110 includes one or more regular instances 130 that generate statistics 511 (FIG. 11A) specific to each session with an application I in client computer 910, during processing of requests therefrom. Statistics 511 (also called "evaluation statistics") are used by an auto tune relocation module 150 of the type described above, in one or more abnormality tests 521 (FIG. 11A) which are identified as being enabled or disabled (e.g. by flags) in a table 525. Auto tune relocation module 150 may, as described above, change the thresholds used in abnormality tests 521 (FIG. 11A) as shown by arrow 523, and may optionally change which abnormality tests 521 are enabled as shown by arrow 524. Similarly, database management system 110 also includes one or more mirage instances 120 (e.g. mirage instance 120A and/or mirage instance 120B described above) that generate statistics 512 (FIG. 11A, also called "evaluation statistics") specific to each session with a client application I in computer 910, during handling (e.g. by checking, simulating processing of or processing) requests therefrom.

Mirage instances 120 (FIG. 11A) may perform one or more additional checks 531 (shown in FIG. 12F), depending on which of these additional checks is enabled (e.g. in a table, not shown). Moreover, mirage instances 120 (FIG. 11A) use a copy 513 of the database server's inputs, policies and external inputs that are copied into a memory region of database management system 110 from regular instances 130. The just-described copying may be done, e.g. by mirage coordinator 540 (FIGS. 11A, 11B) on startup of mirage instance(s) 120 (described below). Statistics 512 (FIG. 11A) are used by auto tune relocation module 150 in one or more normality tests 526 (FIG. 11A) which are identified as being enabled or disabled (e.g. by flags) in a table 530. Tables 525 and 530 (FIG. 11A) may be retrieved by auto tune relocation module 150 initially from database 1002, and thereafter changed during operation, e.g. by use of machine learning in some embodiments.

As noted above, configuration and/or hardware of regular instance(s) 130 may differ from configuration and/or hardware of mirage instance(s) 120 in some embodiments. In certain embodiments of the type illustrated in FIG. 11A, regular instance(s) 130 are configured to have $BP_A$ number of processes of a specific type (e.g. background processes), and mirage instance(s) 120 are configured to have $BP_C$ number of processes of the same specific type (e.g. also background processes), with $BP_C$ being less than $BP_A$. Alternatively or additionally, such embodiments of regular instance(s) 130 (FIG. 11A) may be configured to use a first amount of a resource (such as maximum amount of random access memory), and mirage instance(s) 120 are configured to use a second amount of the resource, with the second amount being less than the first amount. In the embodiments illustrated in FIG. 11A, regular instance(s) 130 and mirage instance(s) 120 all execute in a single computer 100 that has a main memory 1060 (shown in FIG. 15A) in which database management system 110 (FIG. 11A) is stored, although in other embodiments such regular instance(s) 130 and mirage instance(s) 120 may be configured to execute in multiple computers, as illustrated by server computers A-E in FIG. 11B, server computers F and G in FIG. 11C and server computers H and J in FIG. 11D (described below).

Auto tune relocation module 150 (FIG. 11A) may implement, in auto tune module 160 described above in reference to acts 364 and 366 (FIG. 3B), changing of thresholds used in normality tests 526 (which are applied by act 122 of FIGS. 3A, 5, 7A, 7B and 9 on statistics 512 in FIG. 11A) as shown by arrow 528. Moreover, also as described above, auto tune relocation module 150 (FIG. 11A) may implement, in auto tune module 160 described above in reference to acts 368 and 370 (FIG. 3B), changing which specific normality tests 526 are enabled (for application in act 122) as shown by arrow 529. Similarly, auto tune relocation module 150 (FIG. 11A) may, as described above in reference to acts 364 and 366 (FIG. 3B), additionally change thresholds used in abnormality tests 521 (which are applied by act 132 of FIGS. 3A, 5, 7A, 7B and 9 on statistics 511 in FIG. 11A) as shown by arrow 523, and may optionally change which specific abnormality tests 521 are enabled (for application in act 132) as shown by arrow 524.

Furthermore, auto tune relocation module 150 (FIG. 11A) may obtain an indication of normality or abnormality of a geographic location or an indication of threat level of malicious cyber activity, from a news plugin 591 (FIG. 11A) that is included in some embodiments of database management system 110. News plugin 591 (FIG. 11A) communicates with external news sources 399, to find the indication of normality or abnormality or indication of threat level of malicious cyber activity of each geographic location in which each client application is located, and/or other indications of applications as normal or abnormal. Examples of such software plug-ins can be using HTTP, REST interfaces. News plugin 591 may be configured to update one or more tables in database 1002.

External news sources 399 may, in some embodiments, include one or more computers in a cloud different from cloud 1000 (FIG. 14) in which a computer 100 (FIGS. 2A, 2B, 2C, 2D, 4A, 4B, 6A, 6B, 8, 11A, 12A-12T, 13, 16 and 17A) is included. Thus, an indication of normality or abnormality or an indication of threat level of malicious cyber activity of a geographic location may be provided to news plugin 591 (FIG. 11A), by an external news source 399 (FIG. 11A) operated by a different cloud service provider, or alternatively by a computer of a news channel, such as CNN. In certain embodiments, news plugin 591 generates a statistic specific to one or more sessions at least by counting news reports that contain the word "hacking" in a geographic location of a client computer in which execute the one or more client applications from which originate the one or more sessions. In some embodiments, the just-described statistic may be used as a value of a criterion used as a current indication of threat level used to determine priorities that are currently enabled (and correspondingly tests/statistics that are currently enabled) for a specific session or group of sessions which originate in the above-described geographic location, as described above in reference to acts 351-354 in FIG. 3B. In such embodiments, in act 355 (FIG. 3B), indications of enablement/disablement of tests and/or statistics may be stored in a region of a portion of memory 1060

In embodiments of the type illustrated in FIG. 11A, initially when no mirage instance exists in database management system 110 and needs to be created, e.g. in response to a decision in act 133 (FIGS. 3A, 5 and 7B) to relocate a client application's session from regular instance(s) 130, auto tune relocation module 150 notifies (as shown by arrow 151 in the middle of FIG. 11A) a mirage coordinator 540 that is included in database management system 110. Mirage coordinator 540 in turn issues a command, to startup an instance of the database server as a mirage instance (e.g. as described below, in act 802 of FIG. 15), to cluster ware 550 (FIG. 11A) that is also included in database management system 110.

In embodiments of the type illustrated in FIG. 11A, client application(s) in computer(s) 910 open connections to database management system 110 with a dispatcher (or alternatively listener, load balancer) 111, and dispatcher 111 in turn hides which of regular instances 130 or mirage instances 120 handle each specific session of a client application I, so as to make movement of the specific session between instances 120 and 130 transparent to client application I. Hence, a specific client application I cannot know which of regular instances 130 or mirage instances 120 is handling (e.g. by processing, or simulating processing, or checking) its requests in sessions X, Y and Z. Therefore, a malicious actor using a specific client application I may be under the impression that regular instances 130 are affected adversely by requests therefrom, whereas such adverse effect are in fact limited to mirage instances 120 after relocation of one or more abnormal sessions of specific client application I from a regular instance 130 to a mirage instance 120 (e.g. as shown at time T4, in FIGS. 2A, 4A and 6A).

Security is one advantage of such a database management system 110 (FIG. 11A) that is responsive to information received in real time, e.g. from external news sources 399 or from abnormality evaluation by auto tune relocation module 150. In some situations, there can be periods of less manual supervision such as night and weekends where a surge of malicious activity can go unnoticed and cause damage in computer 100 (FIG. 11A), such as crashing servers, misuse of system resources such as CPU, memory, storage partitions, files, network bandwidth etc. There can be suspicious activity (e.g. reported by external news sources 399 operated by news channels) from certain geographic areas that can suddenly arise. In such embodiments, use of one or more mirage instance(s) 120 that are automatically started up by cluster ware 550 (e.g. as described in reference to act 807 in FIG. 15) in response to the information received in real time can reduce the adverse impact on regular instance(s) 130 from server crashes, resources and files impacted, due to sessions that have abnormal statistics. Thus any unexpectedly received database operation request(s) that are not normal may at most affect operation of (and even crash) processes and/or corrupt memory of one or more newly-spawned mirage instance(s) 120, while one or more regular instance(s) 130 continue to operate unaffected. Thus, in several embodiments, one or more mirage instance(s) 120 are started on demand, e.g. by cluster ware 550 in database management system 110 that starts up mirage instance(s) 120 in real time, e.g. in response to commands from mirage coordinator 540 (e.g. in act 807 of FIG. 15, described below).

In some embodiments, database management system 110 includes a mirage instance manager 590 shown in FIG. 11B, which is located outside of instances of a database server, such as regular instances 569, 570 and mirage instances 566 and 562 that may be included in a database cluster 560. Instances 562, 566, 569, 570 of FIGS. 11B-11D may implement one or more acts and/or steps and/or operations and/or features and/or functions that are similar or identical to above-described instances 120, 130 of FIGS. 1A, 1B, 1C, 2A, 2B, 2C, 2D, 3A, 3B, 4A, 4B, 5, 6A, 6B, 7A, 7B, 8, 9, and 11A. In embodiments of the type illustrated in FIG. 11B, each of instances 569, 570, 566 and 562 execute in a different computer relative to one another. Specifically, regular instance 569 executes in server computer A (FIG. 11B), regular instance 570 executes in server computer B, mirage instance 566 executes in server computer C, and mirage instance 562 executes in server computer D, and all of server computers A-D as well as server computer E (described next) are networked together in database cluster 560 by an internal communications network. In addition to server computers A-D, database management system 110 (FIG. 11B) also includes a server computer E in which execute at least mirage instance manager 590 and dispatcher 111. Depending on the embodiment, one or more software components included in mirage instance manager 590 (as described in, e.g. the next paragraph below), may be additionally executed in one or more of server computers A-D.

Figure 17A:
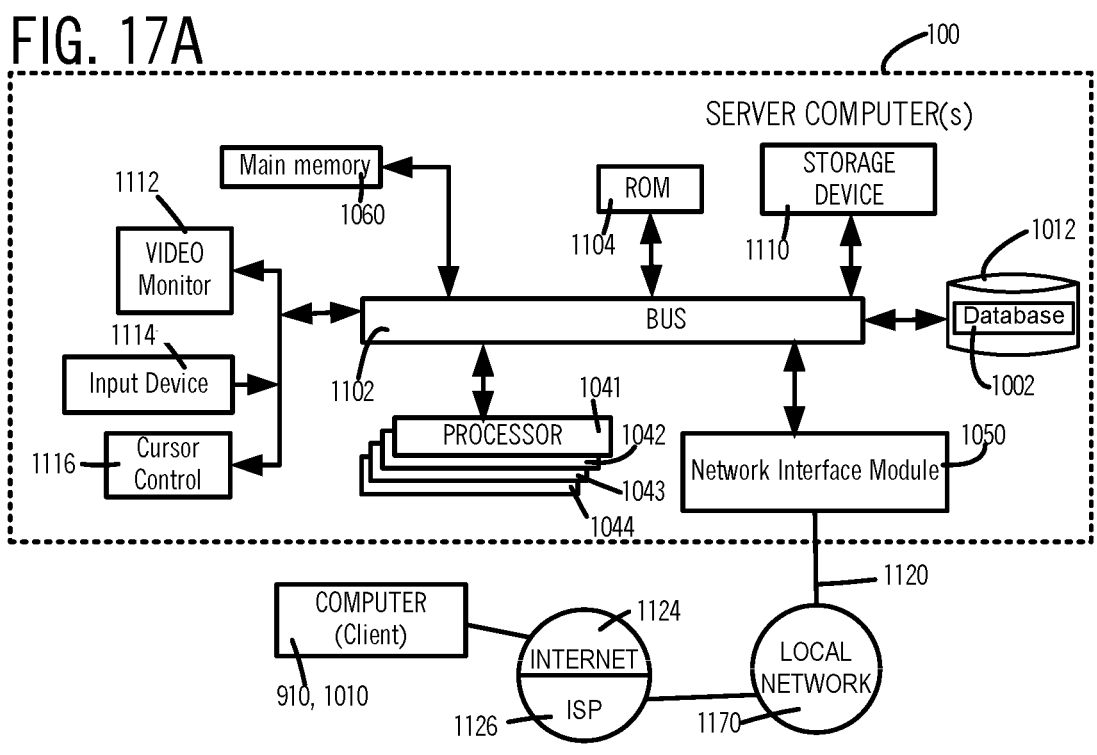
FIGS. 17A and 17B illustrate, in high level block diagrams, hardware used to respectively implement server computer(s) 100 and client computer(s) 910 and 1010 of FIGS. 1A, 1B, 1C, 2A, 2B, 2C, 2D, 4A, 4B, 6A, 6B, 8, 10A, 10B, 11A-11D, 12A-12T, 13, 14 and 16 in some illustrative embodiments.

Each of the just-described server computers A-E (FIG. 11B) may be implemented as described in reference to server computer 100 illustrated in FIG. 17A, although in some embodiments only a single database 1002 is present and accessed by server computers A-E (as shown in FIG. 11B).

Mirage instance manager 590 (FIG. 11B) includes an auto tune module 150A (FIG. 11B) similar or identical to the above-described auto tune module 160 (see FIGS. 3A, 3B, 5, 7A, 7B and 9), a periodic relocation checker 150B (FIG. 11B) which is similar or identical to the above-described periodic relocation checker 140 (see FIG. 5). Auto tune module 150A (FIG. 11B) and periodic relocation checker 150B (FIG. 11B) may be together included in an auto tune relocation module 150 (FIG. 11A) as described above. Mirage instance manager 590 (FIG. 11B) also includes a copy 513 of the database server's inputs, policies and external inputs as described above in reference to FIG. 11A (e.g. copied from corresponding data of regular instance(s) 130, for use by mirage instances). Mirage instance manager 590 (FIG. 11B) further includes tests 521, 526 and enable/disable tables 525, 530 (e.g. implemented by a matrix in main memory 1060), mirage coordinator 540, and news plugin 591 as described above in reference to FIG. 11A.

In some embodiments illustrated in FIG. 11B, when a request to perform a database operation is first received from client application A, a mirage instance 562 may be selected to handle this request, e.g. based on configuration by a DBA. Hence, this request from client application A is forwarded by dispatcher 111 (as shown by arrow 561 in FIG. 11B) to a server computer D, in which mirage instance 562 is executing. The mirage instance 562 in server computer D checks the request for syntax, and checks its resource usage (e.g. by simulation). When these statistics are evaluated and determined to be normal by mirage instance 562, then server computer D forwards the request from a client application in a computer 910 to one of regular instances 569, 570 executing in one of server computers A, B (as shown by arrows 564 and 563). Another request from client application N may be similarly acted upon, e.g. by dispatcher 111 forwarding the request to a mirage instance 566 in another server computer C (as shown by arrow 565). Server computer C then forwards this request from client application N, if found to be normal, to one of regular instances 569, 570 executing in server computer A or server computer B (as shown by arrows 567 and 568).

Although each of regular instances 569, 570 and mirage instances 566 and 562 execute in separate computers A-D in embodiments of the type illustrated in FIG. 11B, two (or more) such instances may share a single computer in other embodiments, as illustrated in FIGS. 11C and 11D. Specifically, in the embodiments of FIG. 11C, regular instances 569, 570 execute in a server computer F (in which also execute mirage instance manager 590 and dispatcher 111), while mirage instances 566 and 562 execute in another server computer G. In the embodiments of FIG. 11C, any client application workload that causes too many errors or requires too many resources, cannot affect performance of regular instances 569 and 570 that execute in server computer F, after that workload has been relocated to mirage instances 569 and 570 that execute in server computer G (e.g. because server computer G may be on a different subnet, relative to server computer F). In alternative embodiments shown in FIG. 11D, regular instance 569 and mirage instance 566 execute in a server computer H (in which also execute mirage instance manager 590 and dispatcher 111), while regular instance 570 and mirage instance 562 execute in another server computer J.

In some embodiments, in each session, a client application's request(s) to perform database operations to a database management system 110 are handled (e.g. in above-described act 121 by a mirage instance 120, or in above-described act 131 by a regular instance 130), in multiple stages as noted above, which may include, for example, a parse stage, an execution stage, and a fetch stage. Such stages (and statistics related to their execution) are typically internal to database management system 110 and not normally accessible to any client application, such as client applications A . . . I . . . N (FIGS. 11A, 11B). Statistics 511, 512 (FIG. 11A) are typically stored in one or more memory regions 614 (included in a portion of main memory 1060 shown in FIG. 16) that may be accessed by instances 120, 130 using a data structure defined in software of a database server in DBMS 110. Examples of the just-described data structure are arrays (also called "statistics arrays") maintained by respective instances 130 and 120 (FIG. 11A), similar or identical to a two-dimensional arrangement of data in memory region 614, as shown in FIG. 12A. Instead of arrays as just described, other data structures may be used by instances 130 and 120 to store statistics 511 and 512 (FIG. 11A) in memory region 614 (FIG. 12A), e.g. linked lists or stacks or hash tables, depending on the embodiment.

Figure 16:
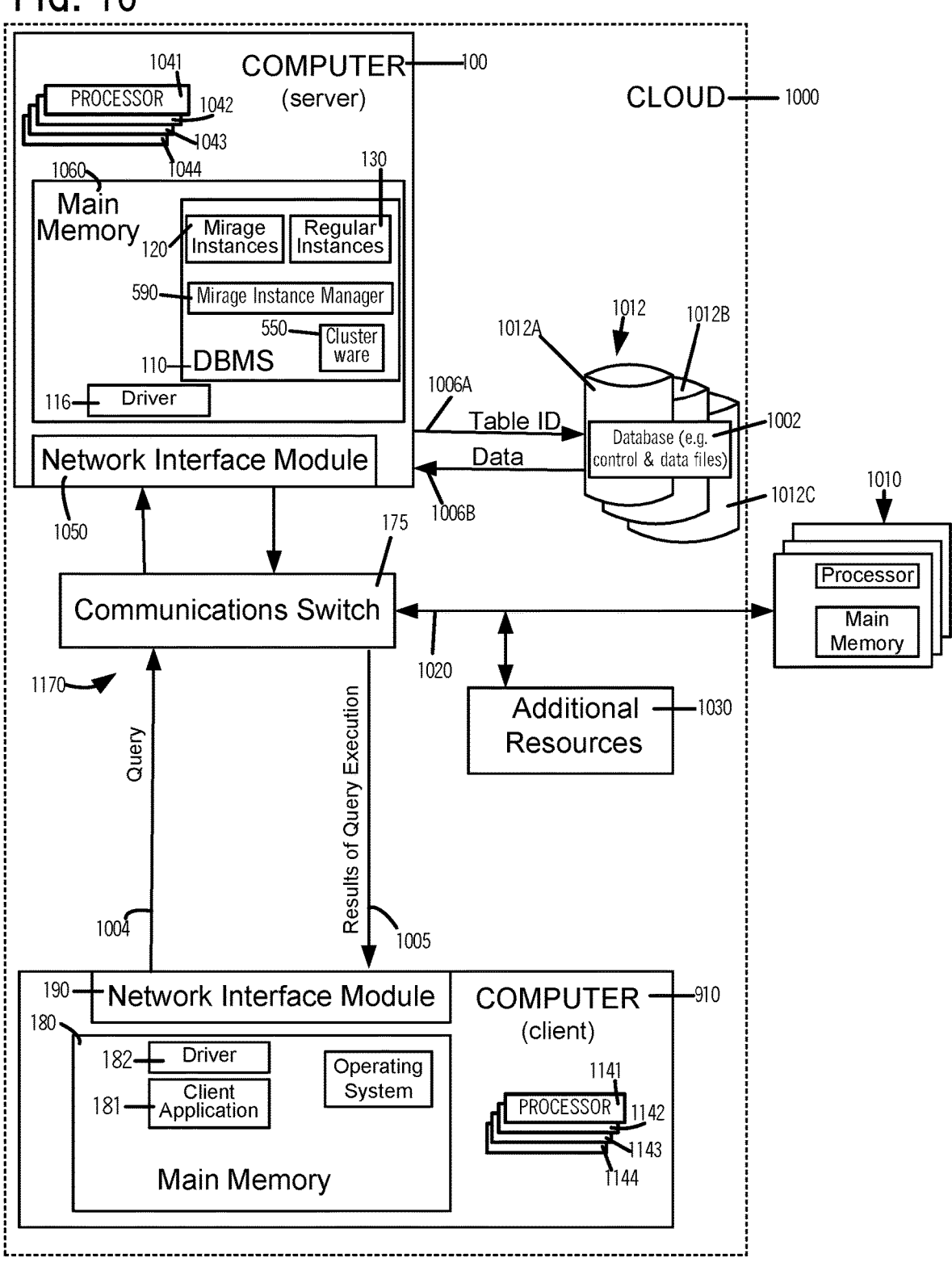
FIG. 16 illustrates, in a data flow diagram, a server computer 100 in which executes a database management system 110 that performs one or more acts of the type illustrated in FIGS. 1A, 1B, 1C, 3A, 3B, 5, 7A, 7B, 9, 13, 14 and 15, and client computer(s) 910 and 1010 that send requests to perform database operations.

Although a single statistics memory region 614 is shown in FIG. 12A, database 1002 of some embodiments contains multiple statistics regions in memory 1060 (FIG. 16). For example, one statistics memory region may be used for each individual session (e.g. located in a portion of memory 1060 allocated for the individual session, also called session-specific memory portion) or alternatively one statistics memory region may be used for each group of sessions, when resolution is at group level (e.g. located in a portion of memory 1060 allocated for the group, also called group-specific memory portion). In certain embodiments, the just-described session-specific memory portion and/or group-specific memory portion may be persisted to disk (or other such non-volatile storage media) at periodic time interval(s), such as hard disk(s) 1012 (FIG. 16). Thus, for each session (or group of sessions), a corresponding memory region 614 (FIG. 12A) in a portion of memory 1060 may be used to store statistics generated by regular instance 130 and/or statistics generated by mirage instance 120. In some embodiments, when resolution is at group level, statistics (also called group-level statistics) are incremented in a group-specific memory region 614 (FIG. 12A) in memory 1060 (FIG. 16) across all sessions within a group, even when sessions are serviced by different instances, e.g. some sessions in the group serviced by a regular instance 130 and remaining sessions in the group serviced by a mirage instance 130.

In some embodiments, data which is persisted on disk (e.g. in one or more files), from the above-described session-specific memory portion, may be used by database management system (DBMS) 110 to re-start execution of an instance of a database server (such as a regular instance 130 or a mirage instance 120), after the instance is shut down, e.g. to perform scheduled maintenance. Additionally, statistics 511, 512 (FIG. 11A) that are stored in memory region 614 (FIG. 12A) in memory 1060 (FIG. 16) and optionally persisted to disk 1012 may be for a period of time that is of a predetermined duration (e.g. 1 hour) relative to current time, which forms a moving window in time. In certain embodiments, statistics of a session in a current instance of the database server (e.g. regular instance 130) are relocated in memory 1060 from a region accessible to a current instance (e.g. regular instance 130) to a different instance (e.g. mirage instance 120), when the session is relocated to the different instance. In such embodiments, the statistics in memory region 614 of the current instance (e.g. regular instance 130) may be copied into a corresponding memory region of the different instance (e.g. mirage instance 120), by a specific process in DBMS 110 such as periodic relocation checker 140 (FIG. 4A), or by a process (not shown) in the current instance or in the different instance, depending on the embodiment.

In several embodiments, as noted above, group-level statistics 511, 512 (FIG. 11A) of a group of sessions (e.g. sessions grouped by IP address) are database-wide statistics, which are maintained (e.g. persisted into a shared file on hard disk 1012), across multiple instances (e.g. regular instances 130 and mirage instances 120) in database management system (DBMS) 110. In such a group of sessions, one or more sessions may be connected to a listener in one instance 130, 120 while additional sessions may be connected to a listener in another instance 130, 120. In such embodiments, cumulative statistics may be generated for display to a DBA, based on internal statistics that are normally inaccessible outside of DBMS 110. The just-described cumulative statistics may be generated by adding up internal statistics across multiple stages in SQL processing (e.g. shown in column headers of FIG. 12A) and/or across multiple sessions grouped by IP address (or grouped by client application). These cumulative statistics are made accessible to a DBA, e.g. in response to a query, so that the DBA can review health of an application (e.g. an HR application) that is executing in a client computer 910 at a given IP address, e.g. from which originate all the sessions in a specific group. The internal statistics and/or cumulative statistics may be maintained in memory 1060 or on disk 1012 or both, depending on the embodiment. As statistics are maintained on disk 1012, these statistics can be loaded from disk 1012 into a region of memory 1060 allocated to a specific instance 120, 130, if and when execution of the specific instance 120, 130 is re-started (e.g. after scheduled maintenance as described in, e.g. the preceding paragraph above) or when sessions are re-located between instances (e.g. from a regular instance 130 to another regular instance 130 or to a mirage instance 120).

When statistics 511, 512 (FIG. 11A) are being generated (and stored) for each session, database 1002 contains N memory regions that are similar or identical to memory region 614 (FIG. 12A) in memory 1060, where N is the number of sessions currently being serviced by an instance 120, 130, e.g. N=900 (or 900 sessions, and correspondingly 900 statistics memory regions). Alternatively, when statistics 511, 512 (FIG. 11A) are generated (and stored) for a group of sessions (e.g. sessions grouped by client application name, or sessions grouped by IP address), database 1002 contains M memory regions that are also similar or identical to memory region 614 (FIG. 12A) in memory 1060, where M is the number of groups, e.g. M=81 (or 81 groups, and correspondingly 81 statistics memory regions). In one example wherein sessions are grouped by IP address, a first group may include sessions from 500 client applications that all have a first IP address, and a second group may include sessions from 20 client applications that all have a second IP address. Hence, during evaluation (e.g. in act 132) of a specific group, the statistics generated for the specific group are compared to respective thresholds (see table 640 in FIG. 12B) that are scaled up (e.g. multiplied), by the number of sessions (e.g. 20 sessions) in the specific group. Tables 640 (FIG. 12B) may be included in relational database 1002.

In some embodiments, evaluation statistics 511, 512 (FIG. 11A) are stored and used by a respective instance 130, 120 (FIG. 11A) in one or more regions of memory 1060 that is used only for a specific session (or for a group of sessions, which may or may not be accumulated across instances 120, 130, depending on the embodiment). Each of the just-described memory regions that is used to store statistics 511 and 512 may be accessed via a two dimensional array or other such data structure as described above, and include a column for each stage in handling requests (e.g. fetch stage), so that there are multiple columns for corresponding multiple stages, and additionally there may be multiple columns for multiple steps within a stage, e.g. see column headers in memory region 614 in FIG. 12A.

Memory region 614 (FIG. 12A) is allocated in computer 100 for internal use by database management system 110 and hence in some embodiments these statistics are normally inaccessible to any client application, including client applications A . . . I . . . N. As noted above, in an act 121 (by mirage instance 120), or in an act 131 (by regular instance 130), each cell in five columns 626A-626E at rows 636A-636D of memory region 614 (FIG. 12A) is used to store (and later used in evaluation, by applying tests thereto), one error statistic (also called "sub-parse statistic") that is generated in one specific internal step among five internal steps within a parse stage of processing requests received in a particular session (or in a particular group of sessions). Examples of evaluation statistics 511, 512 (FIG. 11A) are shown in column 626A in FIG. 12A, in four rows 636A-636D as respective four counts of four different errors that may occur in a syntax checking step within the parse stage, such as a count of occurrences of segmentation faults in cell 638 in the first row 636A, a count of occurrences of buffer overflow errors in another cell (not labeled) in the second row 636B, a count of occurrences of out-of-memory errors in yet another cell (not labeled) in the third row 636C, or a count of occurrences of restricted access errors in still another cell (not labeled) in the fourth row 636D. In some embodiments, such evaluation statistics 511, 512, e.g. at the intersections of columns 626A-626E and rows 636A-636F and 637B are internal to a database server of a database management system (DBMS) and are not available to any process outside the DBMS. The just-described statistics 511, 512 are used in evaluation (e.g. by comparison to thresholds) in act 132 at a finest level of granularity of processing among three or more levels of granularity, as discussed below in reference to FIGS. 12A and 12B. In certain embodiments the just-described statistics 511, 512 may be made retrievable outside the DBMS, e.g. in response to a query by a DBA.

Although described above for a particular session (or a particular group of sessions), statistics arrays similar or identical to memory region 614 (FIG. 12A) may be maintained (and used) at any one or more of multiple levels of resolution described above in reference to FIG. 7B, depending on the embodiment. Thus, some embodiments of mirage instance 120 and/or regular instance 130 maintain (and use) statistics arrays similar to memory region 614 (FIG. 12A) at a module level within a client application, and/or at the service level, and/or at the client application level, and/or at the IP address level. For example, at the service level, a statistic of a particular service (e.g. number of segmentation faults) is obtained by aggregating the corresponding statistic (e.g. number of segmentation faults) across all sessions of a client application I that access this particular service, and this total is stored e.g. in a cell 638 (FIG. 12A) in row 636A, column 626A (and used in evaluation, e.g. in act 122 or 132 in FIG. 7B).

In some embodiments, at a client application level, a statistic of an individual client application I (e.g. number of segmentation faults) is obtained by either or both of instances 120, 130 aggregating the corresponding statistic (e.g. number of segmentation faults) across all sessions of this client application I regardless of the service accessed, and this total is stored in an individual cell 638 of memory region 614 (and used in evaluation in act 122 or 132). Similarly, at the IP address level, a statistic of a particular IP address (e.g. number of segmentation faults) is obtained by aggregating the corresponding statistic (e.g. number of segmentation faults) across all sessions of all client applications with this particular IP address regardless of the service accessed, and this total is stored in cell 638 (and used in evaluation in act 122 or 132).

Although storage (and evaluation) described in, e.g. preceding three paragraphs above, refer to counts of errors (also called "error statistics") 636, evaluation of normality and abnormality may additionally or alternatively use in tests, other internal statistics 637 related to resource utilization (also called "resource utilization statistics"), e.g. based on usage of computational resources, such as the percentage of CPU used, and the number of storage partitions accessed, in handling a particular session (or a particular group of sessions) as shown by rows 637A and 637B in memory region 614 in FIG. 12A. Moreover, memory region 614 in FIG. 12A includes a column 615 to store additional statistics related to a session's transmission of a request from a client application I in a computer 910 to database management system 110, such as a count of checksum errors in the fifth row 636E. Although network transmission stage errors (such as checksum errors) occur before processing of a request by an instance of a database server, such additional statistics are additionally stored (and additionally evaluated by using them in tests) by regular instance 130 (e.g. in act 132) or mirage instance 120 (e.g. in act 122). When the additional statistics are found to be not normal or normal, this outcome may be additionally used to decide whether or not to relocate the session of a specific client application, e.g. in act 132 or 122.

In some embodiments, check sum errors occur only in a network transmission stage (e.g. implemented by driver 116 in FIG. 16), with a respective count (e.g. 1) shown in a single cell, in column 615 in row 636E (FIG. 12A). As these errors do not occur in the parse stage, execution stage, and fetch stage, row 636E has cells of the remaining columns denoted by the symbol "n/a" which represents "not applicable". Thus, counts of one or more types of errors in the network transmission stage, e.g. the just-described check sum errors, even though they occur before a request is processed by database management system 110, are used in some embodiments of tests in evaluation in act 132 or act 122 (FIGS. 3A, 5, 7A and 7B), by respective instances 130 or 120. In certain embodiments, in evaluation in act 132 or act 122, one or more tests may use multiple comparisons of statistics (e.g. less than, greater than) to thresholds, wherein the comparisons are combined with one another in any manner (e.g. using the logical operators AND and OR).

In some embodiments, a decision to relocate a session (or a group of sessions) by regular instance 130 (e.g. in act 132) or mirage instance 120 (e.g. in act 122) may use one or more logical combination(s) of outcomes of comparisons of thresholds to statistics, and these combination(s) are based on priorities of the type shown in table 660 in FIG. 12D, for each stage or for each step of each stage. In a first example, a first combination requires checking whether any two statistics whose priority is 1 exceed their respective thresholds or whether any three statistics whose priority is 2 exceed their respective thresholds, and if the answer of this first combination is yes then the session (or group of sessions) is relocated from regular instance 130 to mirage instance 120.

In a second example, a second combination checks whether any one statistic whose priority is 1 exceed its respective threshold or whether any two statistics whose priority is 2 exceed their respective thresholds, and if the answer of this second combination is yes then relocate the session (or group of sessions) from regular instance 130 to mirage instance 120. In a third example, a third combination requires checking whether any one statistic whose priority is 1 exceed its respective threshold or whether any four statistics exceed their respective thresholds, and if the answer of this third combination is yes then the session (or group of sessions) is relocated from regular instance 130 to mirage instance 120. The just-described three examples may be combined with a logical OR operator, in a fourth example, as follows: the above-described first combination OR the above-described second combination OR the above-described third combination. Thus, when the answer is yes to any of the first, second or combination, the session (or group of sessions) is relocated, in the just-described fourth example, from regular instance 130 to mirage instance 120.

Moreover, in some embodiments, internal statistics of the type illustrated in memory region 614 in FIG. 12A are compared to respective thresholds in normality tests and in abnormality tests by mirage instance 120 in act 122, and by regular instance 130 in act 132 respectively (FIGS. 3A, 5, 7A and 7B). Each threshold which is compared to a statistic by a particular instance (e.g. instance 130 in act 132) is retrieved from a thresholds table 640 (FIG. 12B), which in certain embodiments, is organized identical to organization of statistics in memory region 614 (FIG. 12A) although table 640 (FIG. 12B) is stored in and retrieved from relational database 1002 while memory region 614 exists in memory 1060 and data therein is optionally persisted to disk (or any other non-volatile storage media) periodically, and both organizations are two dimensional.

For example, in act 132, regular instance 130 compares fetch stage's segmentation faults statistic of 19 (in column 618, row 636A in memory region 614 in FIG. 12A) to segmentation faults threshold of 10, which is exceeded, hence this session (or group of sessions) satisfies this abnormality test, and if this outcome is sufficient for relocation (e.g. if it is not to be combined with other outcomes as described above) then this session's handling is relocated to mirage instance 120. In act 122, mirage instance 120 may use the same thresholds table 640 (FIG. 12B) which is also used in act 132 by regular instance 130 in some embodiments. Alternatively mirage instance 120 may use a different thresholds table, such as table 691 in FIG. 12I. As noted above, in some embodiments, thresholds in a threshold table (e.g. table 640 in FIG. 12B and table 691 in FIG. 12I) may be changed by auto tune module 160 (see FIGS. 3A, 3B, 5, 7A, 7B and 9), although in other embodiments these thresholds remain fixed during operation of database management system 110 (e.g. after these thresholds are initialized manually, based on past experience).

In some embodiments, evaluation of statistics (e.g. by comparison to thresholds) may be performed at one (or more) of three different levels of granularity of processing, namely coarse granularity, finer granularity and finest granularity, as follows. Normality and abnormality tests which are specific to a stage (also called "stage-specific tests"), e.g. comparing statistics in cells at intersections of rows 636A-

636E, 637A-637B and columns 615-618 in memory region 614 (FIG. 12A) to corresponding thresholds in cells at intersections of rows 636A-636E, 637A-637B and columns 615-618 in table 640 (FIG. 12B) are at a finer granularity of processing than normality and abnormality tests applied to cumulative statistics (e.g. in column 620 in memory region 614) which are at a coarse granularity of processing. Thus, cumulative statistics which are accumulated over time across multiple stages of processing (or handling), as shown in cells at the intersections of rows 636A-636E, 637A-637B and column 620 in memory region 614 (FIG. 12A) may be compared to respective thresholds in cells at the intersections of rows 636A-636E, 637A-637B and column 620 in table 640 (FIG. 12B), in evaluation at the coarse granularity (also called "highest processing level"). One example of a cumulative statistic, in a cell at the intersection of row 636C and column 620 in memory region 614, is a total number of out-of-memory errors obtained by, for example, summing (or adding) the numbers in cells at the intersections of row 636C and columns 615, 616, 617 and 618. Another example of a cumulative statistic, in a cell at the intersection of row 636C and column 616 in memory region 614, is a number of out-of-memory errors in parse stage obtained by, for example, summing (or adding) the numbers in cells at the intersections of row 636C and columns 626A-626E.

The just-described checking of total out-of memory errors in a cumulative number across multiple stages is also referred to as "coarse grained" checking (e.g. total in column 620, row 636C), in contrast to checking stage-level statistics which is also referred to as "intermediate grained" checking (e.g. a subtotal in column 616, row 636C) that in turn is coarser than detailed step-level statistics (e.g. in column 626C, row 636C). Specifically, normality and abnormality tests which are specific to an individual step within a stage (also called "step-specific tests") are at a greater detail (and at a finest granularity of processing, also called "lowest processing level"), relative to the finer granularity (also called "intermediate processing level") of stage-specific tests described, e.g. at the beginning of the immediately preceding paragraph above.

Examples of step-specific tests apply to statistics generated to count errors occurring in individual steps within a stage, such as five steps in parse stage shown in cells at intersections of rows 636A-636E, 637A-637B and columns 626A-626E in FIG. 12A, the respective thresholds in cells at intersections of rows 636A-636E, 637A-637B and columns 626A-626E in table 640 (FIG. 12B). Although statistics of individual steps within only one stage (e.g. parse stage) are illustrated in FIG. 12A, such step-specific statistics may be generated in each step of every other stage. Thus, in some embodiments, evaluation in act 132 (or act 122) is tuned to be performed at the lowest processing level (or finest granularity) when a computer's load is lowest, or at the highest processing level (or coarse granularity) when the computer's load is highest, or at the intermediate processing level when computer's load is intermediate, by an auto tune module 160 of the type described above.

Specifically, in certain embodiments, depending on utilization of system resources at machine level in a server computer, auto tune module 160 (FIGS. 3A, 3B, 5 7A, 7B and 9) determines in operations 161 and 162 which of the statistics in memory region 614 (FIG. 12A) are compared to respective thresholds in table 640 (FIG. 12B), e.g. by storing in act 355 (FIG. 3B) either an enable indication or alternatively a disable indication, in each cell of a table 650 (FIG. 12C) which in certain embodiments, is organized identical to statistics memory region 614 (FIG. 12A). The enable and disable indications in table 650 of FIG. 12C (which illustrates enable/disable flags in tables 525 and 530 in FIG. 11A) may be set by auto tune module 160 in any manner, depending on the embodiment. In some embodiments, auto tune module 160 determines (e.g. in act 354 in FIG. 3B) these indications based on each statistic's priority retrieved from table 660 (FIG. 12D) which in certain embodiments, is organized identical to statistics memory region 614 (FIG. 12A).

Specifically, auto tune module 160 uses a statistic's priority and a current measurement of resource utilization (e.g. % of CPU used and/or % of memory used) overall by DBMS 110 at machine level, to look up a table, such as table 681 (FIG. 12E) to determine the statistic's enable/disable indication. For example, the statistic of number of buffer overflow errors in execution stage has a priority of 4 (e.g. indicating this statistic is least important), as shown at the intersection of row 636B and column 617 in table 660 (FIG. 12D), and the right-most column in table 681 (FIG. 12E) indicates that statistics of priority 4 are disabled for a regular instance, in all ranges of CPU utilization (and/or memory utilization) above 30%. Hence, if current CPU utilization (and/or memory utilization) by regular instance 130 is 31% or more, auto tune module 160 stores a disable indication for this statistic, e.g. in a cell at the intersection of row 636B and column 617 in table 650 (FIG. 12C).

Thus, when a lowest processing level (or finest granularity) for evaluation of statistics is enabled by auto tune module 160, regular instance 130 performs detailed checking in act 132 (e.g. on each statistic in any given row, in column 626A for a syntax checking step in the parse stage, in column 626B for a semantics checking step in the parse stage, in column 626C for a step to check on user's rights in the parse stage, in column 626D for a step to check if the current request was previously parsed in the parse stage, and column 626E for a step to generate executable code in the parse stage). Alternatively, when an intermediate processing level for evaluation of statistics is enabled by auto tune module 160 (e.g. by disabling detailed tests, and enabling at least intermediate grained tests), regular instance 130 performs intermediate grained checking (e.g. on a statistic in column 616 for parse stage as a whole, in any given row) in act 122.

Finally, when a highest processing level for evaluation of statistics is enabled by auto tune module 160 (e.g. by disabling detailed tests, disabling intermediate grained tests, and enabling coarse tests), regular instance 130 performs coarse grained checking on cumulative statistics across multiple stages (e.g. on a statistic in column 620 in any given row) in act 122. For example, auto tune module 160 may enable intermediate grained checking (described above) in acts 122 and 132 when CPU utilization is below corresponding lower limits (e.g. 20% for regular instances, and 60% for mirage instances), and enable detailed checking at the lowest processing level when CPU utilization is even lower (e.g. 10% for regular instances, and 40% for mirage instances). In this example, in operations 161 and 162, auto tune module 160 enables coarse grained checking (described above) in acts 122 and 132 when CPU utilization is above corresponding upper limits (e.g. 50% for regular instances, and 80% for mirage instances).

Although a cumulative statistic has been described above for some embodiments, other embodiments of acts 122 and 132 (FIGS. 3A, 5, 7A, 7B and 9) may use a summation of errors across rows, to obtain a combined statistic. Thus, other embodiments may additionally or alternatively apply a normality (or abnormality) test (when enabled by auto tune module 160) to a combined statistic, by checking it against another threshold, e.g. check a total number of errors in a specific stage or step in processing a request (e.g. for a total number of all errors in the syntax checking step, see a cell in column 626A, row 636F in memory region 614 in FIG. 12A). Specifically, in some embodiments, testing of individual errors (e.g. see the left-most column in rows 636A-636E) may be disabled (e.g. when resource utilization at machine level exceeds a high limit thereon), in which case evaluation in act 132 (or 122) may still compare total number of errors (see row 636F in memory region 614) in one or more stages (or individual steps of each stage, if enabled) to corresponding limits (see row 636F in table 640 in FIG. 12B).

Also, certain embodiments of instances 120 and 130 (FIGS. 3A, 5, 7A, 7B and 9) may sum up the number of errors across multiple stages, and also across all errors, to obtain a combined cumulative statistic, e.g. see a cell in row 636F, and column 620, to which corresponding normal and abnormal thresholds are applied in acts 122 and 132 respectively. Use of the just-described combined statistics (by summing across rows) or combined cumulative statistics (by summing across rows and columns) may be determined by auto tune module 160 (FIGS. 3A, 5, 7A, 7B, and 9) by enabling or disabling respective tests, depending on utilization of system resources. For example, use of the combined cumulative statistic may be enabled (with evaluation of rest of the statistics disabled) by auto tune module 160 when CPU utilization is above corresponding upper limits (e.g. 70% for regular instances, and 90% for mirage instances).

In some embodiments, in operations 161 and 162, auto tune module 160 enables or disables generation and evaluation of statistics of certain errors, by acts 121, 122 of a mirage instance 120 and by acts 131, 132 of a regular instance, based on row-level priorities of the type illustrated in column 621 in FIG. 12G. For example, statistics on segmentation faults in all steps and stages have a priority of 2, as shown in a cell at row 636A, column 621, and statistics of out-of-memory errors in all stages and steps have a priority of 1, as shown in a cell at row 636C, column 621. When resource utilization increases above one limit e.g. when CPU utilization exceeds a first intermediate limit of 50% for regular instances (or 70% for mirage instances), auto tune module 160 may disable generation and evaluation of error statistics and resource utilization statistics whose priorities are lower than 2 as shown in FIG. 12G (e.g. statistics whose generation and evaluation is disabled may have priorities of 3 and 4).

Specifically, a memory region 690 in FIG. 12G, accessed by an array or other such data structure, has rows 636B, 636C 636D and 636E marked disabled, as they have priority of 3 or 4 in this example. Although disabled rows 636B, 636C 636D and 636E are shown in FIG. 12G for the purpose of explanation in this detailed description, in some embodiments memory region 690 does not have any rows for statistics whose generation (and evaluation) is disabled. When resource utilization increases above another limit e.g. when CPU utilization exceeds a second intermediate limit of 60% for regular instances (or 80% for mirage instances), auto tune module 160 may disable generation and evaluation of statistics whose priorities are lower than 1 (e.g. statistics whose evaluation is disabled may have priorities of 2, 3 and 4), so in this situation, memory region 690 (FIG. 12G) has only two rows for statistics, namely rows 636F and 637B. Although FIG. 12G shows how tests are disabled, alternatively when resource utilization is below a lower limit thereon (e.g. CPU utilization is below 20%), new tests are added automatically, specifically by auto tune module 160 indicating addition of new rows (not shown) to memory region 690 in FIG. 12G, e.g. because their corresponding errors are found to be occurring in a given session.

The above-described priorities in table 660 (FIG. 12D) may be all predetermined and not automatically changeable in some embodiments. In several embodiments, a table (also called "auto-prioritization table") contains flags that indicate whether tests/statistics are auto-prioritized or not-auto-prioritized. Examples of tests which may be flagged as not-auto-prioritized are out-of-memory errors and percentage of CPU used, which may be set to always be at the most important priority, e.g. priority 1. For tests/statistics that are flagged as auto-prioritized, their associated priorities in table 660 (FIG. 12D) are automatically changed by auto tune module 160 of some embodiments, for example based on a frequency at which corresponding thresholds are exceeded. Thus, if a threshold on number of checksum errors is exceeded at a frequency that is, for example in the lowest quartile (relative to frequencies of thresholds being exceeded by other statistics), this statistic if flagged as auto-prioritized may have its associated priority dynamically changed by act 370 (FIG. 3B) to the least important priority, e.g. priority 4 (even if before this change, its priority was higher, e.g. at priority 2). Similarly, if a threshold on number of segmentation faults is exceeded at a frequency that is, for example in the highest quartile (relative to frequencies of thresholds being exceeded by other statistics), this statistic if flagged as auto-prioritized may have its associated priority dynamically changed by act 368 (FIG. 3B) to the highest priority, e.g. priority 1 (even if before this change, its priority was lower, e.g. at priority 2).

Accordingly, auto tune module 160 of some embodiments maintains frequencies (in a table 670, see FIG. 12Q) at which a statistic exceeds its corresponding threshold, and sorts statistics in order, from highest frequency of exceeding threshold to lowest frequency of exceeding threshold, thereby to obtain four quartiles to which are assigned four priorities, in the above-described example. A similar method may be used, to identify new statistics to be stored in memory region 690 (FIG. 12G) in some embodiments. Although a quartile-based method has been discussed above, to assign one of four priorities, auto tune module 160 of other embodiments may use other methods to assign any number of priorities to statistics, performed at run time during processing of requests by database management system 110. Priorities in table 660 (FIG. 12D) may be initialized at startup of an instance, to corresponding initial values in database 1002, which may be populated by a DBA.

A DBA may indicate, in auto-prioritization table 671 (see FIG. 12S), which statistics and/or tests may have their priorities changed automatically (e.g. in acts 368 and 370 in FIG. 3B) by auto tune module 160 (as indicated by "auto" in FIG. 12S), and/or which statistics and/or tests have their priorities fixed (and thus not changeable, as indicated by "not" in FIG. 12S). Specifically, in certain embodiments, flags of all statistics/tests in the auto-prioritization table are initialized to auto-prioritized (e.g. "auto"), and the DBA manually changes one or more such flags to not-auto-prioritized (e.g. "not"). In some embodiments, flags of all statistics/tests in the auto-prioritization table are initialized to not auto-prioritized, and the DBA manually changes one or more such flags to auto-prioritized. In several embodiments, a DBA may set a single flag (not shown), to indicate that auto-prioritization is disabled for all tests/statistics, and in response to this single flag being found to be set, computer

100 takes branch 372 (FIG. 3B) after act 366, thereby to go to act 371 by skipping acts 367-370 for all tests/statistics.

In addition to or instead of the above-described table 660 (FIG. 12D) some embodiments may prioritize statistics by using an additional column 621 (FIG. 12G) and prioritize the stages and steps of handling a request by using an additional row 622 (FIG. 12G) in a memory region 690 (FIG. 12G) that may be used to store statistics. For example, semantics checking step in the parse stage, the executable code generation step in the parse stage, the parse stage, the execution stage and the cumulative over multiple stages, may have respective priorities of 2, 2, 1, 1 and 1 as shown in row 622, columns 626B, 626E, 616, 617 and 620. In some embodiments, when resource utilization increases above one limit e.g. when CPU utilization exceeds a first intermediate limit (e.g. 50% for regular instances or 70% for mirage instances), auto tune module 160 may disable storage and usage of errors in steps or stages whose priorities are lower than 2 as shown in FIG. 12G. Specifically, memory region 690 in FIG. 12G, also called statistics and priorities memory region 690, omits column 615 for statistics in transmission stage, omits columns 626A, 626C, 626D, and 618 respectively for statistics in the syntax checking step, the step to check user's access rights, the step to check if previously parsed, and the fetch stage (all of which are shown in FIG. 12A), as these statistics have priority of 3 or 4 in this example.

In the just-described example, auto tune module 160 may decide that fetch errors (as well as transmission stage errors, and certain parse stage errors) can be ignored, e.g. when regular instance 130 is busy in normal processing of requests from sessions that are otherwise normal. Similarly, when resource utilization increases above another limit e.g. when CPU utilization exceeds the second intermediate limit of 60% for regular instances (or 80% for mirage instances), auto tune module 160 may disable storage and usage of statistics in stages (and statistics in steps within stages) whose priorities are lower than 1, e.g. disable statistics within two steps of the parse stage (e.g. syntax checking step and step to check if previously parsed).

Specifically, when CPU utilization is greater than 90%, operation 161 of auto tune module 160 of some embodiments disables evaluation of all statistics with priorities 2, 3 and 4 (see the first row of table 681 in FIG. 12E), while enabling evaluation of only statistics with priority 1 (by use of tests applicable thereon). Therefore, in one example, the above-described statistics memory region 614 (FIG. 12A) has only two rows, namely rows 636F and 637B, for the total number of errors and the number of storage partitions used respectively (see FIG. 12G), because evaluation in act 132 of all other statistics is disabled. Similarly, when CPU utilization is greater than 50% but less than or equal to 90%, operation 161 of auto tune module 160 disables evaluation in act 132 of all statistics with priorities 3 and 4 (see the second row of table 681 in FIG. 12E) while enabling evaluation in act 132 of statistics with priorities 1 and 2. Therefore, in the above-described example, internal statistics memory region 614 does not have four rows, namely rows 636B, 636C, 636D and 636E (shown in FIG. 12G). Similarly, when CPU utilization is less than or equal to 30%, operation 161 of auto tune module 160 enables evaluation in act 132 of statistics of all priorities (see the last row of table 681 in FIG. 12E), i.e. all statistics. Therefore, in the above-described example, internal statistics memory region 614 has all rows, namely rows 636A-636F and 637B (shown in FIG. 12G).

In certain embodiments, operation 162 of auto tune module 160 uses a similar but different table 682 (FIG. 12F), to determine which statistics are enabled and which statistics are disabled for use in evaluation in act 122 by a mirage instance 120 (see FIGS. 1C, 3A, 5, 7A, 7B and 9) described above, in contrast to table 681 (FIG. 12E) which is used for regular instance 130. In the example shown in FIG. 12F, the CPU utilization levels are different in the first column of table 682, relative to the first column of table 681 (FIG. 12E). Moreover, evaluation at which priority levels is enabled and disabled is different, in the first row of table 682 (FIG. 12F), relative to the first row of table 681 (FIG. 12E). Other than the just-described differences, operation 162 of auto tune module 160 uses table 682 (FIG. 12F) similar to the description of operation 161, e.g. in the preceding paragraph, above.

Also, some embodiments may use a three dimensional ("3D") matrix (not shown) based on memory region 614 (FIG. 12A) in which a third dimension identifies additional checks 531 (see FIG. 12H), such as one or more data validation checks 601, one or more memory checks 602, and one or more paranoia mode checks 603. Data validation checks 601 may include checking if data in a packet received from an external communications network is well formed, e.g. by checking that input data of a request is valid, checking that any date in the input data is in a predetermined range of valid dates, checking that character strings and numbers have valid values. Data validation checks 601 may additionally or alternatively compare values of input data of a request to a range of values of data in one or more tables of database 1002.

A cell in the just-described 3D matrix may identify, e.g. a threshold on the count of errors that must be crossed in a specific stage of processing of a request, in order for a specific additional check to be executed, e.g. by mirage instance 120 in act 122 or by regular instance 130 in act 132 (see FIGS. 3A, 5, 7A, 7B, and 9). In alternative embodiments, additional checks may be executed by mirage instance 120 (e.g. in act 122) when indicated as enabled, e.g. in a 2D table that is indexed by the stage of processing. Execution of additional check(s) 531 (FIGS. 11A and 12H) may be automatically tuned in regular instances 130 by auto tune relocation module 150 of some embodiments (e.g. via enable/disable flags in table 525 in FIG. 11A), which may enable one or more additional check(s) when CPU utilization is below a first lower limit for regular instances (e.g. 10%) thereby to more easily detect abnormal client applications, and also disable one or more additional check(s) when CPU utilization exceeds a first upper limit for regular instances (e.g. 50%) thereby to avoid reduction in performance and availability due to execution of additional checks 531.

Execution of additional check(s) 531 (FIGS. 11A and 12H) may be similarly automatically tuned by auto tune relocation module 150 in mirage instances 120, although the CPU utilization thresholds for mirage instances 120 are different from regular instances 130. For example, one or more additional check(s) 531 may be enabled in mirage instances 120 when CPU utilization is below a second lower limit for mirage instances (e.g. 60%), and disabled in mirage instances 120 when CPU utilization is above a second upper limit for mirage instances (e.g. 80%). Enabling and disabling of abnormality tests 521 (FIG. 11A) and enabling and disabling of normality tests 526 (FIG. 11A) may be similarly tuned by auto tune relocation module 150, using one or more resource usage thresholds, in a manner similar to usage of the just-described CPU utilization thresholds to enable and disable execution of additional check(s) 531.

In some embodiments, a database management system 110 stores errors that occur in handling requests, in table 694 (FIG. 12K), and uses the stored errors in some embodiments to automatically determine (e.g. in act 722 illustrated in FIG. 13, described below) whether a specific error arose due to a change to itself (e.g. change to the database server software) as follows. A specific error in handling a request may occur, for example, when there is nothing defective in the request and nothing malicious with client application I from which the request is received, and instead the specific error is generated due to a software change or a configuration change in database management system 110. In database management system 110, one or more regular instance(s) 710 and one or more mirage instances 720 shown in FIG. 13 may perform one or more acts and/or steps, and/or operations and/or features and/or functions that are similar or identical to above-described instances 120, 130 of FIGS. 1A, 1B, 1C, 2A, 2B, 2C, 2D, 3A, 3B, 4A, 4B, 5, 6A, 6B, 7A, 7B, 8, 9, and 11A. Thus, regular instance(s) 710 may perform an act 711 (see FIG. 13) to handle requests received in a session, as described above. Additionally, in an act 712 that is performed periodically, regular instance(s) 710 use a statistics generator (not shown) to generate and store statistics in, for example, memory region 614 (FIG. 12A) that are specific to the session (or to a group of sessions), such as counts of occurrences of specific errors in handling requests in the session based on the errors stored in table 694 (and/or based on measures of usage of specific resources by the handling).

Periodically, regular instance(s) 710 perform an evaluation in an operation 713 that includes acts 714 and 715 as follows. In act 714 (FIG. 13), abnormality tests are applied by regular instance 710 to statistics retrieved from, for example memory region 614 (FIG. 12A) that were generated in act 712 (described above). Thereafter, in act 715 (FIG. 13), regular instance 710 checks if any abnormality tests are satisfied. If the answer in act 715 is no, control returns to act 711 (described above). If an abnormality test is satisfied, then in an act 716, the session (or group of sessions) is relocated to any mirage instance 720, followed by act 717 (FIG. 13) in which information related to relocation of the session (e.g. relocation reason, time of relocation, and history of instances to which the session has been relocated) is stored in a row in table 696 (FIG. 12L), and then control returns to act 711.

When a session (or group of sessions) is first relocated to mirage instances 720, the session (or group of sessions) is evaluated in operation 721 (see FIG. 13), by performing acts 722-726 as follows. In act 722, mirage instance 720 checks if software of the database server was changed (and in certain embodiments, additionally checks if there is any change in configuration of database management system 110, e.g. by replacement of a hard disk with a SSD, or by an upgrade in software of an operating system on which database management system 110 executes). Specifically, in act 722 (FIG. 13), mirage instance 720 of some embodiments retrieves a row from a table (not shown) that logs changes to database management system 110. In act 722, if the answer is no, e.g. because there was no update to the database server's software (e.g. in the most-recent change) before start of the error's occurrence (and in the just-described certain embodiments, no change in configuration), then control returns to act 728 wherein requests are handled (as discussed above). In act 722 (FIG. 13), if the answer is yes (e.g. there was a previous update to the database server's software, after which the error's occurrence started), then act 723 is performed.

In act 723, mirage instance(s) 720 check table 694 (FIG. 12K) to determine whether or not a specific error (e.g. ORA-01005), whose occurrence is counted by regular instance(s) 710 in a statistic that satisfies an abnormality test (in act 713, described above), also occurred previously. For example, the error may have occurred in handling previous requests that are identical, at least in part, to current requests the session (or group of sessions) which was newly relocated from regular instance(s) 710. Specifically, in some embodiments, in act 723 (FIG. 13), mirage instance 720 compares a current sequence of calls in the call stack when an error occurred in processing a current request with a previous sequence of calls retrieved from each row of table 694 to determine if there is a match. When these two sequences of calls match one another (and in some embodiments, when parse trees of corresponding two requests additionally match, at least partially), then mirage instance 720 decides that the same error occurred previously.

If the error occurred previously, and if a time of occurrence of the previous error (e.g. retrieved from a row of table 694 in FIG. 12K, in act 722) was before the time of a change (e.g. identified in a change log, not shown in FIG. 13) in database management system 110, then mirage instance 720 goes from act 723 to act 728 (FIG. 13) wherein requests are handled (as discussed above). In the just-described manner, in some embodiments of act 723, mirage instance 720 checks whether the same sequence of calls is present in a current version of the database server's software and also in a previous version of the database server's software, and if the answer is yes, it returns to act 728.

If the error did not occur previously at any time before a change (e.g. before the most-recent change or before the last N most-recent changes where N is a constant such as 2) in database management system 110 (e.g. same request was previously handled successfully without error until a most-recent change or until the most-recent Nth change), then mirage instance 720 performs act 724 (FIG. 13).

In act 724, mirage instance 720 checks if a software update associated with the error is available from computer (s) of a vendor of the database server's software. In act 724, if the answer is yes, then act 726 (FIG. 13) is performed to automatically install the software update associated with the error (also called "new software update") in at least one regular instance 710 (e.g. by initiating installation of the new software update in a "rolling upgrade"), followed by act 727 in which the session (or group of sessions) is relocated to the newly updated regular instance.

In act 724, if the answer is no, then act 725 (FIG. 13) is performed by mirage instance 720, to check if any regular instance is executing a prior version of database server software, in which the error did not occur previously (e.g. in which the same request was handled successfully without error). If the answer in act 725 is no, then control returns to act 728 wherein requests are handled (as discussed above). If the answer in act 725 is yes, then act 727 is performed, in which the session (or group of sessions) is relocated to a regular instance 710 in which the prior version of database server software is executing. After act 727, control returns to act 728 (FIG. 13). After requests are handled in act 728, evaluation in operation 721 includes performing an act 729 to apply tests for normality to statistics generated in mirage instance(s) 720 as described above, followed by checking if all normality tests are satisfied in act 730. In act 730, if the answer is yes then act 727 is performed, but if the answer is no, then control returns to act 728.

In one example of an error described, e.g. in the preceding paragraph above, resources may be used excessively due to one or more defects (also called "bugs") in a current version of software of the database server. In some embodiments, all instances 120, 130 of a database server use a common number (called "system change number" or SCN) that is unique across database management system 110, and this number is normally incremented only once for each DML statement. This common number (SCN) is generated by a process (not shown) in database management system 110 (e.g. by incrementing it monotonically), and is used in common by all instances 120, 130 to order transactions (e.g. DML statements can be arranged in a time order of starting execution, by sorting them based on SCNs associated with these DML statements). Use of a common number by all instances 120, 130 as just described can be advantageous, e.g. transaction roll back segments can be shared, similar to consolidated databases.

In the above-described example, a software error or bug in the database server's software may cause the just-described SCN to be incremented for and stored in every block of data that is updated by a DML statement, thereby to result in excessive usage of SCN, so that SCN reaches its maximum limit at a faster rate than normal. Normally, in the absence of the just-described software error or bug, when a specific DML statement updates a particular block of data, that specific DML statement's SCN is associated with that particular block, by all instances 120, 130.

In alternative embodiments, transactions in one or more regular instance(s) 130 are identified by an SCN (also called "regular SCN") that is different from another SCN (also called "mirage SCN") used to identify transactions in one or more mirage instance(s) 120. The just-described use of two different SCNs can isolate regular instance(s) 130 from mirage instance(s) 120, so that a client application's data that is corrupted by processing an abnormal request in a mirage instance 120 does not affect the data in database 1002 used by regular instance(s) 130. Also, in alternative embodiments, an SCN or other such common number used to identify transactions may include a physical time component (e.g. current time as per a clock, in a computer in which an instance 120 or 130 executes). Depending on the embodiment, mirage instance(s) 120 may be not totally isolated from regular instance(s) 130, e.g. tables with statistics on sessions may be shared by instances 120 and 130.

In certain embodiments, a software error as described above can be found by use of a mirage instance 120 that does not use database 1002 and instead uses a replica thereof, namely database 1092 (see top of FIG. 13). Database 1092 may be created, for example, by copying database 1002 at a given point in time. Hence, mirage instance(s) 720 (FIG. 13) access database 1092 (also called "mirage database" 1092) in handling of requests of a session in act 728, and if in the handling there is any adverse effect on data in mirage database 1092, the adversely affected data stays in mirage database 1092, and does not have any effect on database 1002 in use by regular instance 710 (FIG. 13) as described above.

In handling requests received in a session (or group of sessions) in act 728, mirage instance(s) 720 may be configured to record calls on mirage database 1092, when handling requests, for subsequent use by a regular instance 710 that may implemented, in some embodiments, as a logical standby instance. Specifically, after resolution of any problems in handling requests of session(s), e.g. by correcting bugs in software of the database server, the session(s) is/are relocated to a logical standby instance 710, and the logical standby instance 710 replays the recorded calls in act 711

(described above), to perform operations on database 1002 corresponding to the requests in the newly-relocated session (s).

Although acts 722-726 (FIG. 13) are described above as being performed in operation 721 by mirage instance(s) 720 of some embodiments, in other embodiments one or more of acts 722-726 (e.g. act 722) may be performed by a regular instance 710, e.g. in operation 712 (FIG. 13) when a computer 100 in which regular instance 710 is installed is operating in a lowest range of resource utilization (e.g. in a low load situation).

In some embodiments, one or more regular instance(s) 750 (FIG. 14) relocate sessions to one of mirage instances 760, 770 and 780 that is selected based on which statistic (in a particular set of statistics) is/are found by evaluation to be abnormal. In database management system 110, one or more regular instance(s) 750 and one or more mirage instances 760, 770 and 780 shown in FIG. 14 may perform one or more acts and/or steps, and/or operations and/or features and/or functions that are similar or identical to above-described instances 120, 130 of FIGS. 1A, 1B, 1C, 2A, 2B, 2C, 2D, 3A, 3B, 4A, 4B, 5, 6A, 6B, 7A, 7B, 8, 9, 11A and 13. Specifically, regular instance(s) 750 (FIG. 14) handle requests received in a session (or group of sessions, depending on resolution level) and generate statistics specific to the session (or group of sessions), in an act 751 that is similar or identical to acts described above. Periodically, regular instance(s) 750 perform in an act 752 (FIG. 14), an evaluation of the statistics by applying thereto, one or more tests for abnormality, similar or identical to acts described above. When the abnormality tests are not satisfied, control returns to act 751 (FIG. 14). When one or more abnormality tests are satisfied, acts 753 and 755 (FIG. 14) may be performed to check if upper thresholds are respectively exceeded by a first set of statistics (which may, for example, count segmentation faults, which is in a first category), or by a second set of statistics (which may, for example, count out-of-memory errors which is in a second category), followed by performing acts 754 and 756 respectively.

In act 754 or in 756 (FIG. 14), the session (or group of sessions) is relocated to a first mirage instance 760 (which is configured with memory of a smaller size and fewer and/or slower CPUs than regular instance 750), or to a second mirage instance 770 (which is configured with memory of a larger size and more and/or faster CPUs than regular instance 750). If upper thresholds are not exceeded by the first set of statistics and also by the second set of statistics, then act 757 is performed to relocate the session (or group of sessions) to a third mirage instance 780 (which is configured similar to a normal instance, and not specialized to handle any specific category, such as the first or second category described above). Hence, any sessions, whose count of buffer overflow errors exceeds its threshold, or whose count of restricted access errors exceed its threshold, are relocated by act 757 to third mirage instance 780. On completion of act 754, 756 or 757 (FIG. 14), control returns to act 751 (described above).

Mirage instances 760, 770 and 780 (FIG. 14) perform respective acts 761, 771 and 781 to handle requests received in a session (or group of sessions) and generate statistics specific to the session (or group of sessions) in the above-described manner. Periodically, mirage instances 760, 770 and 780 perform respective acts 762, 772 and 782. In act 762, the first mirage instance 760 evaluates sessions using normality tests (as described above), and also may perform one or more first additional checks that are specific to segmentation faults counted by statistics in the first category.

Similarly, in act 772, the second mirage instance 770 evaluates sessions using normality tests (as described above), and also performs one or more second additional checks that are specific to out-of-memory errors counted by statistics in the second category. And, in act 782, third mirage instance 780 evaluates sessions using normality tests (as described above), and also performs any additional checks that are enabled, e.g. all of checks 601-604 shown in FIG. 12H. Also, third mirage instance 780 may be configured to compare to respective thresholds, all statistics shown in FIG. 12A (also called "evaluation statistics", which may be specific to each session or specific to a group of sessions, depending on resolution level), such as error statistics 636 and resource utilization statistics 637. In acts 762, 772 and 782 (FIG. 14), if the applied tests are found to be satisfied, then acts 763, 773 and 783 are performed to relocate the evaluated session (or group of sessions) to regular instance(s) 750. If in acts 762, 772 and 782, the applied tests are not satisfied, then control returns to acts 761, 771 and 781 (described above).

In certain embodiments, a mirage coordinator 540 (FIGS. 11A, 11B) performs acts 801-814 (FIG. 15) as follows. Initially, when started mirage coordinator 540 waits in act 801 to receive a request to create mirage instance(s) 120, e.g. from a regular instance 130 of a database server or from an auto tune relocation module 150 (as shown by arrow 151 in FIG. 11A). After act 801 (FIG. 15), mirage coordinator 540 performs acts 802 by issuing to cluster ware 550 (FIG. 11A), one or more commands to startup one or more mirage instances 120. The number of mirage instance(s) 120 to be started may be configured, e.g. to MIN number, in a table (not shown) in database 1002 by a DBA. In addition, in act 802 (FIG. 15), mirage coordinator 540 may make a copy 513 (FIG. 11A) of (or otherwise have access to) database server's inputs, policies and external inputs, for use by the newly-created mirage instance(s) 120. Thereafter, mirage coordinator 540 goes to sleep in act 803 (FIG. 15), for a configurable period of time identified in database 1002, e.g. 1 hour, set by the DBA.

Thereafter, on being awakened in act 803, mirage coordinator 540 performs act 804, by obtaining from each existing mirage instance 120, one or more statistics (also called "instance-level statistics"), such as utilization of resources by the instance, e.g. CPU usage, and number of client applications (or number of sessions) supported by the mirage instance 120. Thereafter, in act 805 (FIG. 15), mirage coordinator 540 checks if an average of any instance-level statistic that was obtained in act 804 exceeds an upper limit thereon. Examples of instance-level statistic that are checked in act 805 include (a) resource usage (e.g. % of CPU used) by mirage instance 120 checked against an upper limit thereon, and (b) number of sessions currently handled in mirage instance 120 checked against an upper limit thereon. If the answer in act 805 is yes (e.g. when existing mirage instances 120 are overloaded), mirage coordinator 540 performs act 806 to check if a current number of existing mirage instances 120 is below a configurable maximum, e.g. MAX number set in the above-described table in database 1002 by the DBA.

If the answer in act 806 (FIG. 15) is yes, then mirage coordinator 540 performs acts 807 to increase the number of mirage instances 120. Specifically, in act 807, mirage coordinator 540 issues to cluster ware 550, command(s) to startup one or more new mirage instances 120. The number of mirage instances 120 that are started in act 807 may be configured, e.g. to INCR number, in the above-described table in database 1002 by the DBA. After the new mirage instance(s) 120 are started, mirage coordinator 540 updates cluster table 692 (FIG. 12J) with information on newly-started mirage instance(s) 120, e.g. by adding a row for each newly-started mirage instance 120. Then, in act 808, mirage coordinator 540 relocates client applications' sessions from one or more existing mirage instances 120 whose instance-level statistics exceed the upper limit(s), to one or more new mirage instances 120. In act 808, the re-distribution of client applications' sessions to new mirage instances 120 from existing mirage instances 120 may be done in any predetermined manner, e.g. using ratio proportion, based on one or more of the just-described statistics indicative of load. Then mirage coordinator 540 returns to act 803 (described above).

In act 806 (FIG. 15), if the answer is no, then mirage coordinator 540 goes to act 809 and checks if the instance-level statistic of any existing mirage instance 120 is below a lower limit thereon. If the answer in act 809 is no, mirage coordinator 540 returns to act 803. If the answer in act 809 is yes, mirage coordinator 540 goes to act 801, and relocates client applications' sessions from one or more existing mirage instances 120 with instance-level statistics above upper limits to one or more existing mirage instances 120 with instance-level statistics below lower limits. The re-distribution of client applications' sessions in act 810 may be done, e.g. to make the load uniform across all existing mirage instances 120. After act 801, mirage coordinator 540 returns to act 803.

Figure 15:
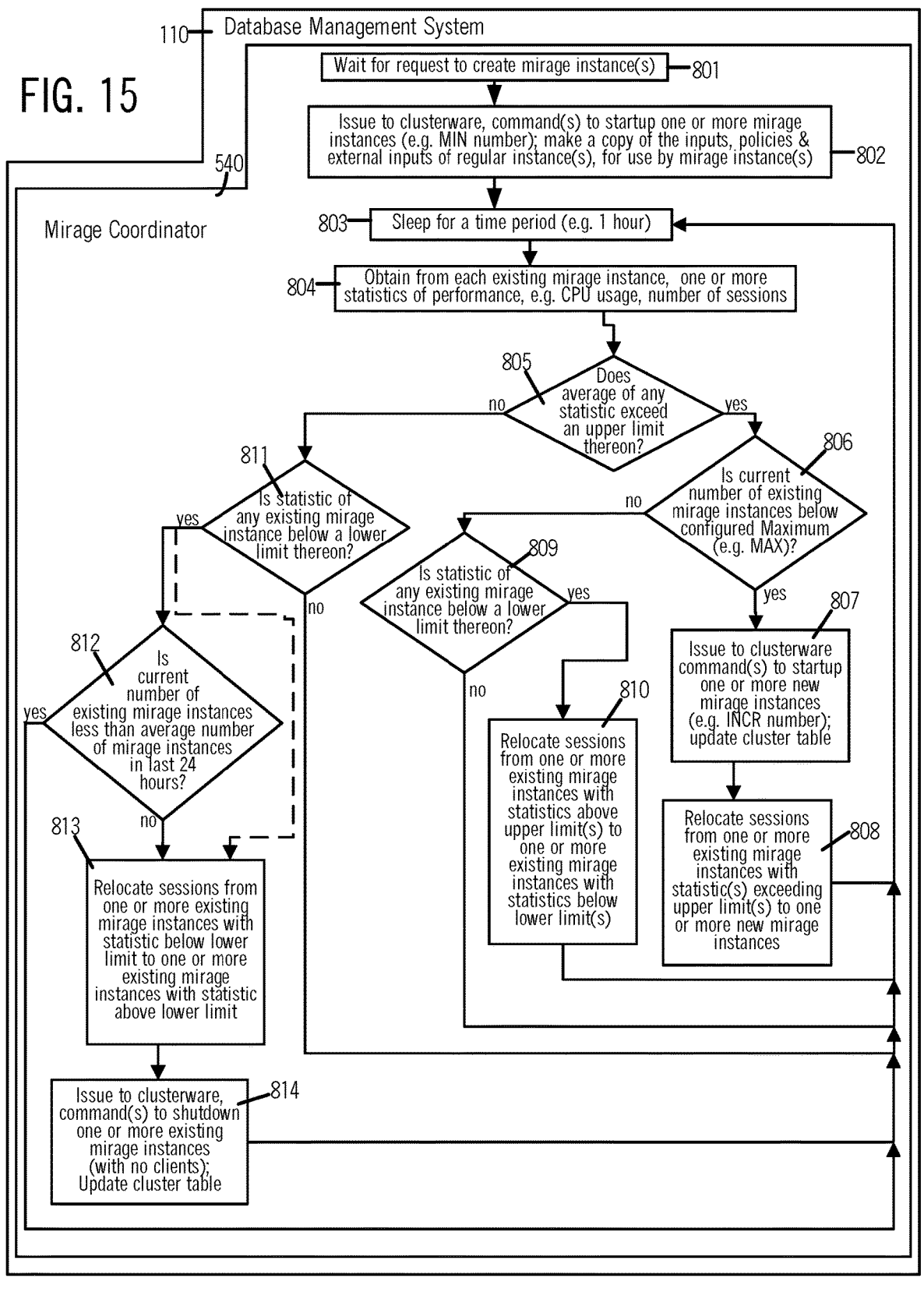
FIG. 15 illustrates, in a flow chart, acts 801-814 performed by a mirage coordinator 540 included in some embodiments of database management system 110 of the type illustrated in FIGS. 1A, 1B, 1C, 2A, 2B, 2C, 2D, 3A, 4A, 4B, 5, 6A, 6B, 9A, 9B, 9C and 9D.

In act 805 (FIG. 15), if the answer is no, then mirage coordinator 540 goes to act 811. In act 811, mirage coordinator 540 checks if the instance-level statistic of any existing mirage instance 120 is below a lower limit thereon. Examples of instance-level statistic that are checked in act 811 include (a) resource usage (e.g. % of CPU used) by mirage instance 120 checked against a lower limit thereon (as described in an illustrative example, after the next paragraph below), and (b) number of sessions currently handled in mirage instance 120 checked against a lower limit thereon. If the answer is no in act 811, mirage coordinator 540 returns to act 803. If the answer is yes in act 811, mirage coordinator 540 goes to act 812 to check if the current number of existing mirage instances 120 is less than an average number of mirage instances in the last 24 hours. If the answer in act 812 is yes, then mirage coordinator 540 returns to act 803. If the answer in act 812 is no, then mirage coordinator 540 goes to act 813. Note that in some embodiments, act 812 is skipped (as shown by a dotted arrow in FIG. 15), and mirage coordinator 540 goes from the yes branch of act 811 directly to act 813 (FIG. 15).

In act 813 (FIG. 15), mirage coordinator 540 relocates client applications' sessions from one or more existing mirage instances whose instance-level statistic(s) are below lower limit(s) to one or more existing mirage instances whose instance-level statistic(s) are above the lower limit(s). The re-distribution of client applications' sessions in act 810 may be done, e.g. by use of ratio proportion. In act 813, mirage coordinator 540 also updates cluster table 692 (FIG. 12J), by deleting information on the to-be-shutdown mirage instance(s), so that no new sessions are relocated thereto. Then, in act 814, mirage coordinator 540 issues to cluster ware 550, one or more commands to shut down one or more mirage instances, which have no sessions with client applications (as their sessions were relocated in act 813). Also in act 814, mirage coordinator 540 updates cluster table 692 (FIG. 12J) to delete therefrom, one or more rows describing the one or more mirage instances which have been shut down (or are being shut down) as just described. After act 814 (FIG. 15), mirage coordinator 540 returns to act 803.

An illustrative example of relocation of clients' sessions performed in act 813 (FIG. 15), followed by shutdown of mirage instances, is as follows. Lower and upper limits that are used in act 811 are: CPU=30% and CPU=80%. At time 1, each of four mirage instances have the following CPU utilization:

Minst-1: 50%
Minst-2: 4%
Minst-3: 60%
Minst-4: 6%

Accordingly, the answer in act 811 (FIG. 15) is yes, and due to the 30% lower limit on CPU utilization being not met, mirage coordinator 540 decides to remove the two mirage instances, namely Minst-2 which has only 4% CPU utilization, and Minst-4 which has only 6% CPU utilization. At time 2, after shutting down Minst-2 (as per act 814 in FIG. 15), the four mirage instances have the following CPU utilization:

Minst-1: 54%
Minst-2: X
Minst-3: 60%
Minst-4: 6%

Note that "X" in the above list denotes non-existent. Thereafter, at time 3, after shutting down Minst-4 (as per act 814 in FIG. 15), the four mirage instances have the following CPU utilization:

Minst-1: 58%
Minst-2: X
Minst-3: 62%
Minst-4: X

In another example, mirage coordinator 540 (FIG. 15) checks on number of sessions being handled in each mirage instance, using N1, N2 as lower and upper limits as follows: N1=100 and N2=2000. At time 1, the four mirage instances have the following number of sessions:

Minst-1: 120
Minst-2: 20
Minst-3: 250
Minst-4: 10

At time 2, mirage coordinator 540 decides to remove mirage instances Minst-2, and Minst-4, so the four mirage instances have the following number of sessions (also called "connections") after Minst-4 is shutdown:

Minst-1: 130
Minst-2: 20
Minst-3: 250
Minst-4: X

At time 3, mirage coordinator 540 removes mirage instance Minst-2, so the four mirage instances have the following number of sessions:

Minst-1: 150
Minst-2: X
Minst-3: 250
Minst-4: X

Depending on the embodiment, either or both of computers 910 and 100, which perform one or more acts and/or steps and/or operations and/or features and/or functions described above in reference to one or more of FIGS. 1A, 1B, 1C, 2A, 2B, 2C, 2D, 3A, 3B, 4A, 4B, 5, 6A, 6B, 7A, 7B, 8, 9, 11A-11D, 12A-12T, 13, 14 and 15, and/or which have one or more components described above in reference to FIGS. 10A and 10B may be implemented in a system 1000 (FIG. 16), described below as a "cloud". Cloud 1000 (FIG. 16) of some embodiments includes a pool of resources including, for example, a relational database management system (RDBMS) executing in one or more processors 1041-1044 of server computer 100. Examples of additional resources 1030 which may be included in the pool are processor, server, data storage, virtual machine (VM), platform, and/or other software applications. The pool of resources in cloud 1000 may be geographically centralized and/or distributed. As an example, the pool of resources in cloud 1000 may be located at one or more datacenters.

Client devices 1010 (FIG. 16) outside cloud 1000 may independently request resources in the form of computational resources, such as CPU time (e.g. in processors 1141-1144 in computer 910) and storage (e.g. in disks 1012A-1012C on which files of database 1002 may be stored in server computer 100), as needed. The just-described resources 1141-1144, 1012 and additional resources 1030 may be dynamically assigned by server computer 100 to the requests and/or client devices 1010 on an on-demand basis. One or more resources 1141-1144, 1012, 1030 which are assigned to each particular client device 1010 may be scaled up or down based on the computational resources requested by the particular client device. The resources 1141-1144, 1012, 1030 assigned to each particular client device 1010 may also be scaled up or down based on the aggregated demand for computational resources requested by all client devices 1010.

In an embodiment, the resources 1141-1144, 1012, 1030 included in cloud 1000 (FIG. 16) are accessible via switch 175 over a communications network 1020, such as a private network or the Internet. One or more physical and/or virtual client devices 1010 demanding use of the resources 1141-1144, 1012, 1030 may be local to or remote from cloud 1000. The client devices 1010 may be any type of computing devices, such as computers or smartphones, executing any type of operating system. The client devices 1010 communicate requests to access the resources 1141-1144, 1012, and 1030 in cloud 1000 using a communications protocol, such as Hypertext Transfer Protocol (HTTP). Such requests, which are communicated by client devices 1010 via network 1020 to the resources 1141-1144, 1012, 1030, may be expressed in conformance with an interface, such as a client interface (e.g. a web browser), a program interface, or an application programming interface (API).

In some embodiments, a cloud service provider provides access to database management system 110 in a cloud 1000 (FIG. 16) to one or more client devices 1010. Various service models may be implemented by cloud 1000 including but not limited to Software-as-a-Service (SaaS), Platform-as-a-Service (PaaS), and Infrastructure-as-a-Service (IaaS). In SaaS, a cloud service provider provides client devices 1010 the capability to use the cloud service provider's applications, which are executing on the resources in cloud 1000. Thus, processing, storage, networks, and other resources 1141-1144, 1012, 1030 of server computer 100 may be made available to client devices 1010, in the form of SaaS. In PaaS, the cloud service provider provides cloud users the capability to deploy onto cloud resources 1141-1144, 1012, 1030 custom applications, which are created using programming languages, libraries, services, and tools supported by the cloud service provider. In PaaS, the cloud service provider may make available to client devices 1010, one or more applications in server computer 100 (described above), such as database management system 110 implemented by a Relational Database Management System (RDBMS) as a service, Customer Relationship Management (CRM) application as a service, Enterprise Resource Planning (ERP) as a service, and Java as a service.

In IaaS, the cloud service provider provides cloud users the capability to provision processing, storage, networks, and other resources 1141-1144, 1012, and 1030 in the cloud

1000. Any applications and/or operating systems, in server computer 100 (described above) may be deployed on the resources 1141-1144, 1012, and 1030. Resources 1141-1144, 1012, 1030 may be used to implement processes to perform one or more acts or steps or operations described above in reference to one or more of FIGS. 1A, 1B, 1C, 2A, 2B, 2C, 2D, 3A, 3B, 4A, 4B, 5, 6A, 6B, 7A, 7B, 8, 9, 11A-11D, 12A-12T, 13, 14 and 15.

In some embodiment, various deployment models may be implemented by cloud 1000, including but not limited to a private cloud, a public cloud, and a hybrid cloud. In a private cloud, cloud resources 1141-1144, 1012, 1030 (FIG. 16) are provisioned for exclusive use by a particular group of one or more users, referred to below as entities, examples of which are a corporation, an organization, a single person, a family, or other such groups of users. The cloud resources may be located on the premises of one or more entities in the particular group, and/or at one or more remote off-premise locations. In a public cloud, cloud resources are provisioned for use by multiple entities (also referred to herein as "tenants" or "customers"). Each tenant uses one or more client devices 1010 to access cloud resources 1141-1144, 1012, 1030. Several tenants may share their use of a particular resource, such as server computer 100 in cloud 1000 at different times and/or at the same time. Cloud resources 1141-1144, 1012, and 1030 may be located at one or more remote off-premise locations, away from the premises of the tenants.

In some embodiments referred to as hybrid cloud, cloud 1000 (FIG. 16) includes a private cloud (not shown) and a public cloud (not shown). A cloud interface (not shown) between the private cloud and the public cloud allows for data and application portability. Data stored at the private cloud and data stored at the public cloud may be exchanged through the cloud interface. Applications implemented at the private cloud and applications implemented at the public cloud may have dependencies on each other. A call from an application at the private cloud to an application at the public cloud (and vice versa) may be executed through the cloud interface.

In certain embodiments, cloud 1000 (FIG. 16) is configured to support multiple tenants such that each tenant is independent from other tenants. For example, a business or operation of one tenant may be separate from a business or operation of another tenant. Each tenant may require different levels of computational resources to be provided by the cloud computing network. Tenant requirements may include, for example, processing speed, amount of data storage, level of security, and/or level of resiliency.

In various embodiments, tenant isolation is implemented in cloud 1000 (FIG. 16). Each tenant corresponds to a unique tenant identifier (ID). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In several embodiments of cloud 1000 (FIG. 16), data sets corresponding to various tenants are stored as entries in a database 1002. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In a few embodiments of cloud 1000 (FIG. 16), data sets and virtual resources (e.g., virtual machines, application instances, and threads) corresponding to different tenants are isolated to tenant-specific overlay networks, which are maintained by cloud 1000. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint de-capsulates the outer packet to obtain the original packet transmitted by the source device. The original packet is transmitted from the second encapsulation tunnel endpoint to the destination device in the same particular overlay network.

Figure 17B:
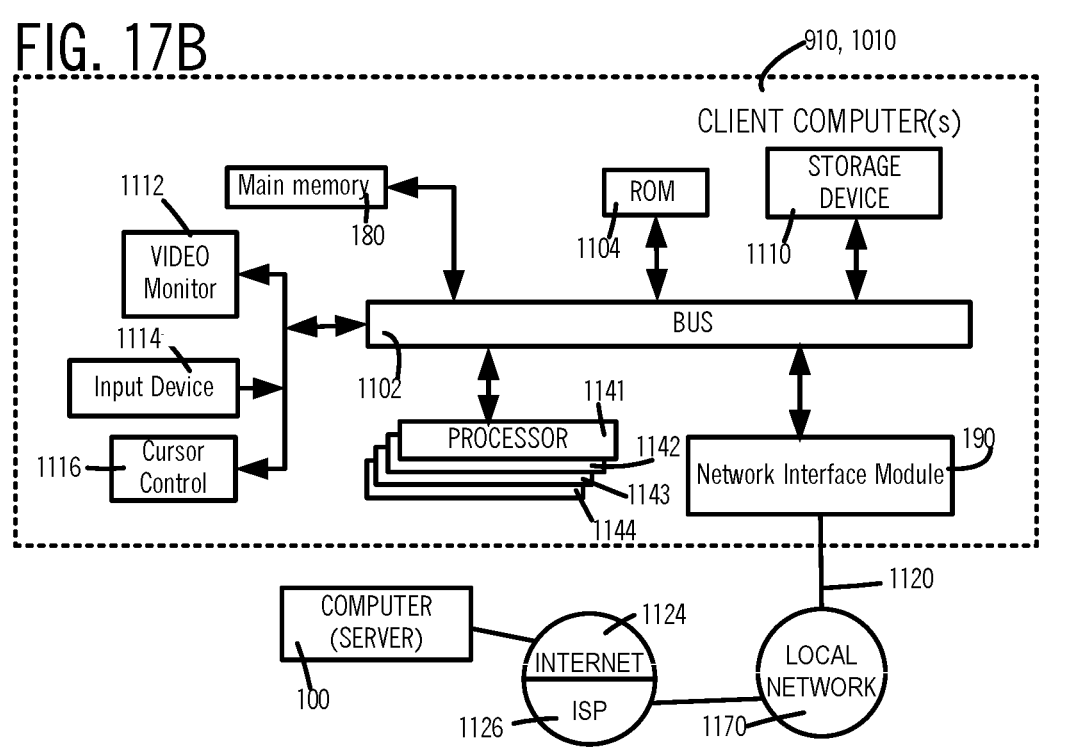

One or more of steps and acts described above in reference to one or more of FIGS. 1A, 1B, 1C, 2A, 2B, 2C, 2D, 3A, 3B, 4A, 4B, 5, 6A, 6B, 7A, 7B, 8, 9, 11A-11D, 12A-12T, 13, 14 and 15 may be used to program one or more computer(s) 910, 100 each of which may be implemented in hardware of the type illustrated in FIGS. 17B and 17A. Each of computers 910, 100 include a bus 1102 (FIGS. 17A, 17B) or other communication mechanism for communicating information. Computer 910 may include processors 1141-1144 (FIG. 17B), and computer 100 may include processors 1041-1044 (FIG. 17A). Bus 1102 (FIGS. 17A, 17B) connects processors 1041-1044, and processors 1141-1144 respectively to main memory 1060 and main memory 180. Main memory 1060, 180 may be implemented, for example, as random access memory (RAM) or other dynamic storage device, coupled to bus 1102 for storing information (e.g. data accessed by using a data structure) and instructions (e.g. to perform the steps and acts described above in reference to one or more of FIGS. 1A, 1B, 1C, 2A, 2B, 2C, 2D, 3A, 3B, 4A, 4B, 5, 6A, 6B, 7A, 7B, 8, 9, 11A-11D, 12A-12T, 13, 14 and 15). The just-described instructions may be executed by processors 1041-1044, and processors 1141-1144 respectively, e.g. to implement database management system 110, including regular instances 130, mirage instances 120, clusterware 550 and mirage instance manager 590 (see FIG. 16) in server computer 100 and one or more software components in client application 181 and a driver 182 (e.g. SQL*plus driver) in client computer 910 (see FIG. 16). Memory 1060, 180 (FIGS. 17A, 17B) may be used additionally for storing temporary variables or other intermediate information during execution of instructions to be executed by processors 1041-1044, and processors 1141-1144.

In some embodiments, regular instance 130 and/or mirage instance 120 include a combination of software components and allocation of computational resources, such as memory and computing hardware, and processes on a node for executing the software components, where the combination of the software components and computational resources are dedicated to processing or handling requests for read and/or write access to database 1002 received from client computers 910 (FIG. 2A) via sessions. Specifically, regular instance 130 and/or mirage instance 120 include one or more database server processes (e.g. server processes and background processes) that read data from and/or write data to database 1002, which is located in shared storage. Instances 120 and 130 communicate with one another, and with the shared storage through a network and/or other communication hardware. A database server process in an instance 120, 130 may include or represent one or more of processing modules, threads of execution, slave processes, background processes, server processes, operators in an execution plan, scan operations, sort operations, etc. In certain embodiments, database management system 110 may be implemented as a multiple-instance database system (or a cluster database system), as described in, for example, US Patent Publication 2014/0279840 by Wilson Wai Shun Chan et al, published on Sep. 18, 2014, entitled "Read Mostly Instances" that is incorporated by reference herein in its entirety.

Computers 100, 910 (FIGS. 17A, 17B) may include read only memory (ROM) 1104 or other static storage device coupled to bus 1102 for storing static information and instructions for processors 1041-1044, and processors 1141-1144 respectively, such as software in the form of relational database management system (RDBMS) software. A storage device 1110, such as a magnetic disk or optical disk may be included in computers 100, 910 and coupled to bus 1102 for storing information and instructions.

Computers 100, 910 (FIGS. 17A, 17B) may include a display device or video monitor 1112 such as a cathode ray tube (CRT) or a liquid crystal display (LCD) which is coupled to bus 1102 for use in displaying information to a computer user. Computers 100, 910 may include an input device 1114, including alphanumeric and other keys (e.g. of a keyboard) also coupled to bus 1102 for communicating information (such as user input) to processors 1041-1044, and processors 1141-1144. Another type of user input device is cursor control 1116, such as a mouse, a trackball, or cursor direction keys for communicating information and command selections to processors 1041-1044, and processors 1141-1144 and for controlling cursor movement on display device 1112. This input device typically has two degrees of freedom in two axes, a first axis (e.g., x) and a second axis (e.g., y), that allows the input device to specify positions in a plane.

As described above, an API sleep duration which is specified for processor relinquishment when calling a sleep ( ) function may be tuned, for each wait by processors 1041-1044 executing one or more sequences of one or more instructions that are contained in memory 1060 and memory 180 respectively. Such instructions may be read into memory 1060, 180 from another non-transitory computer-readable storage medium, such as storage device 1110. Execution of the sequences of instructions contained in main memory 1060, 180 causes respective processors 1041-1044, and processors 1141-1144 to perform the steps, acts, operations (see one or more of FIGS. 1A, 1B, 1C, 2A, 2B, 2C, 2D, 3A, 3B, 4A, 4B, 5, 6A, 6B, 7A, 7B, 8, 9, 11A-11D, 12A-12T, 13, 14 and 15 and related description above). In alternative embodiments, hard-wired circuitry may be used in place of or in combination with software instructions.

The term "non-transitory computer-readable storage medium" as used herein refers to any non-transitory storage medium that participates in providing instructions to processors 1041-1044, and processors 1141-1144 for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by computers 100, 910. Volatile storage media includes dynamic memory, such as memory 1060, 180 which may be implemented in the form of a random access memory or RAM.

Instructions to processors 1041-1044 and processors 1141-1144 can be provided by a transmission link or by a non-transitory storage medium from which a computer can read information, such as data and/or code. Specifically, various forms of transmission link and/or non-transitory storage medium may be involved in providing one or more sequences of one or more instructions to processors 1041-1044 and processors 1141-1144 for execution. For example, the instructions may initially be comprised in a non-transitory storage device, such as a magnetic disk, of a computer. Such a computer can load the instructions into its dynamic memory (RAM) and send the instructions over a telephone line using a modem.

A modem local to computers 100, 910 can receive information on the telephone line and use an infra-red transmitter to transmit the information in an infra-red signal. An infra-red detector can receive the information carried in the infra-red signal and appropriate circuitry can place the information on bus 1102. Bus 1102 carries the information to memory 1060, 180, from which processors 1041-1044 and processors 1141-1144 retrieve and execute the instructions. The instructions received by memory 1060, 180 may optionally be stored on storage device 1110 either before or after execution by processors 1041-1044 and processors 1141-1144.

Computers 100, 910 include respective network interface modules 1050, 190 coupled to bus 1102. Network interface modules 1050, 190 provide two-way data communication coupling to network link 1120 that is connected to a communications network 1170. DBMS 110 may communicate with network interface module 1050 via a driver 116 (FIG. 16) that implements Internet Protocol (IP) and/or Transport Control Protocol (TCP). Driver 116 may identify to DBMS 110, error(s) and/or statistics (such as number of checksum errors, number of timeouts) related to receipt of requests and/or transmission of responses (e.g. in the form of IP packets) over a network, in a session with client application 181 in client computer 910. Network 1170 may interconnect multiple computers (as described above). For example, network interface module 1050, 190 may be an integrated services digital network (ISDN) card or a modem to provide a data communication connection to a corresponding type of telephone line. As another example, network interface module 1050, 190 may be a local area network (LAN) card to provide a data communication connection to a compatible LAN. Wireless links may also be implemented by modules 1050 and 190. In any such implementation, network interface module 1050, 190 sends and receives electrical, electromagnetic or optical signals that carry digital data streams representing various types of information.

Network link 1120 typically provides data communication through one or more networks to other data devices. For example, network link 1120 may provide a connection through network 1170 to data equipment operated by an Internet Service Provider (ISP) 1126. ISP 1126 in turn provides data communication services through the world wide packet data communication network 1124 now commonly referred to as the "Internet". Network 1170 and network 1124 both use electrical, electromagnetic or optical signals that carry digital data streams. The signals through the various communication networks and the signals on network link 1120 and through network interface module 1050, 190, which carry the digital data to and from computers 100, 910, are exemplary forms of carrier waves transporting the information.

Computers 100, 910 can send messages and receive data, including program code, through the communication network(s), network link 1120 and network interface module 1050, 190. In the Internet example, a server computer 100 might transmit information retrieved from RDBMS database through Internet 1124, ISP 1126, network 1170 and network interface module 1050, 190. Computer instructions for performing one or more steps or acts described above in reference to one or more of FIGS. 1A, 1B, 1C, 2A, 2B, 2C, 2D, 3A, 3B, 4A, 4B, 5, 6A, 6B, 7A, 7B, 8, 9, 11A-11D, 12A-12T, 13, 14 and 15 may be executed by processors 1041-1044 and processors 1141-1144 as they are received, and/or stored in storage device 1110, or other devices that contain non-volatile storage media for later execution. In this manner, computer 100 may additionally or alternatively obtain instructions and any related data in the form of a carrier wave.

Note that FIGS. 17A and 17B are low-level representations of some hardware components of computer 100. Several embodiments have additional software components and/or related data in memory 1060, 180. In addition to memory 180, 1060, computer 100 may include one or more other types of memory such as flash memory (or SD card) and/or a hard disk and/or an optical disk (also called "secondary memory") to store data and/or software for loading into memory 180, 1060 (also called "main memory") and/or for use by processors 1041-1044 and processors 1141-1144. In some embodiments, server computer 100 implements a relational database management system to manage data in one or more tables of a relational database 1002 of the type illustrated in one or more of FIGS. 1A, 1B, 1C, 2A, 2B, 2C, 2D, 3A, 3B, 4A, 4B, 5, 6A, 6B, 7A, 7B, 8, 9, 11A-11D, 12A-12T, 13, 14 and 15. Such a relational database management system may manage a distributed database that includes multiple databases, and tables may be stored on different storage mechanisms.

In some embodiments, processors 1041-1044 that execute software of a relational database management system can access and modify the data in a relational database 1002, and hence server computer 100 accepts queries in conformance with a relational database language, the most common of which is the Structured Query Language (SQL). The commands are used by processors 1041-1044 of some embodiments to store, modify and retrieve data about an application program in the form of rows in a table in relational database 1002. Client computer 910 may include output logic that makes the data in a database table retrieved from database 1002 via server computer 100, available to a user via a graphical user interface that generates a screen of an application program on a video monitor 1112. In one example, the output logic of client computer 910 provides results on a monitor or other such visual display, via a command line interface. Additionally and/or alternatively, screens responsive to a command in a command-line interface and display on a video monitor may be generated by server computer 100.

Numerous modifications and adaptations of the embodiments described herein will become apparent to the skilled artisan in view of this disclosure. Numerous modifications and adaptations of the embodiments described herein are encompassed by the attached claims.

The invention claimed is:

1. A method of managing a database management system in one or more computers, the method comprising:

receiving one or more requests to perform database operations in a specific session that originates from a specific client application outside the one or more computers, wherein the one or more requests comprises a first request that is determined to be a normal request and a second request that is determined to be an abnormal request;

handling the one or more requests of the specific session at least partially, in one or more instances of a database server of a first kind in the database management system or in one or more instances of a database server of a second kind in the database management system, wherein during the same time, the first request that is determined to be the normal request is handled by the one or more instances of the database server of the first kind, and the second request that is determined to be the abnormal request is handled by the one or more instances of the database server of the second kind by automatically relocating the handling, for the second request that is determined to be the abnormal request, from a first instance among the one or more instances of the database server of the first kind to a second instance among the one or more instances of the database server of the second kind, such that the one or more instances of the database server of the first kind are simultaneously operating with the one or more instances of the database server of the second kind, and both the first request and the second request are both simultaneously being executed respectively by the instances of the database servers of the first and second kinds; and transmitting to the specific client application, in the specific session, at least a result of the handling.

2. The method of claim 1 wherein:

the automatically relocating of the handling, from the first instance to the second instance, is performed at least partially in response to occurrence of a predetermined event during the handling in the first instance.

3. The method of claim 1 wherein:

the automatically relocating of the handling, from the first instance to the second instance, is performed at least partially in response to a first outcome of a first evaluation that applies one or more first tests to one or more first statistics, the one or more first statistics being generated based on the handling in the first instance.

4. The method of claim 3 further comprising:

automatically changing one or more first thresholds used in the one or more first tests, in response to a percentage of sessions that are handled in the second instance exceeding an upper limit thereon.

5. The method of claim 3 further comprising:

automatically disabling at least one test in the one or more first tests, in response to finding that usage at machine level of a computational resource by the first instance in a specific computer among the one or more computers is greater than or equal to, or greater than, an upper limit thereon; and automatically enabling at least one test in the one or more first tests, at least on finding that the usage of the computational resource is less than or equal to, or less than, a lower limit thereon.

6. The method of claim 3 wherein:

before the first evaluation, the handling in the first instance is performed in a plurality of stages, the plurality of stages comprising a parse stage, an execution stage, and a fetch stage, at least one of the stages comprising a plurality of steps; and the one or more first statistics comprise multiple statistics generated in corresponding multiple steps in the plurality of steps.

7. The method of claim 3 wherein:

among the one or more first statistics, a statistic specific to the specific session is generated in the first instance at least by counting news reports of hacking in a geographic location of a client computer in which execute the specific client application from which originates the specific session.

8. The method of claim 3 wherein:

among the one or more first statistics, a particular first statistic counts errors related to transmission of requests received by the first instance in the specific session over a communication network;

the first evaluation further comprises applying to the particular first statistic, a first test for abnormality; and the automatically relocating from the first instance to the second instance is based on the particular first statistic satisfying the first test for abnormality.

9. The method of claim 3 wherein:

before the automatically relocating from the first instance to the second instance, a particular first statistic among the one or more first statistics measures usage of a particular resource in the first instance, by the handling of the one or more requests received in the specific session; and the first evaluation comprises applying to the particular first statistic, a first test for abnormality;

wherein the automatically relocating from the first instance to the second instance is based on the particular first statistic satisfying the first test for abnormality.

10. The method of claim 3 wherein:

the first instance executes in a first computer comprising a first hardware component of a specific type with a first capacity;

the second instance executes in a second computer comprising a second hardware component of the specific type with a second capacity, the second capacity being lower than the first capacity;

the one or more first statistics comprise one or more error statistics that count occurrences of one or more respective errors in the handling of the one or more requests;

the one or more first statistics further comprise one or more resource usage statistics that respectively measure usage of one or more particular resources by the handling of the one or more requests;

the first evaluation finds that among the one or more error statistics, at least one error statistic specific to the specific session satisfies at least one test for abnormality;

an additional second instance of the database server executes in a third computer comprising a third hardware component of the specific type with a third capacity, the third capacity being higher than the first capacity;

the method further comprises automatically relocating one or more additional sessions, from the first instance to the additional second instance based on an additional evaluation; and the additional evaluation finds that at least one additional resource usage statistic specific to the one or more additional sessions satisfies another test for abnormality.

11. The method of claim 1 wherein:

the automatically relocating from the first instance to the second instance is performed at least partially in response to a first outcome of a first evaluation;

the automatically relocating from the second instance to said any instance is performed at least partially in response to a second outcome of a second evaluation; and the second evaluation performs one or more checks that are not performed by the first evaluation.

12. The method of claim 1 further comprising:

automatically starting execution of at least the second instance by the first instance issuing a command to cluster ware.

13. The method of claim 12 further comprising:

automatically starting execution of one or more additional second instances, at least partially based on: usage at machine level of a computational resource in a specific computer by the second instance being above a first upper limit thereon, or a number of sessions handled by the second instance being above a second upper limit thereon; and automatically shutting down the second instance, at least partially in response to: the usage of the computational resource by the second instance being below a first lower limit thereon or the number of sessions handled by the second instance being below a second lower limit thereon.

14. The method of claim 1 wherein:

a first number of processes of a specific type in the first instance is greater than a second number of processes of the specific type in the second instance.

15. The method of claim 1 wherein:

the automatically relocating from the first instance to the second instance is performed at least partially in response to a first outcome of a first evaluation;

the first evaluation applies one or more first tests to one or more first statistics, the one or more first statistics being specific to the specific session and being generated based on the handling in the first instance;

among the one or more first statistics specific to one or more sessions, a particular first statistic counts occurrences of a particular error or measures usage of a particular resource;

the automatically relocating from the second instance to said any instance is performed at least partially in response to a second outcome of a second evaluation;

the second evaluation applies one or more second tests to one or more second statistics, the one or more second statistics being specific to the specific session and being generated based on the handling in the second instance;

among the one or more second statistics specific to the one or more sessions, a particular second statistic counts occurrences of the particular error or measures usage of the particular resource; and a first threshold in a first test applied to the particular first statistic in the first evaluation is different from a second threshold in a second test applied to a particular second statistic in the second evaluation.

16. The method of claim 1 wherein:

the specific session is set up initially with the first instance; and each of the one or more first instances is a mirage instance, and each of the one or more second instances is a regular instance.

17. The method of claim 1 wherein the specific session is hereinafter a first session and wherein:

the automatically relocating from the first instance to the second instance is performed at least partially in response to a first evaluation; and the method further comprises automatically relocating one or more second sessions from the first instance to the second instance, at least partially in response to the first evaluation finding the first session to be abnormal and in addition finding a pattern between one or more first statistics specific to the first session and one or more second statistics specific to the one or more second sessions.

18. The method of claim 1 wherein t the specific session is hereinafter a first session and wherein:

the automatically relocating from the first instance to the second instance is performed at least partially in response to a first evaluation;

the first session and one or more second sessions are grouped into a first group, and additional sessions are grouped into at least a second group; and the method further comprises automatically relocating one or more second sessions from the first instance to the second instance, at least partially in response to the first evaluation finding the first session to be abnormal and in addition finding a preset limit is exceeded by a count of sessions in the first group which relocated from the first instance to the second instance.

19. The method of claim 1 wherein:

the automatically relocating from the first instance to the second instance is performed at least partially in response to a first outcome of a first evaluation;

the automatically relocating from the second instance to said any instance is performed at least partially in response to a second outcome of a second evaluation;

at least one of the first evaluation or the second evaluation is repeated at a periodic time interval; and the periodic time interval is automatically increased for at least one or more sessions, on finding a preset limit being exceeded by a number of times of performance of the automatically relocatings.

20. The method of claim 1 wherein the automatically relocating from the first instance to the second instance is performed at least partially in response to a first outcome of a first evaluation that applies one or more first tests to one or more first statistics, the one or more first statistics being generated based on the handling in the first instance; and the method further comprises:

obtaining an indication of enablement or disablement of a statistic among the one or more first statistics by using one or more tables, based on a priority with which the statistic is associated; and based on the indication of enablement or disablement, the statistic is used or not used respectively, in the first evaluation;

wherein the using of the one or more tables comprises:

based on a current value of a criterion, looking up a first table, to identify enablement or disablement of a plurality of priorities, the plurality of priorities comprising said priority; and based on the plurality of priorities, looking up a second table, to determine indications of enablement or disablement of the one or more first statistics that comprise said statistic.

21. The method of claim 1 wherein:

the automatically relocating from the first instance to the second instance is performed at least partially in response to a first outcome of a first evaluation that applies one or more first tests to one or more first statistics, the one or more first statistics being generated based on the handling in the first instance;

each statistic among the one or more first statistics is generated by a corresponding stage or by a corresponding step within a stage, in the handling; and in the first evaluation:

using the one or more first statistics individually by applying corresponding thresholds thereto, when a current measurement of resource usage is in a first range; and using a cumulative statistic obtained by adding the one or more first statistics to one another and applying a single threshold to the cumulative statistic, when the current measurement of resource usage is in a second range above the first range.

22. The method of claim 1 wherein one or more sessions are hereinafter one or more first sessions, and the method further comprises:

the second instance performing, on requests received in the one or more first sessions, at least a first additional check, wherein the second instance does not perform a second additional check;

handling additional requests of one or more additional sessions in the first instance;

automatically relocating the handling of additional requests of the one or more additional sessions, from the first instance to another second instance among the one or more instances of the database server of the second kind; and the another second instance performing, on new requests received in the one or more additional sessions after the automatically relocating of the handling of additional requests of the one or more additional sessions, at least the second additional check, wherein the another second instance does not perform the first additional check.

23. The method of claim 1 wherein:

the automatically relocating from the first instance to the second instance is performed at least partially in response to a first outcome of a first evaluation;

the automatically relocating from the second instance to said any instance is performed at least partially in response to a second outcome of a second evaluation;

the second evaluation comprises checking a history of errors, to determine whether a current error whose occurrence is counted by any of first statistics matches any previous error that occurred before a current change to the database management system; and the method further comprises:

checking on availability of a new software update associated with the current error, at least based on the second evaluation finding that the current error did not occur before the current change to the database management system; and automatically installing the new software update in at least said any instance, in response to finding the new software update is available;

wherein the automatically relocating from the second instance to said any instance is performed after the installing of the new software update.

24. The method of claim 23 wherein:

the checking on availability finds that no new software update associated with the current error is available; and said any instance executes a version of software of the database server prior to the current change to the database management system.

25. The method of claim 23 wherein:

the handling in the second instance comprises recording a sequence of calls to a second database;

the automatically relocating from the second instance to said any instance is performed after the installing of the new software update; and the handling in said any instance comprises replaying the sequence of calls, on a first database; and the first database is accessed by the one or more instances of the database server of the first kind, the second database is accessed by the one or more instances of the database server of the second kind; and the second database is a replica of the first database.

26. The method of claim 1 wherein:

the automatically relocating from the first instance to the second instance is performed without notifying the specific client application; and the automatically relocating from the second instance to said any instance is performed without notifying the specific client application.

27. One or more non-transitory computer-readable storage media comprising a plurality of instructions to one or more processors to manage a database management system in one or more computers, the plurality of instructions comprising:

instructions to receive one or more requests to perform database operations in a specific session that originates from a specific client application outside the one or more computers, wherein the one or more requests comprises a first request that is determined to be a normal request and a second request that is determined to be an abnormal request;

instructions to handle the one or more requests at least partially, in one or more instances of a database server of a first kind in the database management system or in one or more instances of a database server of a second kind in the database management system, wherein during the same time, the first request that is determined to be the normal request is handled by the one or more instances of the database server of the first kind, and the second request that is determined to be the abnormal request is handled by the one or more instances of the database server of the second kind by automatically relocate handling, for the second request that is determined to be the abnormal request, from a first instance among the one or more instances of the database server of the first kind to a second instance among the one or more instances of the database server of the second kind, such that the one or more instances of the database server of the first kind are simultaneously operating with the one or more instances of the database server of the second kind, and both the first request and the second request are both simultaneously being executed respectively by the instances of the database servers of the first and second kinds; and instructions to transmit to the specific client application, in the specific session, at least a result of the handling.

28. An apparatus comprising one or more computer memories coupled to one or more processors in one or more computers, the one or more processors being configured to execute instructions in the one or more computer memories to manage a database management system in the one or more computers, the instructions causing the one or more computers to:

receive one or more requests to perform database operations in a specific session that originates from a specific client application outside the one or more computers, wherein the one or more requests comprises a first request that is determined to be a normal request and a second request that is determined to be an abnormal request;

handle the one or more requests at least partially, in one or more instances of a database server of a first kind in the database management system or in one or more instances of a database server of a second kind in the database management system, wherein during the same time, the first request that is determined to be the normal request is handled by the one or more instances of the database server of the first kind, and the second request that is determined to be the abnormal request is handled by the one or more instances of the database server of the second kind by automatically relocate handling, for the second request that is determined to be the abnormal request, from a first instance among the one or more instances of the database server of the first kind to a second instance among the one or more instances of the database server of the second kind, such that the one or more instances of the database server of the first kind are simultaneously operating with the one or more instances of the database server of the second kind, and both the first request and the second request are both simultaneously being executed respectively by the instances of the database servers of the first and second kinds; and transmitting to the specific client application, in the specific session, at least a result of the handling.

\* \* \* \* \*